US007443768B2

(12) United States Patent
Watanabe et al.

(10) Patent No.: US 7,443,768 B2
(45) Date of Patent: Oct. 28, 2008

(54) MULTIFUNCTIONAL TIMEPIECE INCLUDING PLURAL TYPES OF HAND OPERATING TRAIN WHEELS

(75) Inventors: Mamoru Watanabe, Chiba (JP); Takeshi Tokoro, Chiba (JP); Kei Hirano, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/667,177

(22) PCT Filed: Dec. 15, 2004

(86) PCT No.: PCT/JP2004/018728

§ 371 (c)(1),
(2), (4) Date: May 29, 2007

(87) PCT Pub. No.: WO2006/064557

PCT Pub. Date: Jun. 22, 2006

(65) Prior Publication Data

US 2008/0130419 A1 Jun. 5, 2008

(51) Int. Cl.
*G04B 19/04* (2006.01)
*G04B 37/00* (2006.01)
*G03B 19/02* (2006.01)

(52) U.S. Cl. ............................ 368/80; 368/88; 368/220

(58) Field of Classification Search ................... 368/28, 368/29, 35, 37, 80, 88, 281, 220, 223, 228, 368/299, 300

See application file for complete search history.

(56) References Cited

U.S. PATENT DOCUMENTS 4,623,261 A * 11/1986 Muto .......................... 368/80
4,748,603 A * 5/1988 Ray et al. ...................... 368/80
5,289,452 A * 2/1994 Sakamoto et al. ............. 368/73
5,956,294 A * 9/1999 Takizawa et al. .............. 368/37

* cited by examiner

*Primary Examiner*—Vit W Miska
(74) *Attorney, Agent, or Firm*—Adams & Wilks

(57) ABSTRACT

There is realized a multifunction timepiece constituted to be able to constitute a plurality of types of hand operating train wheels by only changing positions of integrating parts without changing dimensions and shapes of parts of a movement.

A movement of a multifunction timepiece includes a first train wheel rotation center, and a second train wheel rotation center. A train wheel for indicating calendar information is arranged to be rotatable relative to one of the first train wheel rotation center, and the second train wheel rotation center. When the first train wheel rotation center is arranged with a train wheel for indicating calendar information, the calendar information can be indicated by a small hand rotated to move by the train wheel, when the second train wheel rotation center is arranged with a fan shape hand operating train wheel for indicating the calendar information, the calendar information can be indicated by a small hand moved in a fan shape operating train wheel.

9 Claims, 44 Drawing Sheets

FIG. 10

| | HAND POSITION AND HAND SPECIFICATION | | | | | | |
|---|---|---|---|---|---|---|---|
| | 2 O'CLOCK (DATE HAND) | 3 O'CLOCK (DATE HAND) | 6 O'CLOCK (SMALL SECOND HAND) | 9 O'CLOCK (DAY HAND) | 10 O'CLOCK (DAY HAND) | 12 O'CLOCK (24 HOUR HAND) | 9 O'CLOCK (RETROGRADE DAY HAND) |
| FIRST KIND | – | O | O | O | – | O | – |
| SECOND KIND | – | O | O | O | – | – | – |
| THIRD KIND | – | – | O | – | – | O | – |
| FOURTH KIND | – | O | – | O | – | – | – |
| FIFTH KIND | – | – | O | – | – | – | – |
| SIXTH KIND | O | – | O | – | O | – | – |
| SEVENTH KIND | – | O | O | – | – | O | O |
| EIGHTH KIND | – | O | O | – | – | – | O |

MULTIFUNCTIONAL TIMEPIECE INCLUDING PLURAL TYPES OF HAND OPERATING TRAIN WHEELS

CROSS-REFERENCE TO RELATED APPLICATIONS

This application is a U.S. national stage application of International Application No. PCT/JP2004/018728, filed Dec. 15, 2004, and published in a non-English language.

1.Technical Field

The present invention relates to a multifunction timepiece including plural types of hand operating train wheels. Particularly, the invention relates to an analog multifunction timepiece including plural types of hand operating train wheels constituted to be able to realize plural movement layouts by only changing a position of integrating a part without changing a dimension and a shape of the part of a movement.

2.Background Art (1) Explanation of Technical Term:

Generally, a machine body including a portion of driving a timepiece is referred to as "movement". A state in which the movement is attached with a dial, a hand and put into a timepiece case to constitute a finished product is referred to as "complete" of a timepiece. In both sides of a main plate constituting a base plate of a timepiece, a side including glass of a timepiece case, that is, a side of including a dial is referred to as "back side" or "glass side" or "dial side" of a movement. In both sides of the main plate, a side of including a case back of a timepiece case, that is, a side opposed to a dial is referred to as "top side" or "case back side" of a movement. A train wheel integrated to "top side" of a movement is referred to as "top train wheel". A train wheel integrated to "back side" of a movement is referred to as "back train wheel". Generally, "12 o'clock side" indicates a side of arranging a graduation in correspondence with 12 o'clock of a dial in an analog timepiece. "12 o'clock direction" indicates a direction directed to "12 o'clock side" from a center of a main plate or a rotation center of an indicator of an hour hand or the like (herein after, referred to as "main plate center") in an analog type timepiece. Further, "2 o'clock side" indicates a side of arranging a graduation in correspondence with 2 o'clock of a dial in an analog type timepiece. "2 o'clock direction" indicates a direction directed to "2 o'clock side" from a main plate center in an analog type timepiece.

Further, "3 o'clock side" indicates a side of arranging a graduation in correspondence with 3 o'clock of a dial in an analog timepiece. "3 o'clock direction" indicates a direction directed to "3 o'clock side" from a main plate center in an analog type timepiece. Further, "6 o'clock side" indicates a side of arranging a graduation in correspondence with 6 o'clock of a dial in an analog type timepiece. "6 o'clock direction" indicates a direction directed to "6 o'clock side" from a main plate center in an analog type timepiece. Further, "9 o'clock side" indicates a side of arranging a graduation in correspondence with 9 o'clock of a dial in an analog type timepiece. "9 o'clock direction" indicates a direction directed to "9 o'clock side" from a main plate center in an analog type timepiece. Further, "10 o'clock side" indicates a side of arranging a graduation in correspondence with 10 o'clock of a dial in an analog type timepiece. "10 o'clock direction" indicates a direction directed to "10 o'clock side" from a main plate center in an analog type timepiece. Further, there is a case of indicating a side of arranging other graduation of a dial as in "4 o'clock direction", "4 o'clock side".

Further, in the specification, there is a case in which a straight line directed to "3 o'clock side" from a main plate center is simply referred to as "3 o'clock direction". Similarly, there is a case in which a straight line directed to "12 o'clock side" from a main plate center is simply referred to as "12 o'clock direction", a straight line directed to "4 o'clock side" from a main plate center is simply referred to as "4 o'clock direction", a straight line directed to "6 o'clock side" from a main plate center is simply referred to as "6 o'clock direction", a straight line directed to "9 o'clock side" from a main plate center is simply referred to as "9 o'clock direction". Furthermore, in the specification, there is a case in which a region between "3 o'clock direction" and "4 o'clock direction" is referred to as "3-4 o'clock region". Similarly, there is a case in which a region between "12 o'clock direction" and "3 o'clock direction" is referred to as "12-3 o'clock region", a region between "3 o'clock direction" and "6 o'clock region" is referred to as "3-6 o'clock region", a region between "6 o'clock direction" and "9 o'clock direction" is referred to as "6-9 o'clock region", a region between "9 o'clock direction" and "12 o'clock direction" is referred to as "9-12 o'clock region".

(2) Multifunction Timepiece Attached with Small Hand of Background Art:

(2.1) First Type of Multifunction Timepiece:

According to a first type of a multifunction timepiece including a small hand of a background art, a date star wheel and a small day wheel are arranged at positions substantially symmetrical with each other relative to a timepiece center. A small date hand constituting a kind of a small hand is attached to the date star wheel. Further, a small day hand constituting a kind of a small hand is attached to the small day wheel (refer to, for example, Patent Reference 1).

(2.2) Second Type of Multifunction Timepiece:

According to a second type of a multifunction timepiece including a small hand of a background art, a date star wheel and a small day wheel are arranged at positions substantially symmetrical with each other relative to a timepiece center, and a date indicator driving wheel, a day indicator driving wheel respectively include both of a date feed finger, a day feed finger (refer to, for example, Patent Reference 2).

(2.3) Third Type of Multifunction Timepiece:

According to a third type of a multifunction timepiece of a background art, a main plate includes a train wheel rotation center of a rotor and a train wheel used in fabricating "center chronograph timepiece", and a train wheel rotation center of a rotor and a train wheel used in fabricating "side chronograph timepiece", a bridge member includes a train wheel rotation center of the rotor and the train wheel used in fabricating "center chronograph timepiece", and a train wheel rotation center of the rotor and the train wheel used in fabricating "side chronograph timepiece", and the rotor and the train wheel used in fabricating "side chronograph timepiece" including a chronograph hand constituting a kind of a small hand are integrated rotatably relative to the train wheel rotation center of the main plate and the train wheel rotation center of the bridge member (refer to, for example, Patent Reference 3).

(2.4) Fourth Type of Multifunction Timepiece:

According to a fourth type of multifunction timepiece including a small hand of a background art, "12 o'clock side" is arranged with a small hand rotated by 360 degrees, "3 o'clock side" and "9 o'clock side" are respectively arranged with small hands operated in a fan shape, "6 o'clock side" is arranged with a circular disk for indicating a moon phase. The small hand operated in the fan shape is attached to an indicator wheel provided with a hairspring (refer to, for example, Patent Reference 4).

Patent Reference 1: JP-UM-A-63-187089 (FIG. 1)

Patent Reference 2: JP-UM-A-63-187090 (FIG. 1)

Patent Reference 3: JP-A-2004-20421 (pages 9 through 20, FIG. 1 through FIG. 8)

Patent Reference 4: Switzerland Patent No. CH666591G A3 (FIG. 1)

DISCLOSURE OF THE INVENTION

Problems that the Invention is to Solve

However, according to the multifunction timepiece including the small hand of the background art, in the movement, when a position of a rotation center of a wheel for attaching a small hand (small indicating hand) of the date star wheel, the small day wheel, the chronograph wheel or the like is changed, a plurality of parts related thereto need to be changed. Therefore, when a plurality of movement layouts including small hands are formed, it is necessary to separately design the respective movements and prepare a number of working machines, dies and the like for working constituent parts of the respective movements. Therefore, in fabricating the multifunction timepiece including the small hand of the background art, there poses a problem that much time period is needed for switching part working operations, further, a number of part fabricating steps is increased.

It is an object of the invention to realize an analog multifunction timepiece including a small hand constituted to be able to constitute a plurality of types of hand operating train wheels by only changing positions of integrating parts without changing dimensions and shapes of the parts of a movement when a position of a rotation center of a wheel for attaching a small hand is changed.

Further, it is other object of the invention to realize an analog multifunction timepiece including a small hand having a small number of part fabricating steps without needing much time period for switching part working operations.

Means for Solving the Problems

The invention is a multifunction timepiece including a main plate constituting a base plate of a movement, a winding stem for correcting an indication, a switching mechanism for switching a position of the winding stem, a dial for indicating time information, and a small hand for indicating the time information or calendar information constituted such that the movement includes a first train wheel rotation center for a train wheel used in fabricating a first type of the multifunction timepiece having an arrangement of a first type of the small hand by using the movement, and a second train wheel rotation center for a train wheel used in fabricating a second type of the multifunction timepiece having an arrangement of a second type of the small hand by using the movement. The first train wheel rotation center is provided with a train wheel guide portion for guiding a train wheel member rotated to move centering on a position thereof to be able to rotate to move, the second train wheel rotation center is provided with a train wheel guide portion for guiding a train wheel member moved in a fan shape centering on a position thereof. The train wheel rotation center of the train wheel member rotated to move is arranged at a position between a main plate center of the main plate and a main plate outer shape portion of the main plate.

According to the multifunction timepiece, the train wheel rotation center of the train wheel member moved in the fan shape is arranged at a position between the main plate center of the main plate and the main plate outer shape portion of the main plate. According to the multifunction timepiece, a train wheel for indicating the calendar information is arranged rotatably relative to the first train wheel rotation center or the second train wheel rotation center. The multifunction timepiece is constituted such that when the train wheel for indicating the calendar information is arranged at the first train wheel rotation center, the calendar information is made to be able to indicate by the small hand rotated to move by the train wheel, and when the fan shape hand operating train wheel for indicating the calendar information is arranged at the second train wheel rotation center, the calendar information is made to be able to indicate by the small hand moved in the fan shape by the fan shape hand operating train wheel. The multifunction timepiece is constituted such that the time information or the calendar information is indicated by the small hand rotated by constituting the rotation center by the position between the main plate center and the outer shape portion of the main plate. By the constitution, there can be provided the multifunction timepiece capable of realizing a plurality of movement layouts constituted to be able to constitute a plurality of types of hand operating train wheels.

According to the multifunction timepiece of the invention, a distance between the rotation center of the train wheel member moved in the fan shape and the main plate center of the main plate is constituted to be larger than a distance between the rotation center of the train wheel member rotated to move and the main plate center of the main plate. By the constitution, the calendar information can be indicated to be easy to see by the small hand operated in the fan shape. Further, the multifunction timepiece of the invention can be constituted such that the first train wheel rotation center is arranged in a 9 o'clock direction of the movement, and the second train wheel rotation center is arranged in the 9 o'clock direction of the movement. By the constitution, there can be provided the multifunction timepiece capable of realizing various movement layouts.

Further, the multifunction timepiece of the invention can be constituted such that the movement further includes a third train wheel rotation center for a train wheel used in fabricating the multifunction timepiece having an arrangement of a small hand, the third train wheel rotation center is arranged at a position between the main plate center of the main plate and the main plate outer shape portion of the main plate, at the third train wheel rotation center, a train wheel guide portion for rotatably guiding a train wheel member rotated centering on a position thereof is provided, a train wheel for indicating the time information or the calendar information is arranged to be able to rotate relative to the third train wheel rotation center and the time information or the calendar information is constituted to indicate by the further small hand. By the constitution, there can be provided the multifunction timepiece capable of realizing the multifunction timepiece further including the small hand.

Further, according to the multifunction timepiece of the invention, the third train wheel rotation center can be arranged in a 6 o'clock direction of the movement. Or, the third train wheel rotation center can be arranged in a 12 o'clock direction of the movement. Or, the third train wheel rotation center can be arranged in a 3 o'clock direction of the movement.

Further, there may also be constituted such that the third train wheel rotation center is arranged in the 3 o'clock direction of the movement, and a date star wheel for carrying out a date indication is arranged rotatably by constituting a rotation center thereof by the first train wheel rotation center. By the constitution, there can be provided the multifunction timepiece capable of realizing various movement layouts.

Further, according to the multifunction timepiece of the invention, the movement includes a day indicator driving wheel rotated based on a rotation of an hour wheel, and the day indicator driving wheel is constituted to be able to rotate a train wheel member rotated to move when the train wheel member rotated to move is arranged at the first train wheel rotation center, and is constituted to be able to move in the fan shape the train wheel member moved in the fan shape when a train wheel member moved in the fan shape is arranged at the second train wheel rotation center. By the constitution, there can be realized the multifunction timepiece constituted to be able to indicate the calendar information to be easy to see by the small hand operated in the fan shape.

Advantage of the Invention

According to the invention, in the multifunction timepiece having the small hand, when the position of the rotation center of the wheel for attaching the small hand is changed, a plurality of movement layouts including pluralities of types of hand operating train wheels can be formed by only changing the position of integrating the part without changing the dimension and the shape of the part of the movement. Further, the multifunction timepiece of the invention does not need much time period in switching the part working operations, and therefore, the number of part fabricating steps of the multifunction timepiece can be reduced.

BEST MODE FOR CARRYING OUT THE INVENTION

Embodiments of the invention will be explained in reference to the drawings as follows.

(1) First Embodiment

First, a first embodiment of the multifunction timepiece of the invention will be explained.

(1.1) Structure of Total of Movement:

In reference to FIG. 1 through FIG. 6, according to a first embodiment of a multifunction timepiece of the invention, a movement is constituted by an analog electronic timepiece. Further in details, the first embodiment of the multifunction timepiece of the invention is constituted by an analog type timepiece (electric timepiece, electronic timepiece, mechanical type timepiece) including a small hand at least one portion in “3 o’clock direction”, “6 o’clock direction”, “9 o’clock direction”, “12 o’clock direction”. That is, according to the first embodiment of the multifunction timepiece of the invention, there can be constructed a constitution in which by an hour hand a rotation center of which is a center of a main plate, time information with regard to “hour” of a 12 hour system is indicated, by a minute hand a rotation center of which is the center of the main plate, time information with regard to “minute” is indicated, by a 24 hour hand a rotation center of which is arranged in “12 o’clock direction”, time information with regard to “hour” of a 24 hour system is indicated, by a date hand a rotation center of which is arranged in “3 o’clock direction”, calendar information with regard to “date” is indicated, by a small second hand a rotation center of which is arranged in “6 o’clock direction”, time information with regard to “second” is indicated, by a day hand a rotation center of which is arranged in “9 o’clock direction”, calendar information with regard to “day” is indicated.

According to the first embodiment of the multifunction timepiece of the invention, a movement 201 includes a main plate 202. A power source portion, a circuit portion, a converter (step motor), a top train wheel, a switching mechanism and the like are arranged on a case back side (top side) of the main plate 202. A back train wheel, a calendar train wheel, a date correcting mechanism and the like are arranged on a back side of the main plate 202. A dial 204 is arranged on a glass side of the main plate 202. A winding stem 210 is arranged rotatably on 3 o’clock side of the main plate 202.

(1.2) Structure of Power Source Portion, Circuit Portion:

In reference to FIG. 3, a battery 202 constituting a power source of the multifunction timepiece is arranged on a case back side of the main plate 202. A crystal unit 222 constituting an oscillation source of the timepiece is arranged on the case back side of the main plate 202. For example, a crystal oscillator oscillated by 32,768 Hertz is contained in the crystal unit 222. A lead portion of the crystal unit 222 is fixed to a printed circuit board 224. A battery connector (+) 226 is arranged to conduct an anode of the battery 220 and a plus pattern of the printed circuit board 224. A battery connector (−) 228 is arranged to conduct the anode of the battery 220 and a minus pattern of the printed circuit board 224. The multifunction timepiece of the invention can also be constituted by a timepiece having a reference signal generating source (oscillation source) other than the crystal unit.

An oscillating portion (oscillator) for outputting a reference signal based on oscillation of the crystal oscillator, a dividing portion (divider) for dividing an output signal of the oscillating portion, a driving portion (driver) for outputting a motor drive signal for driving the step motor based on an output signal of the dividing portion are included in an integrated circuit (IC) 230. The integrated circuit (IC) 230 is constituted by, for example, C-MOS or PLA. When the integrated circuit (IC) 230 is constituted by C-MOS, the oscillating portion, the dividing portion, and the driving portion are included in the integrated circuit 230. When the integrated (IC) 230 is constituted by PLA, the oscillating portion, the dividing portion, the driving portion are constituted to be operated by a program stored to PLA. The integrated circuit 230 is fixed to the printed circuit board 224. The printed circuit board 224, the crystal unit 222, and the integrated circuit 230 constitute a circuit block.

(1.3) Structure of Step Motor:

In reference to FIG. 3 and FIG. 4, a coil block 232 including a coil wire wound around a magnetic core, a stator 234 arranged to be brought into contact with both end portions of the magnetic core of the coil block 232, and a rotor 236 including a rotor magnet arranged at a rotor hole of the stator 234 are arranged on the case back side of the main plate 202. The coil block 232, the stator 234, and the rotor 236 constitute the step motor.

(1.4) Structure of Top Train Wheel:

A fifth wheel & pinion 238 rotated based on rotation of the rotor 236 is arranged on the case back side of the main plate 202. The fifth wheel & pinion 238 includes a fifth wheel **238*b*, a fifth upper pinion 238*c*, a fifth lower pinion 238*d*. The rotor pinion is constituted to be brought in mesh with the fifth wheel 238*b*. A fourth wheel & pinion 240 rotated based on rotation of the fifth wheel & pinion 238 is arranged on the case back side of the main plate 202. A fifth pinion is constituted to be brought in mesh with a fourth wheel. A third wheel &pinion 242 rotated based on rotation of the fourth wheel & pinion 240 is arranged on the case back side of the main plate 202. A fourth pinion is constituted to be brought in mesh with a third wheel. A center wheel & pinion 244 rotated based on rotation of the third wheel & pinion 242 is arranged on the case bask side of the main plate 202. The center wheel & pinion 244 includes a center wheel 244***b* and a center pinion 244*c*. A third pinion is constituted to be brought in mesh with the second wheel 244*b*. A slip mechanism is provided between the center wheel 244*b* and the center pinion 244*c*. By providing the slip mechanism, when hands are set, a minute hand and an hour hand can be rotated by rotating the winding stem 210 in a state of stopping to rotate the top train wheel. A minute hand 244*h* is attached to the center wheel & pinion 244.

A train wheel setting lever 250 is arranged on the case back side of the main plate 202 for setting the fourth wheel & pinion 240 when hands are set by pulling the winding stem 210 to a second stage. A reset lever 252 is arranged on the case back side of the main plate 202 to reset operation of the integrated circuit 230 when hands are set by pulling the winding stem 210 to the second stage. A train wheel bridge 256 supports an upper shaft portion of the rotor 236, an upper shaft portion of the fifth wheel & pinion 238, an upper shaft portion of the fourth wheel & pinion 240, an upper shaft portion of the third wheel & pinion 242, an upper shaft portion of the center wheel & pinion 244 respectively rotatably. The main plate 202 supports a lower shaft portion of the rotor 236, a lower shaft portion of the fifth wheel & pinion 238, a lower shaft portion of the fourth wheel & pinion 240, a lower shaft portion of the third wheel & pinion 242, respectively rotatably. A center pipe 202*b* is arranged at the main plate center 202*c* of the main plate 202. An abacus bead portion of the center wheel & pinion 244 is rotatably supported by an inner diameter portion of a center hole of the center pipe 202*b*. A rotation center of the center wheel & pinion 244 is arranged at the main plate center 202*c*.

The center wheel & pinion 244 is constituted to rotate by one rotation in one hour. A minute wheel 260 rotated based on rotation of the center wheel & pinion 244 is arranged on the case back side of the main plate 202. The center pinion 244*c* is constituted to be brought in mesh with the minute wheel. An hour wheel & pinion 262 is constituted to rotate based on rotation of the minute wheel 260. The hour wheel & pinion 262 is arranged on the dial side of the main plate 202. The hour wheel & pinion 262 includes an hour wheel 262*b* and a date indicator driving pinion 262*c*. A center wheel of the minute wheel & pinion 262 is arranged to be rotatable relative to an outer peripheral portion of a cylinder portion of the center pipe 202*b*. The minute pinion is constituted to be brought in mesh with the hour wheel 262*b* of the hour wheel & pinion 262. The hour wheel & pinion 262 is constituted to rotate by one rotation in 12 hours. An hour hand 262*h* is attached to the hour wheel & pinion 262. A rotation center of the hour wheel & pinion 262 is arranged at the main plate center 202*c*. There is constructed a constitution in which by the hour hand 262*h*, time information with regard to "hour" in a style of constituting 12 hours by one turn (referred to as "12 hour system") can be indicated, by the minute hand 244*h*, time information with regard to "minute" can be indicated. By using a publicly-known center three hands train wheel mechanism as a modified example, a second wheel for center three hands (not illustrated) having a rotation center at the main plate center 202*c* can also be provided. In the case of the modified example using the center three hands train wheel mechanism, the second wheel for center three hands is constituted to rotate by one rotation in 1 minute. By a second hand (not illustrated) attached to the second hand for center three hands, time information with regard to "second" can be indicated.

(1.5) Structure of Switching Mechanism:

Next, a structure of a switching mechanism will be explained. According to the multifunction timepiece of the invention, the switching mechanism is arranged on the case back side of the main plate 202. The switching mechanism is arranged at "3-6 o'clock region". As a modified example, the switching mechanism can also be arranged on the dial side of the main plate 202. The switching mechanism, a time setting mechanism, a calendar correcting mechanism are provided for correcting indication of a calendar by setting time of the timepiece by rotating the winding stem 210 in a state of pulling out the winding stem 210. In reference to FIG. 3, FIG. 4 through FIG. 6, the switching mechanism is constituted to include a setting lever 270, a yoke 272. The setting lever 270, the yoke 272 are supported to be operable relative to the main plate 202. According to the constitution, the yoke 272 is constituted to include a yoke spring portion at one tail portion. By bringing the setting lever 270 and the yoke 272 into contact with each other, a position of the setting lever in a rotational direction thereof can be determined.

The time setting mechanism includes the winding stem 210 and a clutch wheel 274. The winding stem 210 includes a front end shaft portion, a square shaft portion, a first date corrector setting transmission wheel guide portion, a setting lever inner wall portion, a setting lever receiving portion, a setting lever outer wall portion, an outer side shaft portion and the like formed successively from a front end portion to an outer portion. The front end shaft portion of the winding stem 210 is rotatably supported by a winding stem front end guide hole of the main plate 202. An outer side portion of the setting lever outer wall portion of the winding stem 210 is rotatably supported by a winding stem outer side shaft guide hole. Or, the switching mechanism may be constituted to include the setting lever, the yoke, a yoke holder (not illustrated). According to the constitution, the position of the setting lever in the rotational direction can be determined by providing a switch spring portion at the yoke holder, providing a switch pin portion at the setting lever, providing a mountain shape portion at a front end of the switch pin portion, bringing the mountain shape portion having an elastic force into contact with the switch pin portion.

A square hole portion of the clutch wheel 274 is integrated to the square shaft portion of the winding stem 210. The portion of the setting lever 270 brought into contact with the winding stem is disposed between the setting lever inner wall portion, and the setting lever outer wall portion of the winding stem 210. A position of the winding stem 210 in a direction along a center axis line of the winding stem 210 is determined by the setting lever 270, and the yoke 272. A position of the clutch wheel 274 in the direction along the center axis line of the winding stem 210 is determined by the yoke 272. The clutch wheel 274 includes an A tooth 274*a* disposed on a side proximate to a center portion of the movement 201. A center hole portion of a first date corrector setting transmission wheel 351 is rotatably integrated to the first date corrector setting transmission wheel guide portion of the winding stem. The first date corrector setting transmission wheel 351 is constituted to be able to be brought in mesh with a second date corrector setting transmission wheel 352. A setting wheel 278 is arranged on the case back side of the main plate 202. The setting wheel 278 is rotatably supported by a setting wheel pin of the main plate 202. The minute wheel 260 is constituted to rotate by rotating the setting wheel 278.

In a state in which the winding stem 210 is disposed at 0 stage, there is constructed a constitution in which even when the winding stem 210 is rotated, the first date corrector setting transmission wheel 320 cannot be rotated and also the setting wheel 278 cannot be rotated. In a state of pulling the winding stem 210 to 1 stage, there is constructed a constitution in which the center hole portion of the first date corrector setting transmission wheel 351 can be fitted to the square shaft portion of the winding stem 210. In the state of pulling out the winding stem 210 to 1 stage, there is constructed a constitution in which the first date corrector setting wheel 351 can be rotated by rotating the winding stem 210. In a state of pulling the winding stem 210 to 2 stage, there is constructed a constitution in which the A tooth 274*a* of the clutch wheel 274 can be brought in mesh with the setting wheel 278. In the state of pulling the winding stem 210 to 2 stage, there is constructed a constitution in which by rotating the winding stem 210, the setting wheel 278 can be rotated by way of rotation of the clutch wheel 274. By rotating the setting wheel 278, there is constructed a constitution in which the center pinion of the center pinion & wheel 244 and the hour wheel 262 are rotated by way of the minute wheel 260. When hands are set in the state of pulling the winding stem 210 to 2 stage, there is constructed a constitution in which the center pinion of the center wheel & pinion 244 can be slipped relative to the center wheel of the center wheel & pinion 244.

(1.6) Structure of Date Indicating Mechanism:

Next, a structure of a date indicating mechanism will be explained. In reference to FIG. 1, FIG. 2, FIG. 4 through FIG. 6, a date indicator feed mechanism is operated based on rotation of the hour wheel 262. The date indicating mechanism includes a date indicator driving wheel 310 and a date star wheel 312. There is constructed a constitution in which by rotating the hour wheel 262, the date indicator driving wheel 310 is rotated. The date indicator driving wheel 310 is rotatably supported by a date indicator driving wheel pin provided at the main plate 202. It is preferable that a rotation center of the date indictor driving wheel 310 is arranged at a region between “5 o’clock direction” and “6 o’clock direction” (that is, “5-6 o’clock region).

The date indicator driving wheel 310 includes a date indicator driving tooth 310*b* and a date indicator driving finger 310*f*. There is constructed a constitution in which a date indicator driving pinion 262*c* of the hour wheel 262 is brought in mesh with the date indicator driving tooth 310*b* of the date indicator driving wheel 310. There is constructed a constitution in which by the date indicator driving finger 310*f* provided at the date indicator driving wheel 310, the date star wheel 312 is rotated once per 1 day (1/31). The date star wheel 312 is constituted to rotate by one rotation per 31 days. A wheel portion of the date star wheel 312 includes 31 pieces of teeth. A position in a rotational direction of the date star wheel 312 is set by a date jumper 316*b* provided at a setting lever jumper 316. It is preferable to arrange a setting portion provided at a front end of a spring portion of the date jumper 316*b* in a region between “2 o’clock direction” and “3 o’clock direction” (that is, “2-3 o’clock region”).

A rotation center of the date star wheel 312 is arranged in “3 o’clock direction”. Therefore, the rotation center of the date star wheel 312 is arranged on the center axis line of the winding stem 210. A lower shaft portion of the date star wheel 312 is rotatably supported by the main plate 202. A portion of a date corrector setting transmission wheel holder 314 disposed on a lower side of the date star wheel 312 is narrowed in a circular shape to a back face of the main plate 202. It is preferable that a hole provided at a center of the circular shape narrowing portion of the date corrector setting transmission wheel holder 314 is fitted to a date corrector setting transmission wheel holder guide shaft portion provided at a surrounding of a date star wheel guide hole. A date hand 312*h* is attached to an upper shaft portion of the date star wheel 312. A wheel portion of the date star wheel 312 is arranged between the date corrector setting transmission wheel holder 314 and the setting lever jumper 316 disposed on the dial side of the main plate 202. A character, a numeral, an abbreviated character or the like for indicating date is provided at the dial 204. There is constructed a constitution in which by the date hand 312*h*, a character, a numeral, an abbreviated character or the like, information with regard to “date” constituting one of calendar information can be indicated.

(1.7) Structure of Day Indicating Mechanism:

Next, a structure of a day indicating mechanism will be explained. In reference to FIG. 1, FIG. 2, FIG. 4 and FIG. 5, a day wheel feed mechanism is constituted to operate based on rotation of the hour wheel 262. The day indicating mechanism includes a day indicator driving wheel 320, a small day wheel 322. By rotation of the hour wheel 262, the day indicator driving wheel 320 is constituted to rotate. The day indicator driving wheel 320 is rotatably supported by a day indicator driving wheel pin provided at the main plate 202. It is preferable to arrange a rotation center of the day indicator driving wheel 320 at a region between “10 o’clock direction” and “11 o’clock direction” (that is, “10-11 o’clock region”).

The day indicator driving wheel 320 includes a day indicator driving tooth 320*b* and a day feed finger 320*f*. The day indicator driving wheel finger 262*c* of the hour wheel 262 is constituted to be brought in mesh with the day indicator driving wheel tooth 320*b* of the day indicator driving wheel 320. By the day indicator driving finger 320*f* provided at the day indicator driving wheel 320, the small day wheel 322 is constituted to rotate once per one day (1/7). A wheel portion of the small day wheel 322 includes 7 pieces of teeth. The small day wheel 322 is constituted to rotate by one rotation per 7 days. A position in a rotational direction of the small day wheel 322 is set by a day jumper 316*c* provided at the setting lever jumper 316. It is preferable to arrange a setting portion provided at a front end of a spring portion of the day jumper 316*c* in a region between “8 o’clock direction” and “9 o’clock direction” (that is, “8-9 o’clock region”).

A rotation center of the small day wheel 322 is arranged in “9 o’clock direction”. Therefore, the rotation center of the small day wheel 322 is arranged on an extension of the center axis line of the winding stem 210. A lower shaft portion of the small day wheel 322 is rotatably supported by the main plate 202. A day hand 322*h* is attached to an upper shaft portion of the small day wheel 322. A wheel portion of the small day wheel 322 is arranged between the main plate 202 and the setting lever jumper 316. A day character, a numeral, an abbreviated character or the like for indicating day is provided at the dial 204. There is constructed a constitution in which by the day hand 322*h*, a character, a numeral, an abbreviated character or the like, information with regard to “day” constituting one of calendar information can be indicated.

(1.8) Structure of 24 Hour Indicating Mechanism:

Next, a structure of a 24 hour indicating mechanism will be explained. In reference to FIG. 1, the 24 hour indicating mechanism is constituted to operate based on rotation of the day indicator driving wheel 320. The 24 hour indicating mechanism includes an hour indicator 330. By rotating the hour wheel 262, the hour indicator 330 is constituted to rotate by way of rotation of the day indicator driving wheel 320. A lower shaft portion provided at the hour indicator 330 is rotatably supported by an hour indicator guide hole provided at the main plate 202. It is preferable to arrange a rotation center of the hour indicator 330 in "12 o'clock direction". The day indicator driving gear 320*b* provided at the day indicator driving wheel 320 is constituted to be brought in mesh with a tooth portion 330*b* of the hour indicator 330. The hour indicator 330 is constituted to rotate by one rotation in 24 hours.

A wheel portion of the hour indicator 330 is arranged between the main plate 202 and the setting lever jumper 316. A 24 hour hand (not illustrated: mentioned later) is attached to an upper shaft portion of the day indicator 330. A character, a numeral, an abbreviated character or the like for indicating "hour" is provided at the dial 204 in a style of constituting 24 hours by one turn (referred to as "24 hour system"). There is constructed a constitution in which by a 24 hour hand and a numeral or the like, information with regard to "hour" constituting time information can be indicated.

(1.9) Structure of Second Indicating Mechanism:

Next, a structure of a second indicating mechanism will be explained. In reference to FIG. 1 and FIG. 4, there is constructed a constitution in which the second indicating mechanism is operated based on rotation of the fifth wheel & pinion 238. The second indicating mechanism includes a second indicator 340. A wheel portion of the second indicator 340 is constituted to be brought in mesh with the fifth lower pinion 238*d*. There is constructed a constitution in which by rotating the rotor 236, the second indicator 340 is rotated by way of rotation of the fifth wheel &pinion 238. A lower shaft portion of the second indicator 340 is rotatably supported by the main plate 302. An upper shaft portion of the second indicator 340 is rotatably supported by a second indicator bridge 342. It is preferable to arrange the second indicator bridge 342 so as not to overlap the date indicator driving wheel 310. It is preferable to arrange a rotation center of the second indicator 340 in "6 o'clock direction". The second indicator 340 is constituted to rotate by one rotation in 1 minute.

A wheel portion of the second indicator 340 is arranged between the main plate 202 and the second indicator bridge 342. A small second hand (not illustrated: mentioned later) is attached to a front end portion of an upper shaft portion of the second indicator 340. A character, a numeral, an abbreviated character or the like for indicating "second" is provided at the dial 204. There is constructed a constitution in which by a small second hand and a numeral or the like, information with regard to "second" constituting time information can be indicated. As has been explained above, the first embodiment of the invention includes a date star wheel 312 a rotation center of which is arranged in "3 o'clock direction", a small day wheel 322 a rotation center of which is arranged in "9 o'clock direction", the second indicator 340 the rotation center of which is arranged in "6 o'clock direction", and the hour indicator 330 the rotation center of which is arranged in "12 o'clock direction".

(1.10) Structure of Date Correcting Mechanism:

Next, a structure of a date correcting mechanism will be explained. In reference to FIG. 1, FIG. 2, FIG. 4 through FIG. 6, a back side of the movement 201 is provided with the date correcting mechanism for correcting indication of date by the date star wheel 312. The date correcting mechanism is constituted by a first corrector setting transmission wheel 351, the second corrector setting transmission wheel 352, a third corrector setting transmission wheel 353, a fourth corrector setting transmission wheel 354, a date corrector setting wheel 355. In a state of setting the winding stem 210 to 1 stage, the first corrector setting transmission wheel 351 is rotatably supported by a first corrector setting transmission wheel guide portion of the winding stem 210. That is, the first corrector setting transmission wheel 351 and the winding stem 210 are arranged to be coaxial with each other. The second corrector setting transmission wheel 352 is rotatably supported by the main plate 202. A wheel portion of the second corrector setting transmission wheel 352 is arranged between the main plate 202 and the date corrector setting wheel holder 314. A rotation center of the second corrector setting transmission wheel 352 is arranged in "3 o'clock direction". Therefore, the rotation center of the second corrector setting transmission wheel 352 is arranged on the center axis line of the winding stem 210. It is preferable to arrange the rotation center of the second corrector setting transmission wheel 352 at a position the same as that of the rotation center of the date star wheel 312.

The third corrector setting transmission wheel 353 is rotatably supported by the main plate 202. A wheel portion of the third corrector setting transmission wheel 353 is arranged between the main plate 202 and the date corrector setting wheel holder 314. It is preferable to arrange the rotation center of the third corrector setting transmission wheel 353 in "2 o'clock direction", or a region between "2 o'clock direction" and "3 o'clock direction" (that is, "2-3 o'clock region"). A lower shaft of the fourth corrector setting transmission wheel 354 is movably and rotatably supported by a fourth corrector setting transmission wheel guide long hole provided at the main plate 202. A wheel portion of the fourth corrector setting transmission wheel 354 is arranged between the main plate 202 and the date corrector setting transmission wheel holder 314. It is preferable to arrange the fourth corrector setting transmission wheel guide long hole for guiding the lower shaft of the fourth corrector setting transmission wheel 354 at a region between "1 o'clock direction" and "2 o'clock direction" (that is, "1-2 o'clock region"). A correcting spring portion 314*b* for pressing the fourth corrector setting transmission wheel 354 to the main plate 202 is provided at the date corrector transmission wheel holder 314. A center hole of the second corrector setting transmission wheel 352 is rotatably supported by a second corrector setting transmission wheel guide shaft portion provided at the main plate 202. A date star wheel guide hole for the date star wheel 312 is provided on an inner side of the second corrector setting transmission wheel guide shaft portion. A center axis line of the date star guide hole and a center axis line of the second corrector setting transmission wheel guide shaft portion can be constituted to coincide with each other. The third corrector setting transmission wheel 353 is rotatably supported by a third corrector setting transmission wheel guide shaft portion in a ring-like shape provided at the main plate 202.

The date corrector setting wheel 353 is rotatably supported by a date corrector setting wheel pin provided at the main plate 202. A wheel portion of the date corrector setting wheel 353 is arranged between the main plate 202 and the setting lever jumper 316. A wheel portion of the date corrector setting wheel 355 is constituted to be brought in mesh with a wheel portion of the date star wheel 312. The wheel portion of the date star wheel 312 is arranged between the date corrector transmission wheel holder 314 and the setting lever jumper 316. It is preferable to arrange a rotation center of the date corrector setting wheel 355 in a region between "1 o'clock direction" and "2 o'clock direction" (that is, 1-2 o'clock region"). When by rotating the winding stem 210 in one direction, the fourth corrector setting transmission wheel 354 is moved in a direction of being proximate to the date corrector setting wheel 355 by way of rotation of the first corrector setting transmission wheel 351, the second corrector setting transmission wheel 352, the third corrector setting transmission wheel 353, there is constructed a constitution in which the wheel portion of the fourth corrector setting transmission wheel 354 can be brought in mesh with the wheel portion of the date corrector setting wheel 355. When the winding stem 210 is rotated in other direction, and the fourth corrector setting transmission wheel 354 is moved in a direction of being remote from the date corrector setting wheel 355 by way of rotation of the first corrector setting transmission wheel 351, the second corrector setting transmission wheel 352, the third corrector setting transmission wheel 353, there is constructed a constitution in which the wheel portion of the fourth corrector setting transmission wheel 354 is not brought in mesh with the wheel portion of the date corrector setting wheel 355.

(1.11) Structure of Main Plate:

Next, a structure of the main plate 202 will be explained. In reference to FIG. 7, according to the embodiment, an outer shape of the main plate 202 is formed substantially in a circular shape centering on the main plate center 202*c*. Further, the outer shape of the main plate 202 may be constituted by other shape of a quadrangular shape, a polygonal shape, an elliptical shape or the like. The main plate 202 may be formed by an engineering plastic of polycarbonate, polysulfone or the like, or may be formed by a metal of brass or the like. The rotation center of the center wheel & pinion 244 and the rotation center of the hour wheel 262 are arranged at the main plate center 202*c*. The center axis line of the center pipe 202*b* is arranged at the main plate center 202*c*.

The main plate 202 includes rotation centers of rotating members of a rotation center 202RT of the rotor 236, a rotation center 202FW of the fifth wheel & pinion 238, a rotation center (not illustrated) of the fourth wheel & pinion 240, a rotation center (not illustrated) of the third wheel & pinion 242, a rotation center 202HW of the minute wheel 260, a rotation center of the setting wheel 278 (not illustrated), a rotation center 202DW of the date indicator driving wheel 310, a rotation center 202DS of the date star wheel 312, a rotation center 202WT of the day indicator driving wheel 320, a rotation center 202SW of the small day wheel 322, a rotation center 202HG of the hour indicator 330, a rotation center 202BW of the second indicator 340, a rotation center 202SA of the third corrector setting transmission wheel 353, a rotation center 202SB of the date corrector setting wheel 355 and the like. It is preferable that the rotation center of the second corrector setting transmission wheel 352 is arranged at a position the same as that of the rotation center 202DS of the date star wheel 312. Further, the main plate 202 includes a fourth corrector setting transmission wheel guide long hole 202SL for movable guiding the lower shaft of the fourth corrector setting transmission wheel 354.

The respective rotation centers are formed with guide shaft portions for guiding center holes of the rotating members, or formed with guide holes for guiding shaft portions of the rotating members in order to support the rotating members rotated centering on the rotation centers rotatably. The guide shaft portions, the guide holes constitute guiding portions for rotatably guiding the rotating members. As described later, the main plate 202 includes rotation centers for rotatably supporting respective rotating members used in other embodiment of the invention.

As explained above, the movement 201 includes a first train wheel rotation center for a train wheel used in fabricating the multifunction timepiece of a first type having an arrangement of a first type of a small hand. The first train wheel rotation center is arranged at a position between the main plate center 202*c* of the main plate 202 and a main plate outer shape portion of the main plate 202. The first train wheel rotation center is provided with a guide hole or a guide bearing for rotatably guiding a train wheel member rotated centering on the position. Further, the movement 201 includes a second train wheel rotation center for a train wheel used in fabricating the multifunction timepiece of a second type having an arrangement of a second type of a small hand by using the movement 201. The second train wheel rotation center is arranged at a position between the main plate center 202*c* of the main plate 202 and the main plate outer shape portion of the main plate 202. The second train wheel rotation center is provided with a train wheel guide portion (guide hole, guide bearing, guide shaft, guide pin or the like) for rotatably guiding a train wheel member rotated centering on the position.

(1.12) Structure of Date Corrector Setting Transmission Wheel Holder:

Next, a structure of the date corrector setting transmission wheel holder 314 will be explained. In reference to FIG. 8, the date corrector setting transmission wheel holder 314 is arranged at "12-3 o'clock region" and "3-6 o'clock region". The date corrector setting transmission wheel holder 314 is a plate-like member formed by an elastic material of stainless steel, phosphor bronze or the like. The correcting spring portion 314*b* for pressing the fourth corrector setting transmission wheel 354 to the main plate 202 is provided at the date corrector setting transmission wheel holder 314. It is preferable to arrange the correcting spring portion 314*b* at a region between "12 o'clock direction" and "3 o'clock direction" (that is, "12-3 o'clock region"). It is preferable to arrange the front end portion of bringing the correcting spring portion 314*b* into contact with the fourth corrector setting transmission wheel 354 at a region between "12 o'clock direction" and "1 o'clock direction" (that is, "12-1 o'clock region"). Further, it is preferable to construct a constitution in which a portion of the date corrector setting transmission wheel holder 314 disposed on the lower side of the date star wheel 312 is narrowed in the circular shape to the back face of the main plate 202, and the hole provided at the center of the circular shape narrowed portion is fitted to the date corrector setting transmission wheel holder guide shaft portion provided at a surrounding of the date star wheel guide hole. The date corrector setting transmission wheel holder 314 further includes a correcting spring portion 314*b*2 used in other embodiment of the invention.

(1.13) Structure of Setting Lever Jumper:

Next, a structure of the setting lever jumper 316 will be explained. In reference to FIG. 9, the setting lever jumper 316 is a plate-like member formed by an elastic material of stainless steel, phosphor bronze or the like. The date jumper 316*b* for setting the position in the rotational direction of the date star wheel 312 is provided at the setting lever jumper 316. It is preferable to arrange a spring portion of the date jumper 316*b* at a region between "12 o'clock direction" and "3 o'clock direction" (that is, "12-3 o'clock region"). It is preferable to arrange a setting portion provided at a front end of a spring portion of the date jumper 316*b* at a region between "2 o'clock direction" and "3 o'clock direction" (that is, "2-3 o'clock region"). A day jumper 316*c* for setting a position in a rotational direction of the small day wheel 322 is provided at the setting lever jumper 316. It is preferable to arrange a spring portion of the day jumper 316*c* at a region between "6 o'clock direction" and "9 o'clock direction" (that is, "6-9 o'clock region"). It is preferable to arrange a setting portion arranged at a front end of a spring portion of the day jumper 316*c* at a region between "8 o'clock direction" and "9 o'clock direction" (that is, "8-9 o'clock region"). The setting lever jumper 316 further includes a date jumper 316*b*2 and a day jumper 316*c*2 used in other embodiment of the invention.

(1.14) Operation of Step Motor, Train Wheel, Date Feeding Mechanism, Day Feeding Mechanism or the Like:

Operation of the first embodiment of the multifunction timepiece of the invention will be explained as follows. In reference to FIG. 1, FIG. 4, FIG. 5, in the movement 201, the crystal oscillator contained in the crystal unit 222 is oscillated by, for example, 32,768 Hertz. Based on the oscillation of the crystal oscillator, an oscillating portion included in the integrated circuit 230 outputs the reference signal and the dividing portion divides the output signal of the oscillating portion. The driving portion outputs the motor drive signal for driving the step motor based on the output signal of the dividing portion. When the coil block 232 inputs the motor drive signal, a stator 234 is magnetized to rotate the rotor 236. The rotor 236 is rotated by, for example, 180 degrees per 1 second. Based on rotation of the rotor 236, the fourth wheel & pinion 240 is rotated by way of rotation of the fifth wheel & pinion 238. Further, based on rotation of the rotor 236, the second indicator 340 is rotated by one rotation per 1 minute by way of rotation of the fifth wheel & pinion 238. The third wheel & pinion 242 is rotated based on rotation of the fourth wheel & pinion 240.

In reference to FIG. 1 through FIG. 6, the center wheel & pinion 244 is rotated by one rotation in 1 hour based on rotation of the third wheel & pinion 242. The minute wheel 260 is rotated based on rotation of the center wheel & pinion 244. The hour wheel 262 is rotated based on rotation of the minute wheel 260. The hour wheel 262 is rotated by one rotation per 12 hours. By rotation of the hour wheel 262, the date indicator driving wheel 310 is rotated. By the date indicator feeding finger 310*f* provided at the date indicator driving wheel 310, the date star wheel 312 is constituted to rotate by once per 1 day (1/31). The date star wheel 312 is constituted to rotate by one rotation per 31 days. By rotation of the hour wheel 362, the day indicator driving wheel 320 is rotated. By the day indicator feeding finger 320*f* provided at the day indicator driving wheel 320, the small day wheel 322 is rotated by once per 1 day (1/7). Therefore, the small day wheel 322 is rotated by one rotation per 7 days. Further, by rotation of the day indicator driving wheel 320, the hour indicator 330 is rotated. The hour indicator 330 is rotated by one rotation per 24 hours.

(1.15) Operation of Date Correcting Mechanism:

Operation of the date correcting mechanism will be explained as follows.

In reference to FIG. 1, FIG. 2, FIG. 4 through FIG. 6, in the state of pulling the winding stem 210 from 0 stage to 1 stage, when the winding stem 210 is rotated in one direction, the fourth corrector setting transmission wheel 354 is moved in the direction of being proximate to the date corrector setting wheel 355 by way of rotation of the first corrector setting transmission wheel 351, the second corrector setting transmission wheel 352, the third corrector setting transmission wheel 353, then, the wheel portion of the fourth corrector setting transmission wheel 354 can be brought in mesh with the wheel portion of the date corrector setting wheel 355. Therefore, in the state of pulling the winding stem 210 to 1 stage, by rotating the winding stem 210 in one direction, date can be corrected by rotating the date star wheel 312.

In the state of pulling the winding stem 210 to 1 stage, when the winding stem 210 is rotated in other direction, the fourth corrector setting transmission wheel 354 is moved in the direction of being remote from the date corrector setting wheel 355 by way of rotation of the first corrector setting transmission wheel 351, the second corrector setting transmission wheel 352, the third corrector setting transmission wheel 353. Under the state, the wheel portion of the fourth corrector setting transmission wheel 354 is not brought in mesh with the wheel portion of the date corrector setting wheel 355. Therefore, even when the winding stem 210 is rotated in other direction in the state of pulling the winding stem 210 to 1 stage, the date star wheel 312 cannot be rotated and date cannot be corrected.

(1.16) Hand Setting Operation:

Hand setting operation will be explained as follows. In reference to FIG. 4, in a state of pulling the winding stem 210 to 2 stage, the A tooth 274*a* of the clutch wheel 274 is brought in mesh with the setting wheel 278. When the winding stem 210 is pulled to 2 stage, the spring portion of the train wheel setting lever 250 is rotated to be brought into contact with the reset lever 252. Thereby, the spring portion of the train wheel setting lever 250 is conducted to a reset pattern of the printed circuit board 224 by way of the reset lever 252 to reset operation of the integrated circuit 230, at the same time, the train wheel setting lever 250 sets the fourth wheel & pinion 240. In the state of pulling the winding stem 210 to 2 stage, by rotating the winding stem 210, the setting wheel 278 is rotated by way of the rotation of the clutch wheel 274. By rotating the setting wheel 278, the center pinion of the center wheel & pinion 244 and the hour wheel 262 are rotated by way of rotation of the minute wheel 260. When hands are set in the state of pulling the winding stem 210 to 2 stage, the center pinion of the center wheel & pinion 244 can be slipped relative to the center wheel of the center wheel & pinion 244. By rotating the winding stem 210, the center pinion is rotated, thereby, the minute hand 244*h* is rotated, by rotating the hour wheel 262, the hour hand 262*h* is rotated, and therefore, time indication (indication of "hour" and "minute") can be corrected.

(1.17) Explanation of Hand Position and Hand Specification:

In reference to FIG. 10, according to the embodiment of the invention, as an example, 8 kinds (first kind through eighth kind) of hand positions and hand specifications can be realized. Further, the invention is not limited to 8 kinds of hand positions and hand specifications shown in FIG. 10. In reference to FIG. 10 and FIG. 11, in the first kind of the embodiment of the invention, time information with regard to "hour" of the 12 hour system can be indicated by the hour hand 262*h* attached to the hour wheel 262 the rotation center of which is the main plate center 202*c*, time information with regard to "minute" can be indicated by the minute hand 244*h* attached to the center wheel & pinion 244 the rotation center of which is the main plate center 202, time information with regard to "second" can be indicated by the small second hand 340*h* attached to the second indicator 340 the rotation center of which is arranged in "6 o'clock direction", time information with regard to "hour" of the 24 hour system can be indicated by the 24 hour hand 330*h* attached to the hour indicator 330 the rotation center of which is arranged in "12 o'clock direction", calendar information with regard to "date" can be indicated by the date hand 312*h* attached to the date star wheel 312 the rotation center of which is arranged in "3 o'clock direction", and calendar information with regard to "day" can be indicated by the day hand 322*h* attached to the small day wheel 322 the rotation center of which is arranged in "9 o'clock direction". It is preferable to construct a constitution such that a distance from the main plate center 202*c* to the rotation center of the date hand 312*h*, a distance from the main plate center 202*c* to the rotation center of the small second hand 340*h*, a distance from the main plate center 202*c* to the rotation center of the day hand 322*h*, and a distance from the main plate center 202*c* to the rotation center of the 24 hour hand 330*h* are equal. However, the distances between the centers can also be constituted not to be equal to each other.

Characters, numerals, abbreviated characters or the like for indicating the respective time information, calendar information are provided at the dial 204. For example, in order to indicate the time information with regard to "hour" of the 24 hour system, numerals of "6", "12", "18", "24" are provided on a circumference at positions in correspondence with the 24 hour hand 330*h* of the dial 204. For example, in order to indicate the calendar information with regard to "date", numerals of "10", "20", "31" are provided on a circumference at positions in correspondence with the date hand 312*h* of the dial 204. For example, in order to indicate the time information with regard to "second", numerals of "10", "20", "30", "40", "50", "60" are provided on a circumference at positions in correspondence with the small second hand 340*h* of the dial 204. For example, in order to indicate the calendar information with regard to "day", English letters of "Sun", "Mon", "Tue", "Wed", "Thu", "Fri", "Sat" are provided on a circumference at positions in correspondence with the day hand 322*h* of the dial 204. Or, in order to indicate the calendar information with regard to "day", numeral, Japanese characters, foreign language letters, Roman numerals, signs or the like can also be used.

In reference to FIG. 10 and FIG. 12, in the second kind of the embodiment of the invention, by omitting the hour indicating wheel 330, the 24 hour hand 330*h*, time information with regard to "hour" of the 12 hour system can be indicated by the hour hand 262*h*, the time information with regard to "minute" can be indicated by the minute hand 244*h*, the time information with regard to "second" can be indicated by the small second hand 340*h* attached to the second indicator 340 the rotation center of which is arranged in "6 o'clock direction", the calendar information with regard to "date" can be indicated by the hour hand 312*h* attached to the date star wheel 312 the rotation center of which is arranged in "3 o'clock direction", and the calendar information with regard to "day"can be indicated by the day hand 322*h* attached to the small day wheel 322 the rotation center of which is arranged in "9 o'clock direction".

In reference to FIG. 10 and FIG. 13, in the third kind of the embodiment of the invention, by omitting the date star wheel 312, the date hand 312*h*, the small day wheel 322, the day hand 322*h*, the time information with regard to "hour" of the 12 hour system can be indicated by the hour hand 262*h*, the time information with regard to "minute" can be indicated by the minute hand 244*h*, the time information with regard to "second" can be indicated by the small secondhand 340*h* attached to the second indicator 340 the rotation center of which is arranged in "6 o'clock direction", the time information with regard to "hour" of the 24 hour system can be indicated by the 24 hour hand 330*h* attached to the hour indicator 330 the rotation center of which is arranged in "12 o'clock direction".

In reference to FIG. 10 and FIG. 14, in the fourth kind of the embodiment of the invention, by omitting the second indicator 340, the small hand 340*h*, the hour indicator 330, the 24 hour hand 330*h*, the time information with regard to "hour" of the 12 hour system can be indicated by the hour hand 262*h*, the time information with regard to "minute" can be indicated by the minute hand 244*h*, the calendar information with regard to "date" can be indicated by the date hand 312*h* attached to the date star wheel 312 the rotation center of which is arranged in "3 o'clock direction", and the calendar information with regard to "day" can be indicated by the day hand 322*h* attached to the small day wheel 322 the rotation center of which is arranged in "9 o'clock direction".

In reference to FIG. 10 and FIG. 15, in the fifth kind of the embodiment of the invention, by omitting the hour indicating wheel 330, the 24 hour hand 330*h*, the date star wheel 312, the date hand 312*h*, the small day wheel 322, the day hand 322*h*, the time information with regard to "hour" of the 12 hour system can be indicated by the hour hand 262*h*, the time information with regard to "minute" can be indicated by the minute hand 244*h*, and the time information with regard to "second" can be indicated by the small second hand 340*h* attached to the second indicator 340 the rotation center of which is arranged in "6 o'clock direction". Further, the sixth kind through the eighth kind of the embodiment of the invention illustrated in FIG. 10 will be described later.

(1.18) Embodiment of Mechanical Type Timepiece:

Although an explanation has been given of the embodiment of the multifunction timepiece of the invention with regard to the movement of the analog electronic timepiece, according to the invention, the movement can also be constituted by the mechanical type timepiece with regard to any embodiment. As a modified example, in reference to FIG. 16 through FIG. 18, in an embodiment of a mechanical type timepiece of a multifunction timepiece of the invention, a movement 20 includes a main plate 22 constituting a base plate of the movement 20. According to the embodiment of the invention, a top train wheel of a barrel complete, a center wheel & pinion, a third wheel & pinion, a fourth wheel & pinion and the like, an automatic winding mechanism of an oscillating weight, a pawl lever and the like, a switching mechanism of a barrel complete, a yoke and the like are respectively integrated to a top side of the movement 20. In the embodiment of the mechanical type timepiece, a structure on a back side of the movement can be constituted similar to the structure on the back side of the movement of the analog electronic timepiece shown in FIG. 1 and FIG. 2.

A structure of a train wheel will be explained. A center wheel & pinion 24 is rotatably integrated to substantially a center of the main plate 22. The center wheel & pinion 24 is integrated between the main plate 22 and a second bridge 26. A cannon pinion 28 is integrated to a dial side of the main plate 22 to be able to slip relative to an outer peripheral portion of the center wheel & pinion 24 contiguous to a front end on a side proximate to a hand attaching portion thereof. The cannon pinion 28 is rotated integrally with the center wheel & pinion 24. A barrel complete 30 is rotatably integrated between the main plate 22 and a first bridge 32. A barrel wheel of the barrel complete 30 is brought in mesh with a center pinion of the center wheel & pinion 24. A third wheel & pinion 34 is rotatably integrated between the main plate 22 and the first bridge 32. A center wheel of the center wheel & pinion 24 is constituted to be brought in mesh with a third pinion. A fourth wheel & pinion 40 is rotatably integrated between the second bridge 26 and the first bridge 32. A third wheel of the third wheel & pinion 34 is constituted to be brought in mesh with a fourth pinion of the fourth wheel & pinion 40. An escape wheel & pinion 50 is rotatably integrated between the main plate 22 and the first bridge 32. A fourth wheel of the fourth wheel & pinion 40 is constituted to be brought in mesh with an escape pinion of the escape wheel & pinion 50. Here, a number of train wheels is not limited to the above-described but one or more of transmission wheels may further be added.

Next, a structure of an escapement and speed control mechanism will be explained. In reference to FIG. 16 through FIG. 18, a pallet fork 60 is pivotably integrated between the main plate 22 and a pallet bridge 62. The pallet fork 60 includes twos claw jewels 63 and tips 64. An escape wheel of the escape wheel & pinion 50 is engaged with the claw jewel 63. A balance with hairspring 70 is rotatably integrated between the main plate 22 and a balance bridge 72. In reference to FIG. 18, the balance with hairspring 70 includes a balance stem 71, a hairspring 74, an oscillating jewel 76, a hairspring ball 78, a balance ring 79. The tip 64 of the pallet fork 60 is constituted to be engaged with the oscillating jewel 76. A center portion of the balance ring 79 is fixed to the balance stem 71. An inner end portion of the hairspring 74 is fixed to the hairspring ball 78 fixed to the balance stem 71. An outer peripheral portion **74*g* of the hairspring 74 is attached to a hairspring holder 72*b*. The hairspring holder 72*b* is attached to a hairspring holder bridge 72*a*. The hairspring holder bridge 72*a* is attached to the balance bridge 72**.

Next, a structure of aback train wheel will be explained. In reference to FIG. 17, FIG. 20, an hour wheel 80 is rotatably integrated to a side of the main plate 22 having a dial 82. A minute wheel & pinion 90 is rotatably integrated to the side of the main plate 22 having the dial 82. The minute wheel of the minute wheel & pinion 90 is brought in mesh with the cannon pinion 28. A minute pinion of the minute wheel & pinion 90 is constituted to be brought in mesh with the hour wheel 80. Further, the date indicator driving wheel 310 (refer to FIG. 1) can be constituted to rotate by rotating the hour wheel 80. Further, the day indicator driving wheel 320 (refer to FIG. 1) can be constituted to rotate by rotating the hour wheel 80.

In reference to FIG. 16 through FIG. 18, an oscillating weight 100 is rotatably integrated to the first bridge 32. The oscillating weight 100 is integrated to the first bridge 32 by way of a ball bearing (not illustrated). A first transmission wheel (not illustrated) is rotatably integrated to be brought in mesh with a pinion (not illustrated) of the oscillating weight 100. A pawl lever (not illustrated) is rotatably integrated to an eccentric cam portion (not illustrated) of the first transmission wheel. A second transmission wheel (not illustrated) is rotatably integrated to a pawl lever to be engaged with a pawl portion (not illustrated). A ratchet tooth (not illustrated) of the second transmission wheel is constituted to be engaged with the pawl portion of the pawl lever. There is constructed a constitution in which the first transmission wheel (not illustrated) is rotated based on rotation of the oscillating weight 100, and based on operation of the pawl lever, the second transmission wheel is rotated only in a predetermined direction. Based on rotation of the second transmission wheel (not illustrated), a mainspring is constituted to wind.

In reference to FIG. 16, FIG. 19 through FIG. 21, it is preferable to fabricate a yoke holder 140 by an elastically deformable material, for example, fabricate by stainless steel. It is preferable to fabricate a yoke 130 by an elastically deformable material, for example, fabricated by stainless steel. A spring portion 132 of the yoke 130 may be constituted by any shape of a linear shape, a bent shape, a U-like shape or the like. A mountain portion 142 of the yoke holder 140 is engaged with a positioning pin 122 of a setting lever 120 to determine a position of the setting lever 120 and sets a switch weight of the winding stem 110. According to the mechanical type timepiece of the invention, the mountain portion 142 of the yoke holder 140 is constituted to be able to pull the winding stem 110 to 1 stage, and 2 stage. By a spring force of the spring portion 132 of the yoke 130, a guide valley portion 138 of the yoke 130 is pressed to a side face of a front end portion of the setting lever 120.

Next, operation of the mechanical type timepiece of the invention will be explained. In reference to FIG. 16 through FIG. 18, by a force of the mainspring (not illustrated), the barrel complete 30 is rotated. The center wheel & pinion 24 is rotated by rotation of the barrel complete 30. The third wheel & pinion 34 is rotated by rotation of the center wheel &pinion 24. The fourth wheel & pinion 40 is rotated by rotation of the third wheel & pinion 34. Further, the cannon pinion 28 is simultaneously rotated by rotation of the center wheel &pinion 24. The minute wheel & pinion 90 is rotated by rotation of the cannon pinion 28. The hour wheel 80 is rotated by rotation of the minute wheel & pinion 90. Rotational speeds of the respective train wheels are controlled by operation of the balance with hairspring 70, the pallet fork 60 and the escape wheel &pinion 50. As a result, the fourth wheel &pinion 40 is rotated by one rotation in 1 minute. The cannon pinion 28 and the center wheel & pinion 24 are rotated by one rotation in 1 hour. The hour wheel 80 is rotated by one rotation in 12 hours.

"Second" is indicated by a second hand **40*h* attached to the fourth wheel & pinion 40. "Minute" is indicated by a minute hand 28*h* attached to the cannon pinion 28. "Hour" is indicated by an hour hand 80*h* attached to the hour wheel 80. That is, the fourth wheel & pinion 40, the cannon pinion 28 and the center wheel & pinion 24, the hour wheel 80 constitute indicators for indicating time information. Time can be read by the hour hand 80*h*, the minute hand 28*h*, the second hand 40*h*, graduations of the dial 82 and the like. Next, an explanation will be given of winding the mainspring by the automatic winding mechanism. The mechanical type timepiece is carried by the arm and the arm is swung forward/rearward. The mainspring can be wound by rotation of an automatic winding transmission wheel (not illustrated) or the like having ratchet teeth by operating the pawl lever as in operating an eccentric cam based on rotation of the oscillating weight 100**.

Next, operation of a switching mechanism will be explained. In reference to FIG. 16, FIG. 19 through FIG. 21, normally, when the mechanical type timepiece is carried by the arm, the winding stem 110 is disposed at 0 stage. Next, when the calendar is corrected, the winding stem 110 is pulled to 1 stage. At this occasion, the setting lever 120 is rotated. The yoke 130 is rotated by a spring force of the yoke to bring a B tooth **162*b* of the clutch wheel 162 in mesh with the first corrector setting transmission wheel 170. When the winding stem 110 is rotated under the state, the clutch wheel 162 is rotated, by rotation of the first corrector setting transmission wheel 170, the fourth corrector setting transmission wheel 354 is moved in the direction of being proximate to the date corrector setting wheel 355 by way of rotation of the second corrector setting transmission wheel 352, the third corrector setting transmission wheel 353, then, the wheel portion of the fourth corrector setting transmission wheel 354 can be brought in mesh with the wheel portion of the date corrector setting wheel 355. Therefore, date can be corrected by rotating the date star wheel 312 by rotating the winding stem 110 in one direction in a state of pulling the winding stem 210** to 1 stage.

Next, when time is corrected, the winding stem 110 is pulled further to 2 stage. At this occasion, the setting lever 120 is further rotated. The yoke 130 is rotated in a direction reverse to the direction of the rotation by a spring force of the yoke to bring the A tooth **162*a* of the clutch wheel 162 in mesh with the hour wheel 90. When the winding stem 110 is rotated under the state, the clutch wheel 162 is rotated, time indication can be corrected by rotating the cannon pinion 28 and the hour wheel 80 by rotating the minute wheel 90**.

In reference to FIG. 1 through FIG. 6, FIG. 16 through FIG. 20, the hour wheel 80 is rotated based on rotation of the minute wheel 90. The hour wheel 80 is rotated by one rotation in 12 hours. By rotation of the hour wheel 80, the date indicator driving wheel 310 is rotated. By the date feed finger 310*f* provided at the date indicator driving wheel 310, the date star wheel 312 is rotated by once per 1 day (1/31). The date star wheel 312 is constituted to rotate by one rotation in 31 days. By rotation of the hour wheel 262, the day indicator driving wheel 320 is rotated. By the day feed finger 320*f* provided at the day indicator driving wheel 320, the small day wheel 322 is rotated once per 1 day (1/7). The small day wheel 322 is rotated by one rotation in 7 days. Further, by rotation of the day indicator driving wheel 320, the hour indicator 330 is rotated. The hour indicator 330 is rotated by one rotation in 24 hours. According to a constitution of indicating "second" by the second hand 40*h* provided at the fourth wheel & pinion 40, the second indicator 340, the small second hand 340*h* can be omitted. Or, in a constitution of indicating "second" by the small second hand 340*h*, the second hand 40*h* can be omitted.

(2) Second Embodiment

Next, a second embodiment of a multifunction timepiece of the invention will be explained. In the following explanation, a description will mainly be given of a point by which the second embodiment of the multifunction timepiece of the invention differs from the first embodiment of the multifunction timepiece of the invention. Therefore, the explanation of the first embodiment of the multifunction timepiece of the invention mentioned above will be applied to a portion which is not described below.

(2.1) Structure of Total of Movement:

In reference to FIG. 22 through FIG. 24, the second embodiment of the multifunction timepiece of the invention is constituted by an analog electronic timepiece. Further in details, the second embodiment of the multifunction timepiece of the invention is constituted by an analog type timepiece (electric timepiece, electronic timepiece, mechanical type timepiece) including a small hand at least one portion in "2 o'clock direction", "6 o'clock direction", "10 o'clock direction". The second embodiment of the multifunction timepiece of the invention can be constituted such that time information with regard to "hour" of a 12 hour system is indicated by an hour hand a rotation center of which is a center of the main plate, time information with regard to "minute" is indicated by a minute hand a rotation center of which is the center of the main plate, time information with regard to "second" is indicated by a small second hand a rotation center of which is arranged in "6 o'clock direction", calendar information with regard to "date" is indicated by a date hand a rotation center of which is arranged in "2 o'clock direction", calendar information with regard to "day" is indicated by a day hand a rotation center of which is arranged in "10 o'clock direction".

As a modified example of the second embodiment of the invention, according to the multifunction timepiece of the invention, a movement can be constituted by a mechanical type timepiece. As a further modified example, the second embodiment of the multifunction timepiece of the invention can also be constituted to constitute the movement by an analog electronic timepiece or a mechanical type timepiece and indicating time information with regard to "second" by a second hand a rotation center of which is a center of the main plate. According to the further modified example, a small second hand can be omitted.

According to the second embodiment of the multifunction timepiece of the invention, a movement 201B includes a main plate 202. A power source portion, a circuit portion, a converter (step motor), a top train wheel, a switching mechanism and the like are arranged on a case back side (top side) of the main plate 202. A back train wheel, a calendar train wheel, a date correcting mechanism and the like are arranged on a back side of the main plate 202. A dial 204B is arranged on a glass side of the main plate 202. A winding stem 210 is arranged to be rotatable on 3 o'clock side of the main plate 202. A point by which the second embodiment of the multifunction timepiece of the invention differs from the first embodiment of the multifunction timepiece of the invention resides in that the date indicating mechanism is arranged in "2 o'clock direction", that a date indicating mechanism is arranged in "10 o'clock direction", and that a 24 hour indicating mechanism is not provided. All of movement parts used in the second embodiment of the multifunction timepiece of the invention are the same as movement parts used in the first embodiment of the multifunction timepiece of the invention. The dial 204B used in the second embodiment of the multifunction timepiece of the invention differs from the dial 204 used in the first embodiment of the multifunction timepiece of the invention.

(2.2) Structure of Date Indicating Mechanism:

Next, a structure of a date indicating mechanism will be explained. In reference to FIG. 22 through FIG. 24, in the movement 201B, a date indicator feeding mechanism is constituted to operate based on rotation of an hour wheel 262. The date indicating mechanism includes the date indicator driving wheel 310, the date star wheel 312. The date indicator driving wheel 310 is constituted to rotate by rotation of the hour wheel 262. The date indicator driving wheel 310 is rotatably supported by a second date indicator driving wheel pin provided at the main plate 202. It is preferable to arrange a rotation center of the date indicator driving wheel 310 at a region between "4 o'clock direction" and "5 o'clock direction" (that is, "4-5 o'clock region).

In reference to FIG. 6, a portion of the date corrector setting wheel holder 314 disposed on the lower side of the date star wheel 312 is narrowed in the circular shape to the back face of the main plate 202. It is preferable to set the hole provided at the center of the circular shape narrowed portion of the date corrector setting transmission wheel holder 314 to the date corrector setting wheel transmission wheel holder guide shaft portion provided at the surrounding of the date star wheel guide hole. The position in the rotational direction of the date star wheel 312 is set by the second date jumper 316*b2* provided at the setting lever jumper 316. It is preferable to arrange the setting portion provided at the front end of the spring portion of the second date jumper 316*b2* at the region between "12 o'clock direction" and "1 o'clock direction" (that is, "12-1 o'clock region"). The rotation center of the date star wheel 312 is arranged in "2 o'clock direction". The lower shaft portion of the date star wheel 312 is rotatably supported by the main plate 202. The date hand 312*h* is attached to the upper shaft portion of the date star wheel 312 (illustrated by two-dotted chain lines in FIG. 6).

(2.3) Structure of Day Indicating Mechanism:

Next, a structure of a day indicating mechanism will be explained. In reference to FIG. 22 through FIG. 24, in the movement 201B, a day indicator feeding mechanism is constituted to operate based on rotation of the hour wheel 262. The day indicating mechanism includes the day indicator driving wheel 320, the small day wheel 322. The day indicator driving wheel 320 is constituted to rotate by rotation of the hour wheel 262. The day indicator driving wheel 320 is rotatably supported by a second day indicator driving wheel pin provided at the main plate 202. It is preferable to arrange the rotation center of the day indicator driving wheel 320 at a region between “8 o’clock direction” and “9 o’clock direction” (that is, “8-9 o’clock region”).

A position in the rotational direction of the small day wheel 322 is set by a second day jumper 316*c*2 provided at the setting lever jumper 316. It is preferable to arrange a correcting portion provided at a front end of the spring portion of the second day jumper 316*c*2 at a region between “9 o’clock direction” and “10 o’clock direction” (that is, “9-10 o’clock region”). The rotation center of the small day wheel 322 is arranged in “10 o’clock direction”. A lower shaft portion of the small day wheel 322 is rotatably supported by the main plate 202. The day hand 322*h* is attached to the upper shaft portion of the small day wheel 322.

(2.4) Structure of Date Correcting Mechanism:

Next, a structure of a date correcting mechanism will be explained. In reference to FIG. 22 through FIG. 24, the back side of the movement 201B is provided with the date correcting mechanism for correcting indication of date by the date star wheel 312. The date correcting mechanism is constituted by the first corrector setting transmission wheel 351, the second corrector setting transmission wheel 352, the third corrector setting transmission wheel 353, the fourth corrector setting transmission wheel 354, and the date corrector setting wheel 355. The rotation center of the second corrector setting transmission wheel 352 is arranged in “3 o’clock direction”. The rotation center of the second corrector setting transmission wheel 352 according to the second embodiment of the multifunction timepiece of the invention is arranged to be the same as the rotation center of the second corrector setting transmission wheel 352 according to the first embodiment of the multifunction timepiece of the invention.

The third corrector setting transmission wheel 353 is rotatably supported by the main plate 202. It is preferable to arrange the rotation center of the third corrector setting transmission wheel 353 in “2 o’clock direction”, or a region between “2 o’clock direction” and “3 o’clock direction” (that is, “2-3 o’clock region”). The rotation center of the third corrector setting transmission wheel 353 according to the second embodiment of the multifunction timepiece of the invention is arranged to be the same as the rotation center of the third corrector setting transmission wheel 353 according to the first embodiment of the multifunction timepiece of the invention. The lower shaft of the fourth corrector setting transmission wheel 354 is movably and rotatably supported by a second fourth corrector setting transmission wheel guide long hole provided at the main plate 202. It is preferable to arrange the second fourth corrector setting transmission wheel guide long hole for guiding the lower shaft of the fourth corrector setting transmission wheel 354 at a region between “1 o’clock direction” and “2 o’clock direction” (that is, 1-2 o’clock region”). The second fourth corrector setting transmission wheel guide long hole according to the second embodiment of the multifunction timepiece of the invention is arranged at a position more proximate to the outer shape portion of the main plate 202 than that of the fourth corrector setting transmission wheel guide long hole according to the first embodiment of the multifunction timepiece of the invention. The date corrector setting transmission wheel holder 314 is provided with the second correcting spring portion 314*b*2 for pressing the fourth corrector setting transmission wheel 354 to the main plate 202. It is preferable to arrange the rotation center of the date corrector setting wheel 355 at a region between “12 o’clock direction” and “1 o’clock direction” (that is, “12-1 o’clock region”).

(2.5) Structure of Main Plate:

Next, an explanation added to the above-described explanation of the first embodiment of the multifunction timepiece of the invention will be given of the structure of the main plate 202. In reference to FIG. 7, the main plate 202 further includes a rotation center 202DW2 of the date indicator driving wheel 310 according to the second embodiment, a rotation center 202DS2 of the date star wheel 312 according to the second embodiment, a rotation center 202WT2 of the date indicator driving wheel 320 according to the second embodiment, a rotation center 202SW2 of the small day wheel 322 according to the second embodiment, and a rotation center of a rotating member of a rotation center 202SB2 of the date corrector setting wheel 355 according to the second embodiment of the invention.

Further, the main plate 202 includes a second fourth corrector setting transmission wheel guide long hole 202SL2 for movably guiding the lower shaft of the fourth corrector setting transmission wheel 354 according to the second embodiment. The respective rotation centers are formed with guide shaft portions for guiding the center holes of the rotating members, or formed with guide holes for guiding shaft portions of the rotating members for rotatably supporting the rotating members rotated centering on the rotation centers. That is, the train wheel guide portion can be constituted by a guide hole, a guide bearing, a guide shaft, a guide pin or the like for rotatably guiding the rotating member.

As has been explained above, the main plate 202 includes the center pipe 202*b* arranged at the main plate center 202*c*, the lower bearing of the rotor 236, the lower bearing of the fifth wheel & pinion 238, the lower bearing of the fourth wheel & pinion 240, the lower bearing of the third wheel & pinion 242, the lower bearing of the minute wheel 260, the guide pin of the setting wheel 278, the guide pin of the date indicator driving wheel 310, the guide pin of the date star wheel 312, the guide pin of the day indicator driving wheel 320, the lower bearing of the small day wheel 322, the lower bearing of the hour indicator 330, the lower bearing of the second indicator 340, the guide pin of the third corrector setting transmission wheel 353, and the guide pin of the date corrector setting wheel 355. For example, the bearing can be constituted by a hole jewel, a mortice frame, a through hole, a blind hole or the like. For example, the guide pin can integrally be formed with the main plate 202, or a pin formed separately from the main plate 202 can be fixed to the main plate 202. Or, in place of the bearing, the guide member of a pin or the like can also be used. Or, in place of the guide pin, a guide member of a hole jewel, a mortice frame, a through hole, a blind hole or the like can also be used.

The movement 201 and the movement 201B include a first train wheel rotation center for a train wheel used for fabricating the first type of multifunction timepiece having an arrangement of the first type of small hand and a second train wheel rotation center for a train wheel used in fabricating the second type of multifunction timepiece having an arrangement of the second type of the small hand. The first train wheel rotation center and the second train wheel rotation center are provided with train wheel guide portions (guide holes, guide bearings, guide shafts, guide pins or the like) for rotatably guiding the train wheel members rotated centering on the positions. The first train wheel rotation center and the second train wheel rotation center are arranged at positions between the main plate center 202*c* of the main plate 202 and the main plate outer shape portion of the main plate 202. As explained above, according to the first embodiment and the second embodiment of the invention, the main plate 202 can be used for the movement 201 and can also be used for the movement 201B.

(2.6) Structure of Date Corrector Setting Transmission Wheel Holder:

Next, an explanation added to the above-described explanation of the first embodiment of the multifunction timepiece of the invention will be given of a structure of the date corrector setting transmission wheel holder 314. In reference to FIG. 8, the date corrector setting transmission wheel holder 314 is provided with the second correcting spring portion **314*b*2 for pressing the fourth corrector setting transmission wheel 354 according to the second embodiment to the main plate 202. It is preferable to arrange the correcting spring portion 314*b*2 at a region between "1 o'clock direction" and "2 o'clock direction" (that is, "1-2 o'clock region"). It is preferable to arrange a front end portion at which the second correcting spring portion 314*b*2 is brought into contact with the fourth corrector setting transmission wheel 354 at a region between "1 o'clock direction" and "2 o'clock direction" (that is, "1-2 o'clock region"). Further, it is preferable to construct a constitution in which a portion of the date corrector setting transmission wheel holder 314 disposed on the lower side of the date star wheel 312 is narrowed in the circular shape to the back face of the main plate 202, and the hole provided at the center of the circular shape narrowed portion is fitted to the date corrector setting transmission wheel holder guide shaft portion provided at a surrounding of the date star wheel guide hole. As explained above, according to the first embodiment and the second embodiment of the invention, the date corrector setting transmission wheel holder 314 can be used for the movement 201 and can also be used for the movement 201**B.

(2.7) Structure of Setting Lever Jumper:

Next, an explanation added to the explanation of the first embodiment of the multifunction timepiece of the invention will be given of a structure of the setting lever jumper 316. In reference to FIG. 9, the setting lever jumper 316 is provided with the second date jumper **316*b*2 for setting the position in the rotational direction of the date star wheel 312 according to the second embodiment. It is preferable to arrange the spring portion of the second date jumper 316*b* at a region between "1 o'clock direction" and "5 o'clock direction" (that is, "1-5 o'clock region"). It is preferable to arrange the setting portion provided at the front end of the spring portion of the second date jumper 316*b* at a region between "12 o'clock direction" and "1 o'clock direction" (that is, "12-1 o'clock region"). The setting lever jumper 316 is provided with the second day jumper 316*c*2 for setting the position in the rotational direction of the small day wheel 322 according to the second embodiment. It is preferable to arrange the spring portion of the second spring day jumper 316*c*2 at a region between "7 o'clock direction" and "10 o'clock direction" (that is, "7-10 o'clock region"). It is preferable to arrange the setting portion provided at the front end of the spring portion of the second day jumper 316*c*2 at a region between "9 o'clock direction" and "10 o'clock direction" (that is, "9-10 o'clock region"). As explained above, according to the first embodiment and the second embodiment of the invention, the setting lever jumper 316 can be used for the movement 201 and can also be used for the movement 201**B.

(2.8) Explanation of Hand Position and Hand Specification:

In reference to FIG. 10 and FIG. 25, in the fifth kind of the embodiment of the invention, time information with regard to "hour" of the 12 hour system can be indicated by the hour hand **262*h* attached to the hour wheel 262 the rotation center of which is the main plate center 202*c*, time information with regard to "minute" can be indicated by the minute hand 244*h* attached to the center wheel & pinion 244 the rotation center of which is the main plate center 202*c*, time information with regard to "second" can be indicated by the small second hand 340*h* attached to the second indicator 340 the rotation center of which is arranged in "6 o'clock direction", calendar information with regard to "date" can be indicated by the date hand 312*h* attached to the date star wheel 312 the rotation center of which is arranged in "2 o'clock direction", calendar information with regard to "day" can be indicated by the day hand 322*h* provided at the small day wheel 322** the rotation center of which is arranged in "10 o'clock direction".

The dial 204B is provided with characters, numerals, abbreviated characters or the like for indicating the respective time information, calendar information. For example, in order to indicate calendar information with regard to "date", numerals of "10", "20", "31" are provided along a circumference at positions in correspondence with the date hand **312*h* of the dial 204. For example, in order to indicate the time information with regard to "second", numerals of "10", "20", "30", "40", "50", "60" are provided along a circumference at positions in correspondence with the small second hand 340*h* of the dial 204. For example, in order to indicate the calendar information with regard to "day", letters of "Sun", "Mon", "Tue", "Wed", "Thu", "Fri", "Sat" are provided along a circumference at positions in correspondence with the day hand 322*h* of the dial 204**.

(3) Third Embodiment

Next, a third embodiment of a multifunction timepiece of the invention will be explained. In the following explanation, a description will mainly be given of a point by which the third embodiment of the multifunction timepiece of the invention differs from the first embodiment of the multifunction timepiece of the invention. Therefore, the above-described explanation of the first embodiment of the multifunction timepiece of the invention will be applied to a portion which is not described below.

(3.1) Structure of Total of Movement:

In reference to FIG. 26 through FIG. 28, according to the third embodiment of the multifunction timepiece of the invention, a movement is constituted by an analog electronic timepiece. Further in details, the third embodiment of the multifunction timepiece of the invention is constituted by an analog type timepiece (electric timepiece, electronic timepiece, mechanical type timepiece) including a small hand at least one portion in "3 o'clock direction", "6 o'clock direction", "9 o'clock direction", "12 o'clock direction". That is, according to the third embodiment of the multifunction timepiece of the invention, similar to the above-described first embodiment, there can be constructed a constitution in which time information with regard to "hour" of the 12 hour system is indicated by an hour hand a rotation center of which is a center of the main plate, time information with regard to "minute" is indicated by a minute hand a rotation center of which is a center of the main plate, time information with regard to "hour" of the 24 hour system is indicated by a 24 hour hand a rotation center of which is arranged in "12 o'clock direction", calendar information with regard to "date" is indicated by a date hand a rotation center of which is arranged in "3 o'clock direction", time information with regard to "second" is indicated by a small second hand a rotation center of which is arranged in "6 o'clock direction", calendar information with regard to "day" is indicated by a day hand a rotation center of which is arranged in "9 o'clock direction".

Similar to the modified example of the first embodiment of the multifunction timepiece of the invention, as a modified example of the third embodiment, according to the third embodiment of the multifunction timepiece of the invention, a movement can be constituted also by a mechanical type timepiece. As a further modified example, according to the third embodiment of the multifunction timepiece of the invention, a movement can be constituted by an analog electronic timepiece or a mechanical type timepiece, and time information with regard to "second" can be indicated by a second hand a rotation center of which is a center of the main plate. According to the further modified example, a small second hand can be omitted.

According to the third embodiment of the multifunction timepiece of the invention, a movement 401 includes a main plate 402. A power source portion, a circuit portion, a converter (step motor), a top train wheel, a switching mechanism and the like are arranged on a case back side (top side) of the main plate 402. A back train wheel, a calendar train wheel, a date correcting mechanism and the like are arranged on a back side of the main plate 402. The dial 204 is arranged on a glass side of the main plate 402. The winding stem 210 is arranged rotatably to a 3 o'clock side of the main plate 402. A point by which the third embodiment of the multifunction timepiece of the invention differs from the first embodiment of the multifunction timepiece of the invention resides in structures of the main plate, a date corrector setting transmission wheel holder, a setting lever jumper, a structure and an arrangement of a date correcting mechanism. Other movement parts used in the third embodiment of the multifunction timepiece of the invention can be constituted by those having dimensions and shapes the same as dimensions and shapes of the movement parts used in the first embodiment of the multifunction timepiece of the invention. The dial 204 used in the third embodiment of the multifunction timepiece of the invention can be constituted by that having a dimension and a shape the same as the dimension and the shape of the dial 204 used in the first embodiment of the multifunction timepiece of the invention.

(3.2) Structure of Date Indicating Mechanism:

Next, a structure of a date indicating mechanism will be explained. In reference to FIG. 26 through FIG. 28, in the movement 401, a date indicator feeding mechanism is constituted to operate based on rotation of the hour wheel 262. The date indicating mechanism includes the date indicator driving wheel 310 and the date star wheel 312. The date indicator driving wheel 310 is constituted to rotate by rotation of the hour wheel 262. The date indicator driving wheel 310 is rotatably supported by a date indicator driving wheel pin provided at the main plate 402. It is preferable to arrange the rotation center of the date indicator driving wheel 310 at a region between "5 o'clock direction" and "6 o'clock direction" (that is, "5-6 o'clock region).

The position in the rotational direction of the date star wheel 312 is set by the date jumper **416*b* provided at the setting lever jumper 416. It is preferable to arrange the setting portion provided at the front end of the spring portion of the date jumper 416*b* at a region between "1 o'clock direction" and "2 o'clock direction" (that is, "1-2 o'clock region"). The rotation center of the date star wheel 312 is arranged in "3 o'clock direction". The lower shaft portion of the date star wheel 312 is supported rotatably to the main plate 402. The date hand 312*h* is attached to the upper shaft portion of the date star wheel 312**.

(3.) Structure of Day Indicating Mechanism:

Next, a structure of a day indicating mechanism will be explained. In reference to FIG. 26 through FIG. 28, in the movement 401, a day indicating feeding mechanism is constituted to operate based on the rotation of the hour wheel 262. The day indicating mechanism includes the day indicator driving wheel 320 and the small day wheel 322. The day indicator driving wheel 320 is constituted to rotate by rotation of the hour wheel 262. The day indicator driving wheel 320 is rotatably supported by a day indicator driving wheel pin provided at the main plate 402. It is preferable to arrange the rotation center of the day indicator driving wheel 320 at a region between "10 o'clock direction" and "11 o'clock direction" (that is, "10-11 o'clock region").

The position in the rotational direction of the small day wheel 322 is set by a day jumper **416*c* provided at the setting lever jumper 416. It is preferable to arrange the setting portion provided at the front end of the spring portion of the day jumper 416*c* at a region between "8 o'clock direction" and "9 o'clock direction" (that is, "8-9 o'clock region"). The rotation center of the small day wheel 322 is arranged in "9 o'clock direction". A lower shaft portion of the small day wheel 322 is rotatably supported by the main plate 402. The day hand 322*h* is attached to the upper shaft portion of the small day wheel 322**.

(3.4) Structure of Date Correcting Mechanism:

Next, a structure of a date correcting mechanism will be explained. In reference to FIG. 26 through FIG. 28, the back side of the movement 401 is provided with the date correcting mechanism for correcting indication of date by the date star wheel 312. The date correcting mechanism is constituted by a first corrector setting transmission wheel 451, a second corrector setting transmission wheel 452, a third corrector setting transmission wheel 453, a fourth corrector setting transmission wheel 454, and a date corrector setting wheel 455. A rotation center of the second corrector setting transmission wheel 452 is arranged in "3 o'clock direction".

A dimension and a shape of the first corrector setting transmission wheel 451 according to the third embodiment of the multifunction timepiece of the invention can be constituted to be the same as a dimension and a shape of the first corrector setting transmission wheel 351 according to the first embodiment of the multifunction timepiece of the invention. A dimension and a shape of the second corrector setting transmission wheel 452 according to the third embodiment of the multifunction timepiece of the invention can be constituted to be the same the dimension and the shape of the second corrector setting transmission wheel 352 according to the first embodiment of the multifunction timepiece of the invention. A rotation center of the second corrector setting transmission wheel 452 according to the third embodiment of the multifunction timepiece of the invention can be arranged at a position the same as that of the rotation center of the second corrector setting transmission wheel 352 according to the first embodiment of the multifunction timepiece of the invention. A dimension and a shape of the fourth corrector setting transmission wheel 454 according to the third embodiment of the multifunction timepiece of the invention can be constituted to be the same the dimension and the shape of the fourth corrector setting transmission wheel 354 according to the first embodiment of the multifunction timepiece of the invention. A dimension and a shape of the date corrector setting wheel 455 according to the third embodiment of the multifunction timepiece of the invention can be constituted to be the same as the dimension and the shape of the date corrector setting wheel 355 according to the first embodiment of the multifunction timepiece of the invention.

The third corrector setting transmission wheel 453 is rotatably supported by the main plate 402. It is preferable to arrange the rotation center of the third corrector setting transmission wheel 453 at a region between “3 o’clock direction” and “4 o’clock direction” (that is, “3-4 o’clock region”). A lower shaft of the fourth corrector setting transmission wheel 454 is movably and rotatably supported by a fourth correcting transmission wheel guide long hole provided at the main plate 402. It is preferable to arrange the fourth corrector setting transmission wheel guide long hole for guiding the lower shaft of the fourth corrector setting transmission wheel 454 at a region between “4 o’clock direction” and “5 o’clock direction” (that is, 4-5 o’clock region”). A date corrector setting transmission wheel holder 414 is provided with a correcting spring portion 414*b* for pressing the fourth corrector setting transmission wheel 454 to the main plate 402. It is preferable to arrange a rotation center of the date corrector setting wheel 355 in “4 o’clock direction”, or a region between “3 o’clock direction” and “4 o’clock direction” (that is, “3-4 o’clock region”).

(3.5) Structure of Main Plate:

Next, a structure of the main plate 402 will be explained. In reference to FIG. 29, the rotation center of the center wheel & pinion 244 and the rotation center of the hour wheel 262 are arranged at a main plate center 402*c*. The center axis line of the center pipe 202*b* is arranged at the main plate center 402*c*.

The main plate 402 includes rotating centers of rotating members of a rotation center 402RT of the rotor 236, a rotation center of 402FW of the fifth wheel & pinion 238, a rotation center (not illustrated) of the fourth wheel & pinion 240, a rotation center (not illustrated) of the third wheel & pinion 242, a rotation center 402HW of the minute wheel 260, a rotation center (not illustrated) of the setting wheel 278, a rotation center 402DW of the date indicator driving wheel 310, a rotation center 402DS of the date star wheel 312, a rotation center 402WT of the day indicator driving wheel 320, a rotation center 402SW of the small day wheel 322, a rotation center 402HG of the hour indicator 330, a rotation center 402BW of the second indicator 340, a rotation center 402SA of the third corrector setting transmission wheel 353, a rotation center 402SB of the date corrector setting transmission wheel 355. It is preferable to arrange the rotation center of the second corrector setting transmission wheel 352 at a position the same as that of the rotation center 402DS of the date star wheel 312.

Further, the main plate 202 includes a fourth corrector setting transmission wheel guide long hole 402SL for movably guiding the lower shaft of the fourth corrector setting transmission wheel 354. The respective rotation centers are formed with guide shaft portions for guiding center holes of the rotating members or guide holes for guiding shaft portions of the rotating members in order to rotatably support the rotating members rotated centering on the rotation centers. That is, a train wheel guide portion for rotatably guiding the rotating member can be constituted by a guide hole, a guide bearing, a guide shaft, a guide pin or the like. As described later, the main plate 402 is further provided with rotation centers for rotatably supporting respective rotating members used in other embodiment of the invention.

As explained above, the movement 401 includes a first train wheel rotation center for a train wheel used in fabricating the first type of multifunction timepiece having an arrangement of a first type of a small hand. The first train wheel rotation center is arranged at a position between the main plate center 402*c* of the main plate 402 and a main plate outer shape portion of the main plate 402. The first train wheel rotation center is provided with a guide hole or a guide bearing for rotatably guiding a train wheel member rotated centering on the position. Further, as described later, the movement 401 is provided with a second train wheel rotation center for a train wheel used for fabricating a second type of multifunction timepiece having an arrangement of a second type of a small hand by using the movement 401. The second train wheel rotation center is arranged at a position between the main plate center 402*c* of the main plate 402 and the main plate outer shape portion of the main plate 402. The second train wheel rotation center is provided with a guide portion (guide hole, guide bearing, guide shaft, guide pin or the like) for rotatably guiding a train wheel member rotated centering on the position.

(3.6) Structure of Date Corrector Setting Transmission Wheel Holder:

Next, a structure of a date corrector setting transmission wheel holder 414 will be explained. In reference to FIG. 30, the date corrector setting transmission wheel holder 314 is arranged at “12-3 o’clock region” and “3-6 o’clock region”. A corrector spring portion 414*b* for pressing the fourth corrector setting transmission wheel 454 to the main plate 402 is provided at the date corrector setting transmission wheel holder 314. It is preferable to arrange the correcting spring portion 314*b* at a region between “4 o’clock direction” and “5 o’clock direction” (that is, “4-5 o’clock region”). It is preferable to arrange a front end portion at which the correcting spring portion 414*b* is brought into contact with the fourth corrector setting transmission wheel 454 at a region between “4 o’clock direction” and “5 o’clock direction” (that is, “4-5 o’clock region”). The date corrector setting transmission wheel holder 414 is further provided with a correcting spring portion 414*b*2 used in other embodiment of the invention.

(3.7) Structure of Setting Lever Jumper:

Next, a structure of a setting lever jumper 416 will be explained. In reference to FIG. 31, the setting lever jumper 416 is provided with the date jumper 416*b* for setting a position in a rotational direction of the date star wheel 312. It is preferable to arrange a spring portion of the date jumper 416*b* at a region between “12 o’clock direction” and “2 o’clock direction” (that is, “12-2 o’clock region”). It is preferable to arrange a setting portion provided at a front end of the spring portion of the date jumper 416*b* at a region between “1 o’clock direction” and “2 o’clock direction” (that is, “1-2 o’clock region”).

The setting lever jumper 416 is provided with the day jumper 416*c* for setting a position in a rotational direction of the small day wheel 322. It is preferable to arrange a spring portion of the day jumper 416*c* at a region between “7 o’clock direction” and “9 o’clock direction” (that is, “7-9 o’clock region”). It is preferable to arrange the setting portion provided at the front end of the spring portion of the day jumper 416*c* at a region between “8 o’clock direction” and “9 o’clock direction” (that is, “8-9 o’clock region”). Different from the first embodiment of the invention, in order to simplify fabricating steps, the further date jumper and the further day jumper used in other embodiment of the invention are not provided at the setting lever jumper 316.

(3.8) Explanation of Hand Position and Hand Specification:

A hand position and a hand specification according to the third embodiment of the invention are similar to the hand position and the hand specification according to the first embodiment of the invention. That is, in reference to FIG. 10, the hand position and the hand specification according to the third embodiment of the invention can constitute the first kind through the fifth kind of the embodiment of the invention. Therefore, a detailed explanation with regard to the hand position and the hand specification according to the third embodiment of the invention is omitted to describe here again since the explanation with regard to the hand position and the hand specification according to the first embodiment of the invention may be referred to.

(4) Fourth Embodiment

Next, a fourth embodiment of a multifunction timepiece of the invention will be explained. In the following explanation, a description will mainly be given of a point by which the fourth embodiment of the multifunction timepiece of the invention differs from the third embodiment of the multifunction timepiece of the invention. Therefore, the above-described explanation of the third embodiment of the multifunction timepiece of the invention will be applied to a portion which is not described below.

(4.1) Structure of Total of Movement:

In reference to FIG. 32 through FIG. 34, the fourth embodiment of the multifunction timepiece of the invention is constituted by an analog electronic timepiece. Further in details, the fourth embodiment of the multifunction timepiece of the invention is constituted by an analog type timepiece (electric timepiece, electronic timepiece, mechanical type timepiece) including a small hand at least one portion in “2 o'clock direction”, “6 o'clock direction”, “10 o'clock direction”. According to the fourth embodiment of the multifunction timepiece of the invention, there can be constructed a constitution in which time information with regard to “hour” of the 12 hour system is indicated by an hour hand a rotation center of which is a center of the main plate, time information with regard to “minute” is indicated by a minute hand a rotation center of which is the center of the main plate, time information with regard to “second” is indicated by a small second hand a rotation center of which is arranged in “6 o'clock direction”, calendar information with regard to “date” is indicated by a date hand a rotation center of which is arranged in “2 o'clock direction”, calendar information with regard to “day” is indicated by a day hand a rotation center of which is arranged in “10 o'clock direction”.

(4.2) Structure of Date Indicating Mechanism:

A structure of a date indicating mechanism will be explained as follows. In reference to FIG. 32 through FIG. 34, in a movement 401B, there is constructed a constitution in which a date indicator feeding mechanism is operated based on the rotation of the hour wheel 262. The date indicating mechanism includes the date indicator driving wheel 310 and the date star wheel 312. The date indicator driving wheel 310 is constituted to rotate by rotation of the hour wheel 262. The lower shaft portion of the date star wheel 312 is rotatably supported by the date star wheel guide hole provided at the main plate 402. The date indicator driving wheel 310 is rotatably supported by the second date indicator driving wheel pin provided at the main plate 402. It is preferable to arrange the rotation center of the date indicator driving wheel 310 at a region between “4 o'clock direction” and “5 o'clock direction” (that is, “4-5 o'clock region).

The position in the rotational direction of the date star wheel 312 is set by the date jumper 418*b* provided at the setting lever jumper 418. The shape of the setting lever jumper 418 according to the fourth embodiment differs from the shape of the setting lever jumper 416 according to the third embodiment. It is preferable to arrange the setting portion provided at the front end of the spring portion of the date jumper 418*b* at a region between “12 o'clock direction” and “1 o'clock direction” (that is, “12-1 o'clock region”). The rotation center of the date star wheel 312 is arranged in “2 o'clock direction”. The lower shaft portion of the date star wheel 312 is supported rotatably to the main plate 402.

In reference to FIG. 34, the center hole of the second corrector setting transmission wheel 452 is rotatably supported by the second corrector setting transmission wheel guide shaft portion provided at the main plate 402. The inner side of the second corrector setting transmission wheel guide shaft portion is provided with the date star wheel guide hole for the date star wheel 312 used in the third embodiment of the multifunction timepiece of the invention. The center axis line of the date star wheel guide hole and the center axis line of the second corrector setting transmission wheel guide shaft portion can be constituted to coincide with each other. The third corrector setting transmission wheel 353 is rotatably supported by the ring-like third corrector setting transmission wheel guide shaft portion provided at the main plate 202. The inner side of the third corrector setting transmission wheel guide shaft portion is provided with the date corrector setting transmission wheel holder guide shaft portion. The inner side of the date corrector setting transmission wheel holder guide shaft portion is provided with the date star wheel guide hole of the date star wheel 312 used in the fourth embodiment of the multifunction timepiece of the invention. A portion of the date corrector setting transmission wheel holder 414 disposed on the lower side of the date star wheel 312 is narrowed in the circular shape to the back face of the main plate 402. It is preferable to fit the hole provided at the center of the circular shape narrowed portion of the date corrector setting transmission wheel holder 414 to the date corrector setting transmission wheel holder guide shaft portion provided at the surrounding of the date star wheel guide hole.

(4.3) Structure of Day Indicating Mechanism:

Next, a structure of a day indicating mechanism will be explained. In reference to FIG. 32 through FIG. 34, in the movement 401B, the day indicator feeding mechanism is constituted to operate based on rotation of the hour wheel 262. The day indicating mechanism includes the day indicator driving wheel 320, and the small day wheel 322. The day indicator driving wheel 320 is constituted to rotate by rotation of the hour wheel 262. The day indicator driving wheel 320 is rotatably supported by the second day indicator driving wheel pin provided at the main plate 402. It is preferable to arrange the rotation center of the day indicator driving wheel 320 at a region between “8 o'clock direction” and “9 o'clock direction” (that is, “8-9 o'clock region”).

The position in the rotational direction of the small day wheel 322 is set by a day jumper 418*c* provided at the setting lever jumper 418. It is preferable to arrange the setting portion provided at the front end of the spring portion of the day jumper 418*c* at a region between “9 o'clock direction” and “10 o'clock direction” (that is, “9-10 o'clock region”). The rotation center of the small day wheel 322 is arranged in “10 o'clock direction”. A lower shaft portion of the small day wheel 322 is rotatably supported by the main plate 402. The day hand 322*h* is attached to the upper shaft portion of the small day wheel 322.

(4.4) Structure of Date Correcting Mechanism:

Next, a structure of a date correcting mechanism will be explained. In reference to FIG. 32 through FIG. 34, a back side of the movement 401B is provided with a date correcting mechanism for correcting indication of date by the date star wheel 312. The date correcting mechanism is constituted by the first corrector setting transmission wheel 451, the second corrector setting transmission wheel 452, the third corrector setting transmission wheel 453, the fourth corrector setting transmission wheel 454, and the date corrector setting wheel 455. A rotation center of the second corrector setting transmission wheel 452 is arranged in "3 o'clock direction". The rotation center of the second corrector setting transmission wheel 452 according to the fourth embodiment of the multifunction timepiece of the invention can be arranged at a position the same as that of the rotation center of the second corrector setting transmission wheel 352 according to the first embodiment of the multifunction timepiece of the invention.

The third corrector setting transmission wheel 453 is rotatably supported by the main plate 202. It is preferable to arrange the rotation center of the third corrector setting transmission wheel 453 in "2 o'clock direction", or a region between "2 o'clock direction" and "3 o'clock direction" (that is, "2-3 o'clock region"). It is preferable to arrange the rotation center of the third corrector setting transmission wheel 453 at a position the same as that of the rotation center of the date star wheel 312. The center hole of the third correcting setting transmission wheel 453 is rotatably arranged relative to the outer peripheral portion of the third corrector setting transmission wheel guide shaft portion provided at the main plate 402. The lower shaft of the fourth corrector setting transmission wheel 454 is movably and rotatably supported by the second fourth correcting transmission wheel guide long hole provided at the main plate 402. It is preferable to arrange the second fourth corrector setting transmission wheel guide long hole for guiding the lower shaft of the fourth corrector setting transmission wheel 454 at a region between "1 o'clock direction" and "2 o'clock direction" (that is, 1-2 o'clock region"). A second correcting spring portion **414*b*2 for pressing the fourth corrector setting transmission 454 to the main plate 402 is provided at the date corrector setting transmission wheel holder 414. It is preferable to arrange the rotation center of the date corrector setting wheel 455** at a region between "12 o'clock direction" and "1 o'clock direction" (that is, "12-1 o'clock region").

(4.5) Structure of Main Plate:

Next, an explanation added to the above-described explanation of the third embodiment of the multifunction timepiece of the invention will be given of the structure of the main plate 402. In reference to FIG. 29, the main plate 402 further includes rotation centers of rotating members of a rotation center 402DW2 of the date indicator driving wheel 310 according to the fourth embodiment, a rotation center 402DS2 of the date star wheel 312 according to the fourth embodiment, a rotation center 402WT2 of the day indicator driving wheel 320 according to the second embodiment, a rotation center 402SW2 of the small day wheel 322 according to the second embodiment, and a rotation center 402SB2 of the date corrector setting wheel 455 according to the second embodiment. It is preferable to arrange the rotation center of the third corrector setting transmission wheel 453 at a position the same as that of the rotation center 402DS2 of the date star wheel 312.

Further, the main plate 402 includes a second fourth corrector setting transmission wheel guide long hole 402SL2 for movably guiding the lower shaft of the fourth corrector setting transmission wheel 454 according to the fourth embodiment. The respective rotation centers are formed with guide shaft portions for guiding center holes of the rotating members, or guide holes for guiding shaft portions of the rotating members in order to rotatably support the rotating members rotated centering on the rotation centers. That is, a train wheel guide portion can be constituted by a guide hole, a guide bearing, a guide shaft, a guide pin or the like for rotatably guiding the rotating member.

The movement 401 includes a first train wheel rotation center for a train wheel used in fabricating the first type of multifunction timepiece having an arrangement of a first type of a small hand, and a second train wheel rotation center for a train wheel used in fabricating a second type of multifunction timepiece having an arrangement of a second type small hand by using the movement 401B. The first train wheel rotation center and the second train wheel rotation center are provided with train wheel guide portions (guide holes, guide bearings, guide shafts, guide pins or the like) for rotatably guiding train wheel members rotated centering on the positions. The first train wheel rotation center and the second train wheel rotation center are arranged at positions between the main plate center **402*c* of the main plate 402 and the main plate outer shape portion of the main plate 402. As explained above, according to the third embodiment and the fourth embodiment of the invention, the main plate 402 can be used for the movement 401 and can also be used in the movement 401**B.

(4.6) Structure of Date Corrector Setting Transmission Wheel Holder:

Next, an explanation added to the above-described explanation of the third embodiment of the multifunction timepiece of the invention will be given of a structure of the date corrector setting transmission wheel holder 414. In reference to FIG. 30, the second correcting spring portion **414*b*2 for pressing the fourth corrector setting transmission wheel 454 according to the fourth embodiment to the main plate 402 is provided at the date corrector setting transmission wheel holder 414. It is preferable to arrange the correcting spring portion 414*b*2 at a region between "1 o'clock direction" and "2 o'clock direction" (that is, "1-2 o'clock region"). It is preferable to arrange a front end portion at which the second correcting spring portion 414*b*2 is brought into contact with the fourth corrector setting transmission wheel 454** at a region between "1 o'clock direction" and "2 o'clock direction" (that is, "1-2 o'clock region").

In reference to FIG. 34, it is preferable that a portion of the date corrector setting transmission wheel holder 414 disposed on the lower side of the date star wheel 312 is narrowed in the circular shape to the back face of the main plate 402 and the hole provided at the center of the circular shape narrowed portion is fitted to the date corrector setting transmission wheel holder guide shaft portion provided at the surrounding of the date star wheel guide hole. As explained above, according to the first embodiment and the second embodiment of the invention, the date corrector setting transmission wheel holder 414 can be used for the movement 401 and can also be used for the movement 401B.

(4.7) Structure of Setting Lever Jumper:

Next, a structure of the setting lever jumper 418 will be explained. The setting lever jumper 418 used in the fourth embodiment of the multifunction timepiece of the invention differs from the setting lever jumper 316 used in the third embodiment in shapes of the date jumper and the day jumper. In reference to FIG. 35, a date jumper **418*b* for setting the position in the rotational direction of the date star wheel 312 according to the fourth embodiment is provided at the setting lever jumper 418. It is preferable to arrange a spring portion of the date jumper 418*b* at a region between "11 o'clock direction" and "1 o'clock direction" (that is, "11-1 o'clock region"). It is preferable to arrange a setting portion provided at a front end of the spring portion of the date jumper 418*b*** at a region between "12 o'clock direction" and "1 o'clock direction" (that is, "12-1 o'clock region").

A day jumper 418*c* for setting a position in the rotational direction of the small day wheel 322 according to the fourth embodiment is provided at the setting lever jumper 418. It is preferable to arrange a spring portion of the day jumper 418*c* at a region between "7 o'clock direction" and "10 o'clock direction" (that is, "7-10 o'clock region"). It is preferable to arrange the setting portion provided at the front end of the spring portion of the day jumper 418*c* at a region between "9 o'clock direction" and "10 o'clock direction" (that is, "9-10 o'clock region").

(4.8) Explanation of Hand Position and Hand Specification:

A hand position and a hand specification according to the fourth embodiment of the invention are similar to the hand position and the hand specification according to the second embodiment of the invention. That is, in reference to FIG. 10, the hand position and the hand specification according to the fourth embodiment of the invention can constitute the sixth kind of the embodiment of the invention. Therefore, a detailed explanation with regard to the hand position and the hand specification according to the fourth embodiment of the invention will be omitted to describe here again since the explanation with regard to the hand position and the hand specification according to the second embodiment of the invention may be referred to.

(5) Fifth Embodiment

Next, a fifth embodiment of a multifunction timepiece of the invention will be explained. In the following explanation, a description will mainly be given of a point by which the fifth embodiment of the multifunction timepiece of the invention differs from the first embodiment of the multifunction timepiece of the invention. Therefore, the explanation of the first embodiment of the multifunction timepiece of the invention will be applied to a portion which is not described below. The point by which the fifth embodiment of the multifunction timepiece of the invention differs from the first embodiment of the multifunction timepiece of the invention resides in the day indicating mechanism. That is, a characteristic of the fifth embodiment of the multifunction timepiece of the invention resides in including a day hand of so-to-speak "retrograde type" capable of operating the hand in a fan shape.

(5.1) Structure of Total of Movement:

In reference to FIG. 36 through FIG. 38, according to the fifth embodiment of the multifunction timepiece of the invention, a movement is constituted by an analog electronic timepiece. Further in details, the fifth embodiment of the multifunction timepiece of the invention is constituted by an analog type timepiece (electric timepiece, electronic timepiece, mechanical timepiece) including a small hand capable of being operated to rotate at least one portion in "3 o'clock direction", "6 o'clock direction", "12 o'clock direction", and a small hand capable of being operated in a fan shape in "9 o'clock direction". That is, according to the fifth embodiment of the multifunction timepiece of the invention, there can be constructed a constitution in which time information with regard- to "hour" of a 12 hour system is indicated by a time hand a rotation center of which is a center of a main plate, time information with regard to "minute" is indicated by a minute hand a rotation center of which is the center of the main plate, time information with regard to "hour" of a 24 hour system is indicated by a 24 hour hand a rotation center of which is arranged in "12 o'clock direction", calendar information with regard to "date" is indicated by a date hand a rotation center of which is arranged in "3 o'clock direction", time information with regard to "second" is indicated by a small second hand a rotation center of which is arranged in "6 o'clock direction", calendar information with regard to "day" is indicated by a so-to-speak "retrograde type" by a day hand a rotation center of which is arranged in "9 o'clock direction" and which can be operated in a fan shape.

(5.2) Structure of Day Indicating Mechanism:

Next, a structure of a day indicating mechanism will be explained. In reference to FIG. 36 through FIG. 38, a day indicator feeding mechanism is constituted to operate based on rotation of the hour wheel 262. A day indicating mechanism includes a day indicator driving wheel 320, a day transmission wheel 462, a small day wheel 464, a hammer 466, a day jumper 468, and a day return spring 472. The day driving wheel 320 is constituted to rotate by rotation of the hour wheel 262. The day indicator driving wheel 320 is rotatably supported by a day indicator driving wheel pin 320*p* provided at the main plate 202. It is preferable to arrange a rotation center of the day indicator driving wheel 320 at a region between "10 o'clock direction" and "11 o'clock direction" (that is, "10-11 o'clock region").

The day indicator driving wheel 320 includes a day indicator driving tooth 320*b* and a day indicator driving finger 320*f*. A date indicator driving pinion 262*c* of the hour wheel 262 is constituted to be brought in mesh with the day indicator driving tooth 320*b* of the day indicator driving wheel 320. The day transmission wheel 462 is rotatably supported by a day transmission wheel pin 462*p* provided at the main plate 202. The day transmission wheel 462 includes a day transmission wheel portion 462*b*, and a transmission cam portion 462*c*. The transmission cam portion 462*c* includes a transmission cam outer shape portion formed such that a distance from a center axis line of the day transmission wheel 462 (that is, cam radius) is gradually increased. The radius of the cam outer shape portion is formed to smoothly increase along a circumferential direction of a transmission cam outer periphery portion from a minimum value RMIN thereof to a maximum value RMAX thereof. Further, a stepped difference portion at which the radius of the transmission cam outer periphery portion is rapidly changed is arranged between the portion at which the radius of the transmission cam outer periphery portion is constituted by the maximum value RMAX and a portion at which the radius is constituted by the minimum value RMIN. That is, the transmission cam outer periphery portion is provided with a contour shape which is widened uniformly in a spiral shape from the minimum radius portion the most proximate to the rotation center of the transmission cam outer shape portion to the maximum radius portion of the transmission cam outer shape portion and in which the portion constituted by the maximum value RMAX of the transmission cam outer periphery portion is connected to a portion constituted by the minimum value RMIN. As a result, the transmission cam outer periphery portion is constituted by a shape proximate to a cam face of a so-to-speak "rocking cam". That is, such a shape of the transmission cam outer periphery portion can be constituted by, for example, "a spiral line ($R=r+a\theta$) of Archimedes". By constituting the transmission cam outer periphery portion in this way, a member brought into contact with the transmission cam outer periphery portion can smoothly be operated.

The day transmission wheel portion 462*b* is arranged on a side of being proximate to a dial 454 than the transmission cam portion 462*c*. The day transmission wheel portion 462*b* of the day transmission wheel 462 includes 7 pieces of teeth. By rotating the day transmission wheel portion 462*b* of the day transmission wheel 462 by the day indicator driving finger 320*f* provided at the day indicator driving wheel 320, the day transmission wheel 462 is constituted to rotate once per 1 day (1/7). Therefore, the day transmission wheel 462 is constituted to rotate once in 7 days. It is preferable to arrange a rotation center of the day transmission wheel 462 at a region between "9 o'clock direction" and "10 o'clock direction" (that is, "9-10 o'clock region"). The small day wheel 464 includes a lower shaft portion 464*a*, a day wheel portion 464*b*, a return cam portion 464*c*, an upper shaft portion 464*d*, and a hand attaching portion 464*g*. The return cam portion 464*c* includes a return cam outer shape portion formed such that a distance from a center axis line of the small day wheel 464 (that is, cam radius) is gradually increased. The return cam outer shape portion is formed to constitute a well-known heart cam curve. The lower shaft portion of the small day wheel 464 is rotatably supported by the main plate 202. The upper shaft portion 464*d* of the small day wheel 464 is rotatably supported by a small day wheel bridge 470. A day hand 464*h* is attached to the hand attaching portion 464*g* of the small day wheel 464.

The day return spring 472 includes a base portion 472*b* fixed to the main plate 202, and a return spring portion 472*c* constituted to press the return cam portion 464*c* of the small day wheel 464. The day return spring 472 is a plate-like member formed by an elastic material of stainless steel, phosphor bronze or the like. A front end portion of the return spring portion 472*c* is constituted to be brought into contact with the cam outer shape portion of the return cam portion 464*c*. A direction of a force of pressing the cam outer shape portion of the return cam portion 464*c* by the front end portion of the return spring portion 472*c* is directed to a portion of being eccentric from the rotation center of the small day wheel 464. Therefore, a rotational moment for rotating the small day wheel 464 is constituted to generate by a rotational torque determined by a value of multiplying a distance of eccentricity from the rotation center of the small day wheel 464 to the eccentric portion by the press force. It is preferable to arrange the return spring portion 472*c* of the day return spring 472 at a region between "8 o'clock direction" and "9 o'clock direction" (that is, "8-9 o'clock region").

A position in a rotational direction of the day transmission wheel 462 is constituted to be set by the day jumper 468 provided rotatably to the main plate 202. A day jumper press spring portion 480*c* provided at a setting lever jumper 480 is constituted to press a setting portion provided at a front end of the day jumper 468 to the day transmission wheel portion 462*b* of the day transmission wheel 462. It is preferable to arrange a position of the setting portion provided at the front end of the day jumper 468 at a region between "9 o'clock direction" and "10 o'clock direction" (that is, "9-10 o'clock region"). It is preferable to arrange a position of the day jumper press spring portion 480*c* at a region between "9 o'clock direction" and "11 o'clock direction" (that is, "9-11 o'clock region").

The hammer 466 is rotatably supported by a hammer pin 466*p* provided at the main plate 202. It is preferable to arrange a position of the hammer 466 at a region between "9 o'clock direction" and "10 o'clock direction" (that is, "9-10 o'clock region"). The hammer 466 includes a cam contact portion 466*c* constituted to be brought into contact with the transmission cam portion 462*c*, a first operating wheel portion 466*f* and a second operating wheel portion 466*g* constituted to be brought in mesh with the day wheel portion 464*b*. The second operating wheel portion 466*g* is provided to be able to be brought in mesh with the day wheel portion 464*b* of the small day wheel 464. Particularly, in reference to FIG. 38, by a spring force of the return spring portion 472*c*, the small day wheel 464 is constituted to receive a force of always being rotated in the counterclockwise direction. Therefore, the hammer 466 is constituted to always receive a force of being rotated in the clockwise direction. Therefore, a front end portion of the cam contact portion 466*c* of the hammer 466 is constituted to receive a force of being always pressed to the transmission cam portion 462*c* of the day transmission wheel 462.

A rotation center of the small day wheel 464 is arranged in "9 o'clock direction". The wheel portion 464*b*, and the return cam portion 464*c* of the small day wheel 464 are arranged between the main plate 202 and the small day wheel bridge 370. The dial 454 is provided with a day character, a numeral, an abbreviated character or the like for indicating day. Particularly, in reference to FIG. 44, information with regard to "day" constituting one of calendar information is constituted to be able to be indicated by a day hand 464*h* operated in the fan shape, a character, a numeral, an abbreviated character or the like of the dial 454.

(5.3) Structure of Main Plate:

Next, an explanation added to the above-described explanation of the first embodiment and the second embodiment of the multifunction timepiece of the invention will be given of the structure of the main plate 202. In reference to FIG. 7, the main plate 202 further includes a rotation center 202WD of the day transmission wheel 462 according to the fifth embodiment, a rotation center 202WF of the hammer 466 according to the fifth embodiment, a rotation center 202WT2 of the day indicator driving wheel 320 according to the fifth embodiment, a rotation center 202WG of the small day wheel 464 according to the fifth embodiment. The rotation center of the day indicator driving wheel 320 according to the fifth embodiment can be arranged at a position the same as that of the rotation center 202WT2 of the day indicator driving wheel 320 according to the first embodiment. The respective rotation centers are formed with guide shaft portions for guiding center holes of the rotating members, or formed with guide holes for guiding shaft portions of the rotating members for rotatably supporting the rotating members rotated centering on the rotation centers. That is, the train wheel guide portion can be constituted by a guide hole, a guide bearing, a guide shaft, a guide pin or the like for rotatably guiding the rotating member.

That is, the main plate 202 includes the center pipe 202*b* arranged at the main plate center 202*c*, the lower bearing of the rotor 236, the lower bearing of the fifth wheel & pinion 238, the lower bearing of the fourth wheel & pinion 240, the lower bearing of the third wheel & pinion 242, the lower bearing of the minute wheel & pinion 260, the guide pin of the setting wheel 278, the guide pin of the day indicator driving wheel 310, the guide pin of the date star wheel 321, the guide pin of the day indicator driving wheel 320, the lower bearing of the small day wheel 322, the lower bearing of the day indicator 330, the lower bearing of the second indicator 340, the guide pin of the third corrector setting transmission wheel 353, the guide pin of the date corrector setting wheel 355, the guide pin of the day transmission wheel 462, a guide pin of the hammer 466, and a guide pin of the small day wheel 464. For example, the bearing can be constituted by a hole jewel, a mortice frame, a through hole, a blind hole or the like. For example, the guide pin can be formed integrally with the main plate 202, or a pin formed separately from the main plate 202 can be fixed to the main plate 202. Or, in place of the bearing, the guide member of a pin or the like can also be used. Or, in place of the guide pin, a guide member of a hole jewel, a mortice frame, a through hole, a blind hole or the like can also be used.

The movement 201, the movement 201B, and the movement 451 include a first train wheel rotation center for a train wheel used in fabricating a first type of multifunction timepiece having an arrangement of a first type of small hand, a second train wheel rotation center for a train wheel used in fabricating a second type of multifunction timepiece having an arrangement of a second type of small hand, and a third train wheel rotation center for a train wheel used in fabricating a third type of multifunction timepiece having an arrangement of a third type of small hand. The first train wheel rotation center, the second train wheel rotation center, the third train wheel rotation center are provided with train wheel guide portions (guide holes, guide bearings, guide shafts, guide pins or the like) for rotatably guiding train wheel members rotated centering on the positions. The first train wheel rotation center, the second train wheel rotation center, the third train wheel rotation center are arranged at positions between the main plate center 202*c* of the main plate 202 and the main plate outer shape portion of the main plate 202. As explained above, according to the first embodiment, the second embodiment, the fifth embodiment of the invention, the main plate 202 can be used for the movement 201, and can be used for the movement 201B, and can be used for the movement 451.

(5.4) Structure of Setting Lever Jumper:

Next, a structure of the setting lever jumper 480 will be explained. The setting lever jumper 480 used in the fifth embodiment of the multifunction timepiece of the invention differs from the setting lever jumper 316 used in the first embodiment in shapes of the date jumper, and the day jumper. In reference to FIG. 41, the setting lever jumper 480 includes a first day jumper 480*a* for setting a position in a rotational direction of the date star wheel 312 according to the first embodiment, a second date jumper 480*b* for setting a position in a rotational direction of the date star wheel 312 according to the second embodiment, and a day jumper press spring portion 480*c* for pressing a setting portion provided at a front end of the day jumper 316*c* to the day transmission wheel portion 462*b* of the day transmission wheel 462 according to the fifth embodiment.

It is preferable to arrange a spring portion of the first date jumper 481*a* at a region between "2 o'clock direction" and "6 o'clock direction" (that is, "2-6 o'clock region"). It is preferable to arrange a setting portion provided at a front end of a spring portion of the first date jumper 480*a* at a region between "1 o'clock direction" and "3 o'clock direction" (that is, "1-3 o'clock region"). It is preferable to arrange a spring portion of the second date jumper 480*b* at a region between "11 o'clock direction" and "1 o'clock direction" (that is, "11-1 o'clock region"). It is preferable to arrange a setting portion provided at a front end of a spring portion of the second date jumper 480*b* at a region between "12 o'clock direction" and "1 o'clock direction" (that is, "12-1 o'clock region"). It is preferable to arrange a position of the day jumper press spring portion 480*c* at a region between "9 o'clock direction" and "11 o'clock direction" (that is, "9-11 o'clock region").

As a modified example, in reference to FIG. 42, a setting lever jumper 482 includes a date jumper 482*a* for setting a position in a rotational direction of the date star wheel 312 according to the first embodiment, and a day jumper press spring portion 482*c* for pressing the setting portion provided at a front end of the day jumper 316*c* to the day transmission wheel portion 462*b* of the day transmission wheel 462 according to the fifth embodiment. The setting lever jumper 482 constituted as described above cannot be used in the second embodiment. It is preferable to arrange a spring portion of the date jumper 482*a* at a region between "12 o'clock direction" and "2 o'clock direction" (that is, "12-2 o'clock region"). It is preferable to arrange a setting portion provided at a front end of the spring portion of the date jumper 482*a* at a region between "1 o'clock direction" and "2 o'clock direction" (that is, "1-2 o'clock region").

(5.5) Operation of Day Feeding Mechanism or the Like:

An explanation will be given as follows of operation of a day feeding mechanism according to the fifth embodiment of the multifunction timepiece of the invention. In reference to FIG. 36 through FIG. 38, in a state of instructing "Sun" expressing "Sunday" by the day hand 464*h*, the character, the numeral, the abbreviated character or the like of the dial 454, by rotation of the hour wheel 262, the day indicator driving wheel 320 is rotated. By rotating the day transmission wheel portion 462*b* of the day transmission wheel 462 by the day feeding finger 320*f* provided at the day indicator driving wheel 320, the day transmission wheel 462 is rotated once per 1 day (1/7). The front end portion of the return spring portion 472*c* is brought into contact with the portion proximate to the minimum radius of the cam outer shape portion of the return cam portion 464*c*. The position in the rotational direction of the day transmission wheel 462 is set by the day jumper 316*c* rotatably provided to the main plate 202. The day jumper press spring portion 480*c* provided at the setting lever jumper 316 presses the setting portion provided at the front end of the day jumper 316*c* to the day transmission wheel portion 462*b* of the day transmission wheel 462. The cam contact portion 466*c* of the hammer 466 is brought into contact with the transmission cam portion 462*c* of the day transmission wheel 462. The first operating wheel portion 466*f* of the hammer 466 is brought in mesh with the day wheel portion 464*b* of the small day wheel 464. The return spring portion 472*c* of the day return spring 472 brings the return cam portion 464*c* of the small day wheel 464 into contact with the portion proximate to the minimum radius of the cam outer shape portion of the small day wheel 464. By the spring force of the return spring portion 472*c*, the small day wheel 464 always receives the force of being rotated in the counterclockwise direction. The hammer 466 always receives the force of being rotated in the clockwise direction. The front end portion of the cam contact portion 466*c* of the hammer 466 always receives the force of being pressed to the transmission cam portion 462*c* of the day transmission wheel 462.

Next, in reference to FIG. 39, in the state of instructing "Sun" expressing "Sunday" by the small day wheel 464, the front end portion of the cam contact portion 466*c* of the hammer 466 is pressed to the portion proximate to the minimum radius portion in the transmission cam portion 462*c* of the day transmission wheel 462. When the day feeding finger 320*f* rotates the day transmission wheel portion 462*b* of the day transmission wheel 462 by an amount of 1 day, that is, (1/7) by rotating the hour wheel 262 from the state of indicating "Sun" expressing "Sunday" shown in FIG. 38, the front end portion of the return spring portion 472*c* is rotated by an amount of 1 day to be brought into contact with the position at which the radius is enlarged from the minimum radius of the cam outer shape portion of the return cam portion 464*c*. The position in the rotational direction of the day transmission wheel 462 is set by the day jumper 316*c* provided rotatably to the main plate 202. The first operating wheel portion 466*f* of the hammer 466 rotates the small day wheel 464 by an amount of 1 day to bring about a state of instructing "Mon" expressing "Monday". The return spring portion 472*c* of the day return spring 472 is brought into contact with the position at which the radius is enlarged by rotating the return cam portion 464*c* of the small day wheel 464 by an amount of 1 day from the minimum radius of the cam outer shape portion of the small day wheel 464. By the spring force of the return spring portion 472*c*, the small day wheel 464 always receives a force of being rotated in the counterclockwise direction. The hammer 466 always receives a force of being rotated in the clockwise direction. The front end portion of the cam contact portion 466*c* of the hammer 466 always receives a force of being pressed to the transmission cam portion 462*c* of the day transmission wheel 462. Similarly, the small day wheel 464 is rotated by the amount of 1 day, a state of instructing "Tue" expressing "Tuesday" is brought about from the state of instructing "Mon" expressing "Monday", successively, a state of instructing "Wed" expressing "Wednesday" is brought about, successively, a state of instructing "Thu" expressing "Thursday" is brought about, successively, a state of instructing "Fri" expressing "Friday" is brought about, successively, a state of instructing "Sat" expressing "Saturday" is brought about. Further, the state can be changed into a state of instructing "Sun" expressing "Sunday".

In reference to FIG. 40, in the state of instructing "Sat" expressing "Saturday", the front end portion of the return spring portion 472*c* is brought into contact with the position the most proximate to the maximum radius of the cam outer shape portion of the return cam portion 464*c*. The return spring portion 472*c* of the day return spring 472 brings the return cam portion 464*c* of the small day wheel 464 into contact with the position the most proximate to the maximum radius of the cam outer shape portion of the small day wheel 464. In the state of instructing "Sat" expressing "Saturday", when the day feeding finger 320*f* rotates the day transmission wheel portion 462*b* of the day transmission wheel 462 by the amount of 1 day, that is, (1/7) by rotating the hour wheel 262, the front end portion of the cam contact portion 466*c* of the hammer 466 is moved from the portion proximate to the maximum radius portion in the transmission cam portion 462*c* of the day transmission wheel 462 and is pressed to the portion proximate to the minimum radius portion in the transmission cam portion 462*c* of the day transmission wheel 462. Further, the return spring portion 472*c* of the day return spring 472 brings the return cam portion 464*c* of the small day wheel 464 into contact with the position the most proximate to the minimum radius of the cam outer shape portion of the small day wheel 464 from the position the most proximate to the maximum radius of the cam outer shape portion of the small day wheel 464.

(5.6) Explanation of Hand Position and Hand Specification:

In reference to FIG. 10 and FIG. 43, in the seventh kind of the embodiment of the invention, time information with regard to "hour" of the 12 hour system can be indicated by the hour hand 262*h* attached to the hour wheel 262 the rotation center of which is the main plate center 202*c*, time information with regard to "minute" can be indicated by the minute hand 244*h* attached to the center wheel & pinion 244 the rotation center of which is the main plate center 202*c*, time information with regard to "second" can be indicated by the small second hand 340*h* attached to the second indicator 340 the rotation center of which is arranged in "6 o'clock direction", calendar information with regard to "date" can be indicated by the date hand 312*h* attached to the date star wheel 312 the rotation center of which is arranged in "3 o'clock direction", calendar information with regard to "day" can be indicated by a so-to-speak "retrograde type" by the day hand 464*h* attached to the small day wheel 464 the rotation center of which is arranged in "9 o'clock direction" and capable of being operated in the fan shape. For example, the day hand 464*h* can indicate calendar information with regard to "day" in a range of 90 degrees through 160 degrees. In view of allowance of design of constituent parts and design performance of day indication, it is preferable that the day hand 464*h* indicates calendar information with regard to "day" in a range of 100 degrees through 120 degrees.

It is preferable to constitute a distance from the main plate center 202*c* to the rotation center of the minute hand 312*h*, a distance from the main plate center 202*c* to the rotation center of the small second hand 340*h*, a distance from the main plate center 202*c* to the rotation center of the 24 hour hand 330*h* to be equal to each other. However, the distance between the centers can also be constituted not to be equal to each other. It is preferable to constitute such that the distance from the main plate center 202*c* to the rotation center of the day hand 464*h* be larger than the distance from the main plate center 202*c* to the rotation center of the date hand 312*h*. It is preferable to constitute such that the distance from the main plate center 202*c* to the rotation center of the day hand 464*h* be larger than the distance from the main plate center 202*c* to the rotation center of the 24 hour hand 330*h*. It is preferable to constitute such that the distance from the main plate center 202*c* the rotation center of the day hand 464*h* to be larger than the distance from the main plate center 202*c* to the rotation center of the small second hand 340*h*.

The dial 204 is provided with characters, numerals, abbreviated characters or the like for indicating respective time information, and calendar information. For example, in order to indicate calendar information with regard to "date", numerals of "10", "20", "31" are provided along a circumference at positions in correspondence with the date hand 312*h* of the dial 454. For example, in order to indicate time information with regard to "second", numerals of "10", "20", "30", "40", "50", "60" are provided along a circumference at positions in correspondence with the small second hand 340*h* of the dial 454. For example, in order to indicate calendar information with regard to "day", English letters of "Sun", "Mon", "Tue", "Wed", "Thu", "Fri", "Sat" are provided along a circumference at positions in correspondence with the day hand 464*h* of the dial 454. Or, in order to indicate calendar information with regard to "day", numerals, Japanese letters, foreign language letters, Roman numerals, signs or the like can also be used.

In reference to FIG. 10 and FIG. 44, in the eighth kind of the embodiment of the invention, time information with regard to "hour" of the 12 hour system can be indicated by the hour hand 262*h* attached to the hour wheel 262 the rotation center of which is the main plate center 202*c*, time information with regard to "minute" can be indicated by the minute hand 244*h* attached to the center wheel & pinion 244 the rotation center of which is the main plate center 202*c*, time information with regard to "second" can be indicated by the small second hand 340*h* attached to the second indicator 340 the rotation center of which is arranged in "6 o'clock direction", time information with regard to "hour" of the 24 hour system can be indicated by the 24 hour hand 330*h* attached to the hour indicator 330 the rotation center of which is arranged in "12 o'clock direction", calendar information with regard to "date" can be indicated by the date hand 312*h* attached to the date star wheel 312 the rotation center of which is arranged in "3 o'clock direction", calendar information with regard to "day" can be indicated by the so-to-speak "retrograde type"

by the day hand 464*h* attached to the small day wheel 464 the rotation center of which is arranged in "9 o'clock direction" and capable of being operated in the fan shape. For example, in order to indicate time information with regard to "hour" of the 24 hour system, numerals of "6", "12", "18", "24" are provided along a circumference at positions in correspondence with the 24 hour hand 330*h* of the dial 454.

For example, in order to indicate calendar information with regard to "day", English letters of "Sun", "Mon", "Tue", "Wed", "Thu", "Fri", "Sat" are arranged substantially in the fan shape along a circumference at positions in correspondence with the day hand 464*h* of the dial 454. Or, in order to indicate calendar information with regard to "day", numerals, Japanese letters, foreign language letters, Roman numerals, signs or the like can also be used.

INDUSTRIAL APPLICABILITY

The analog multifunction timepiece of the invention can form a plurality of movement layouts including small hands including a plurality of types of hand operating train wheels by only changing positions of integrating parts without changing dimensions and shapes of parts of the movements. Further, the analog multifunction timepiece of the invention can form a plurality of movement layouts having small hands with excellent production efficiency since much time period is not needed for switching part working operations and steps of fabricating parts are small.

BRIEF DESCRIPTION OF THE DRAWINGS

FIG. 10 is a view showing at able of a hand position and a hand specification of a small hand according to the first embodiment of the multifunction timepiece of the invention.

DESCRIPTION OF REFERENCE NUMERALS AND SIGNS

Figure 1:
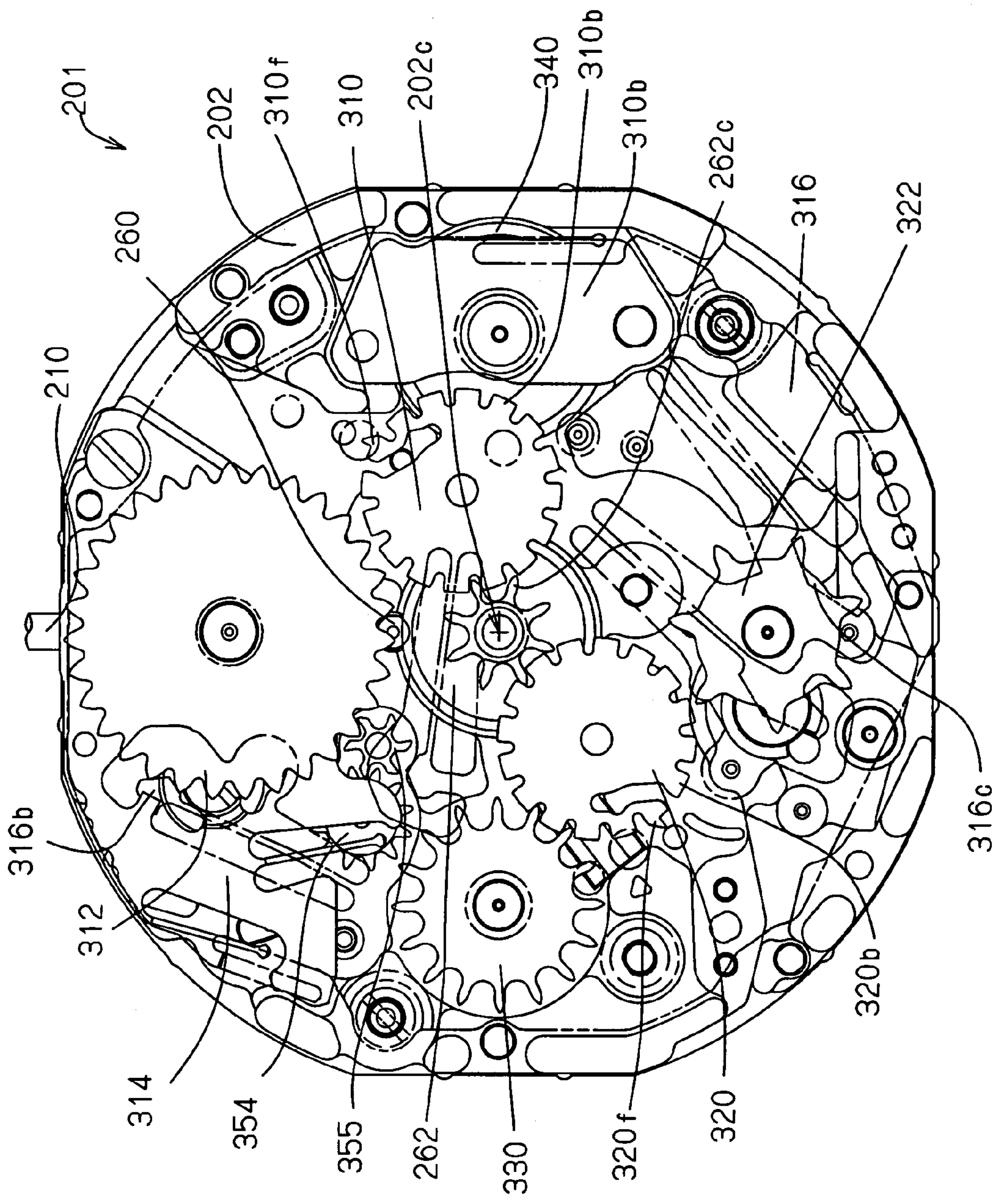
FIG. 1 is a plane view showing an outline structure viewed from a back side of a movement according to a first embodiment of a multifunction timepiece of the invention.
Figure 2:
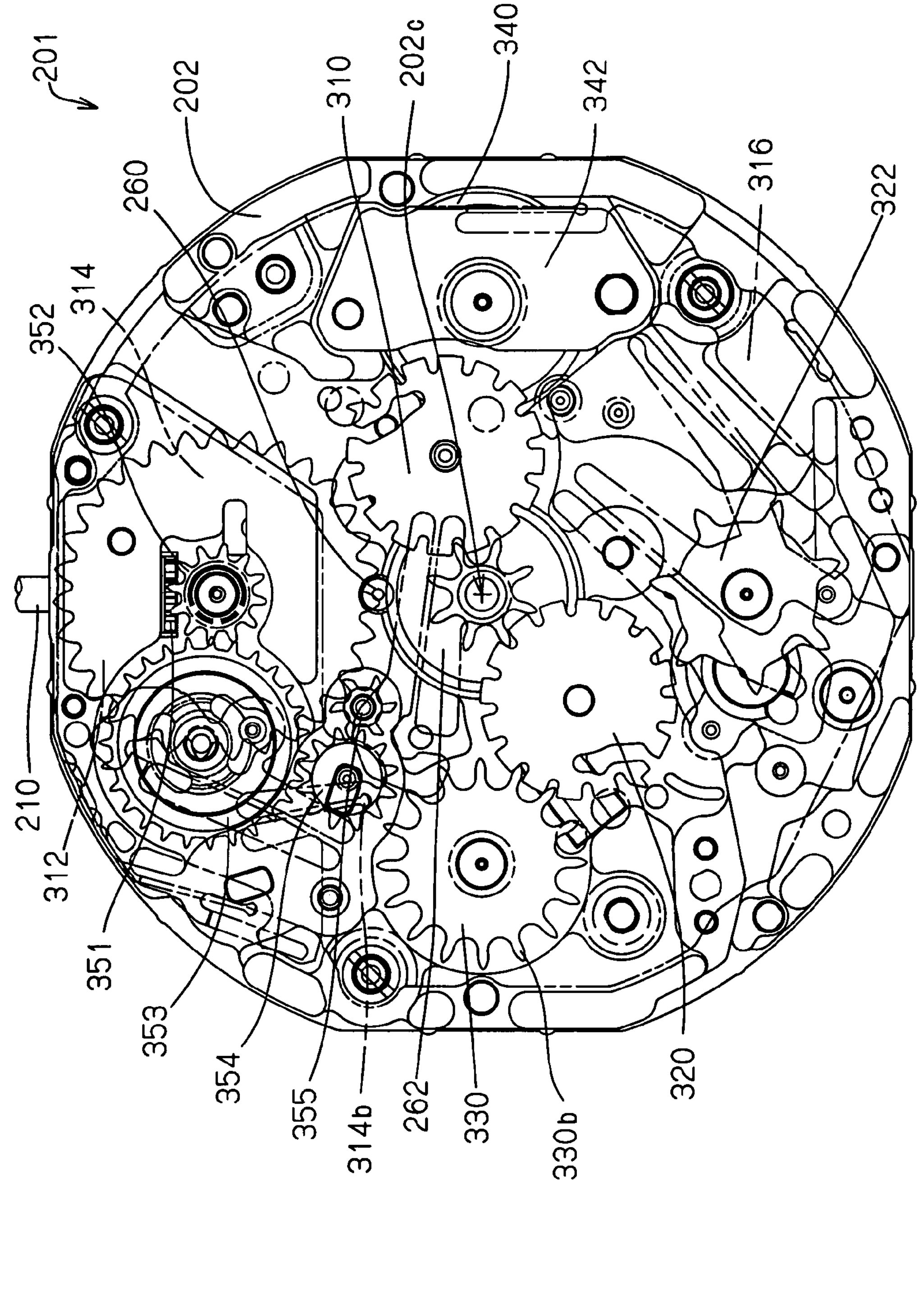
FIG. 2 is a plane view showing a date correcting mechanism on the back side of the movement according to the first embodiment of the multifunction timepiece of the invention.
Figure 3:
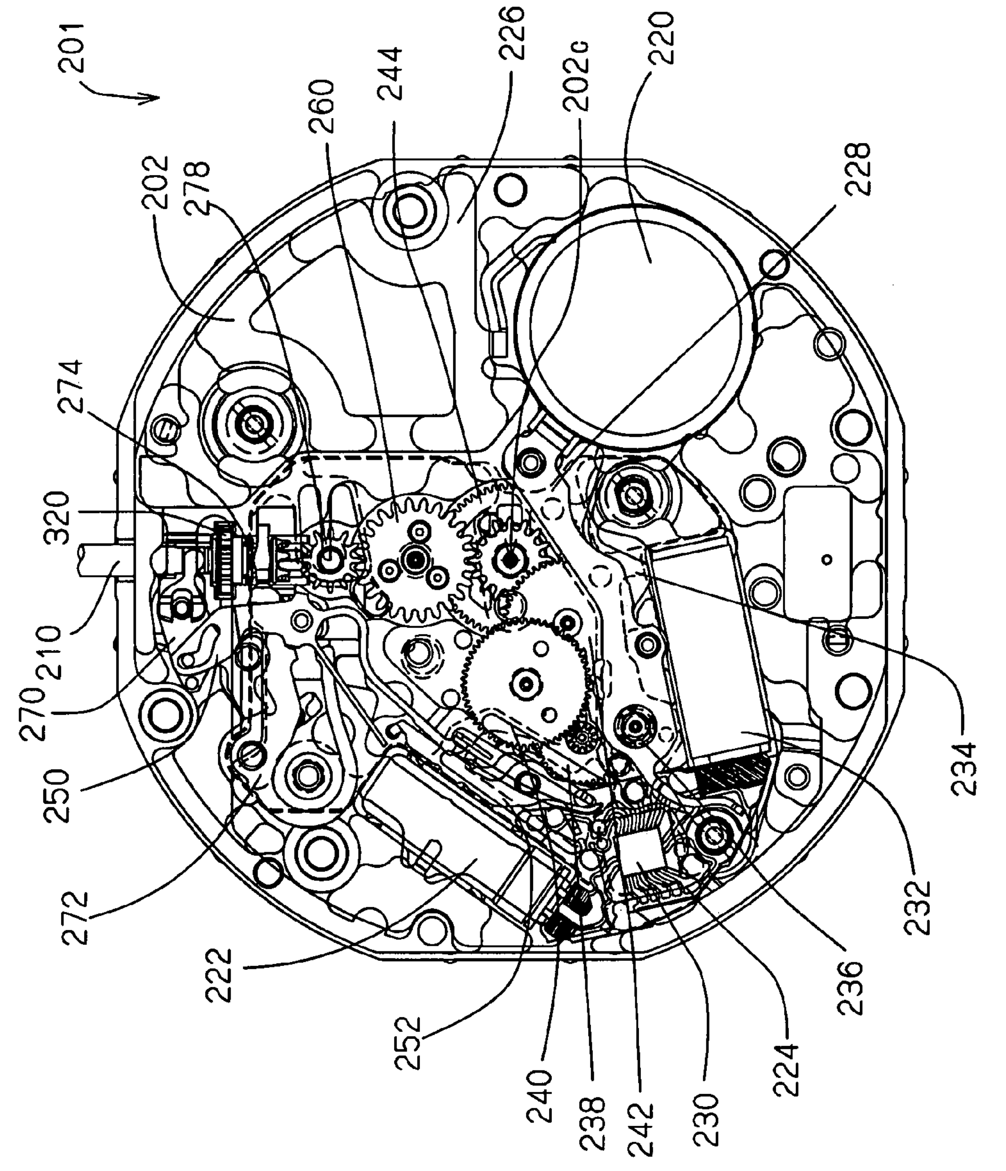
FIG. 3 is a plane view showing an outline structure viewed from a top side of the movement according to the first embodiment of the multifunction timepiece of the invention.
Figure 4:
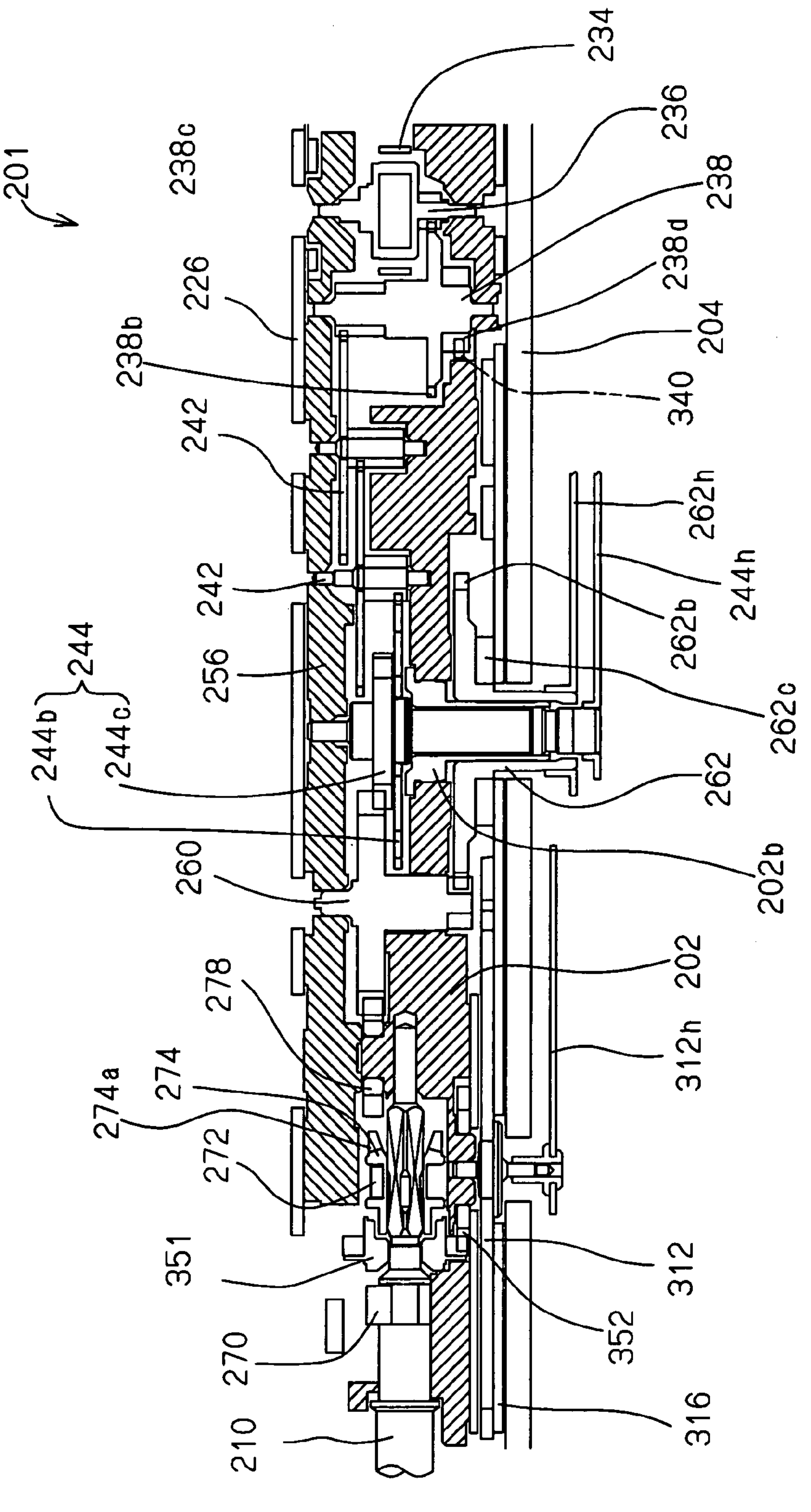
FIG. 4 is a partial sectional view showing portions of a winding stem and a top train wheel according to the first embodiment of the multifunction timepiece of the invention.
Figure 5:
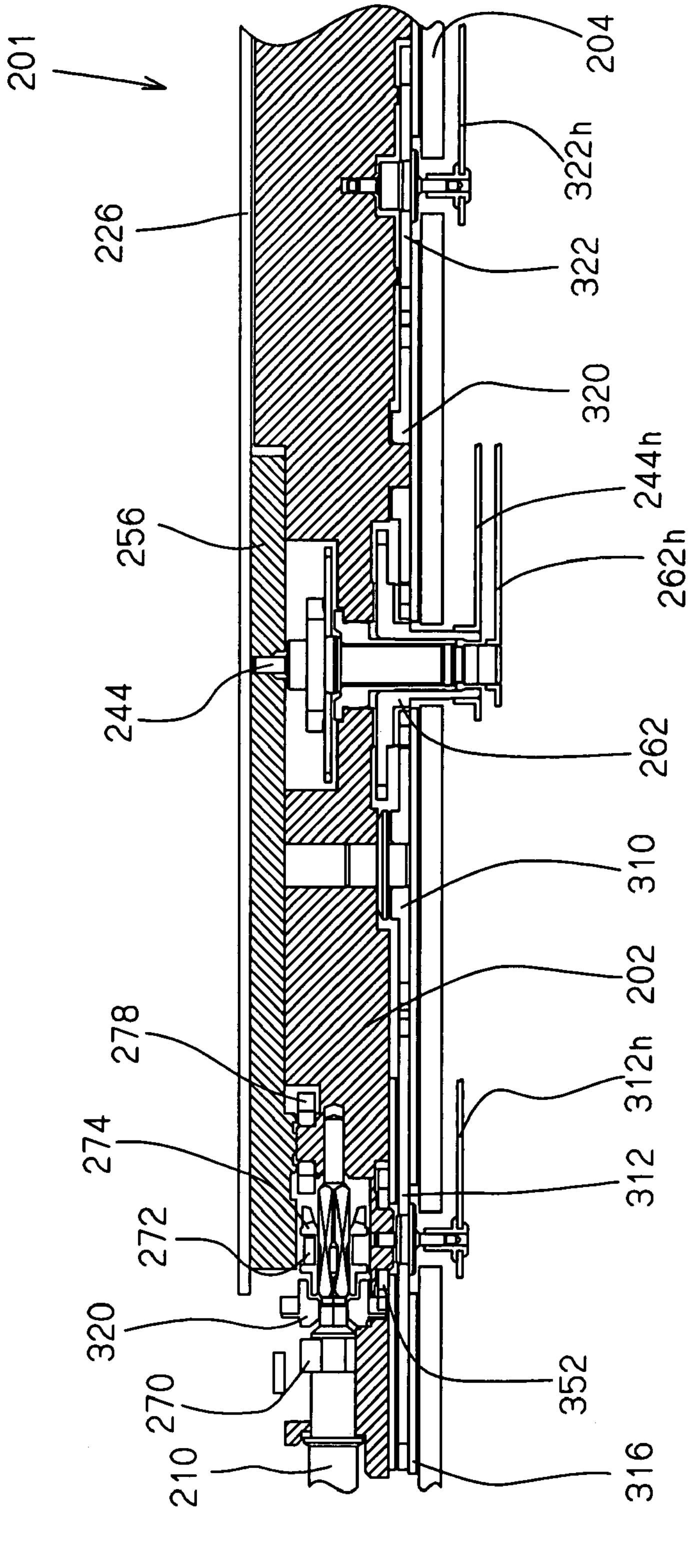
FIG. 5 is a partial sectional view showing portions of the winding stem and a back train wheel according to the first embodiment of the multifunction timepiece of the invention.
Figure 6:
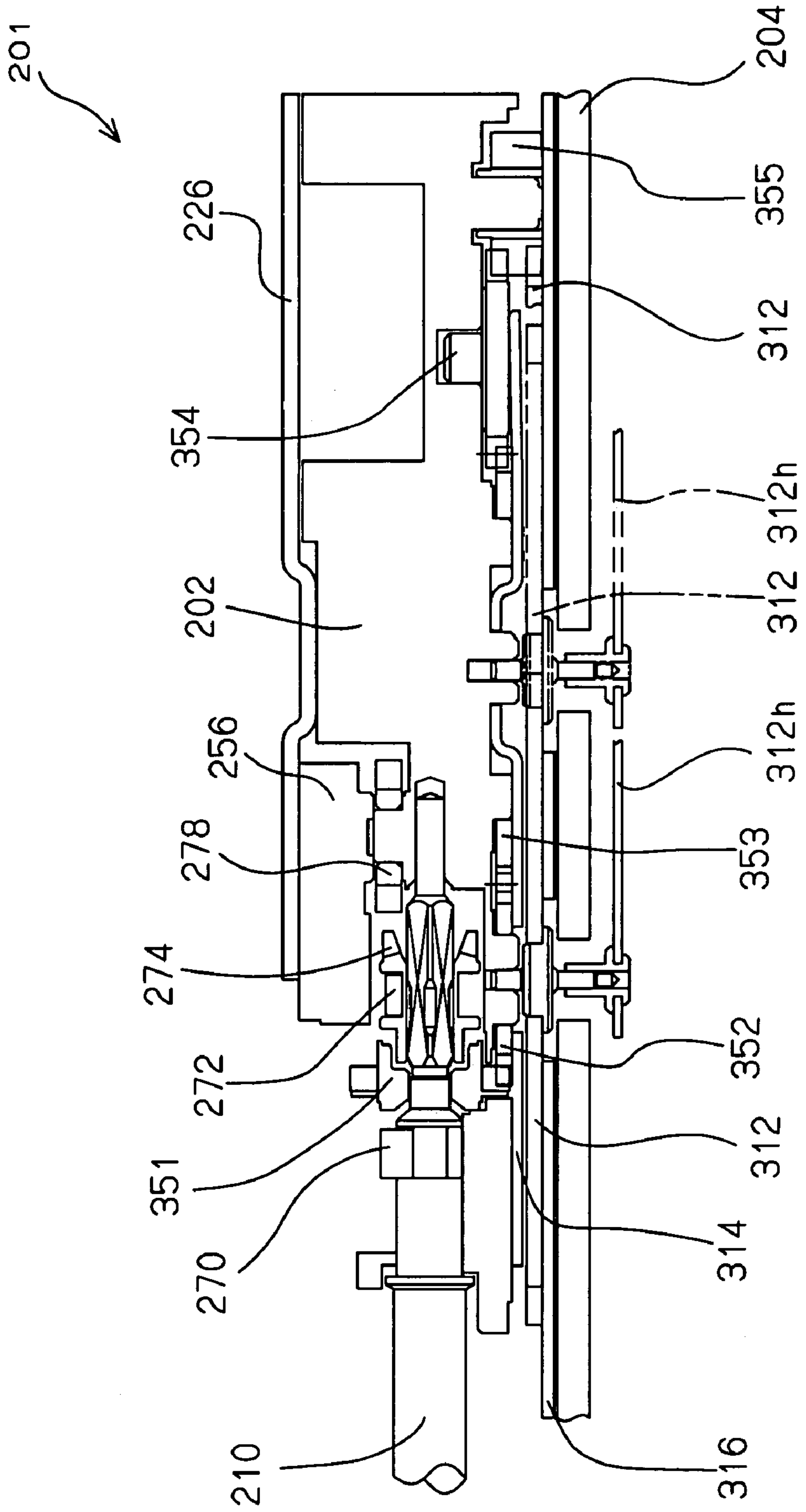
FIG. 6 is a partial sectional view showing portions of the winding stem and a date correcting mechanism according to the first embodiment of the multifunction timepiece of the invention.
Figure 7:
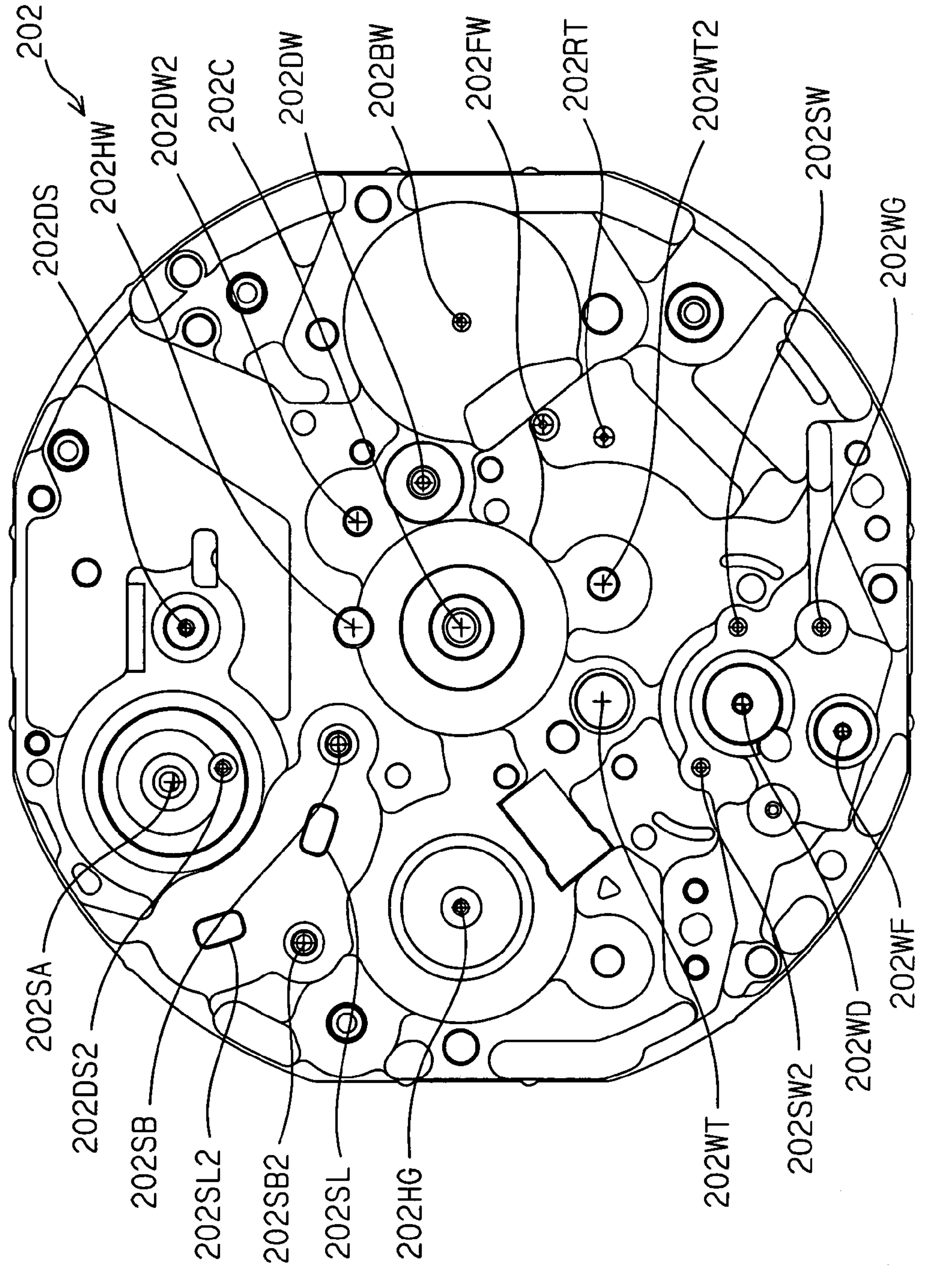
FIG. 7 is a plane view showing a shape viewed from a back side of a main plate according to a first embodiment of the multifunction timepiece of the invention.
Figure 8:
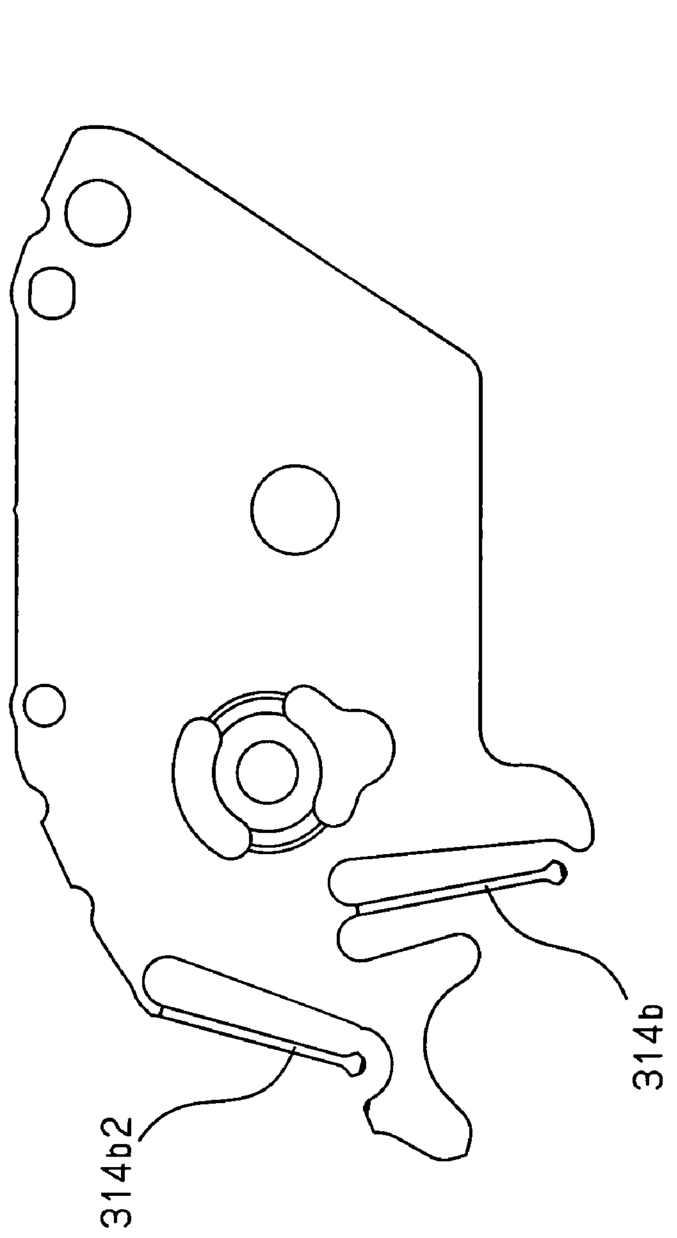
FIG. 8 is a plane view showing a shape viewed from a top side of a date corrector setting transmission wheel holder according to the first embodiment of the multifunction timepiece of the invention.
Figure 9:
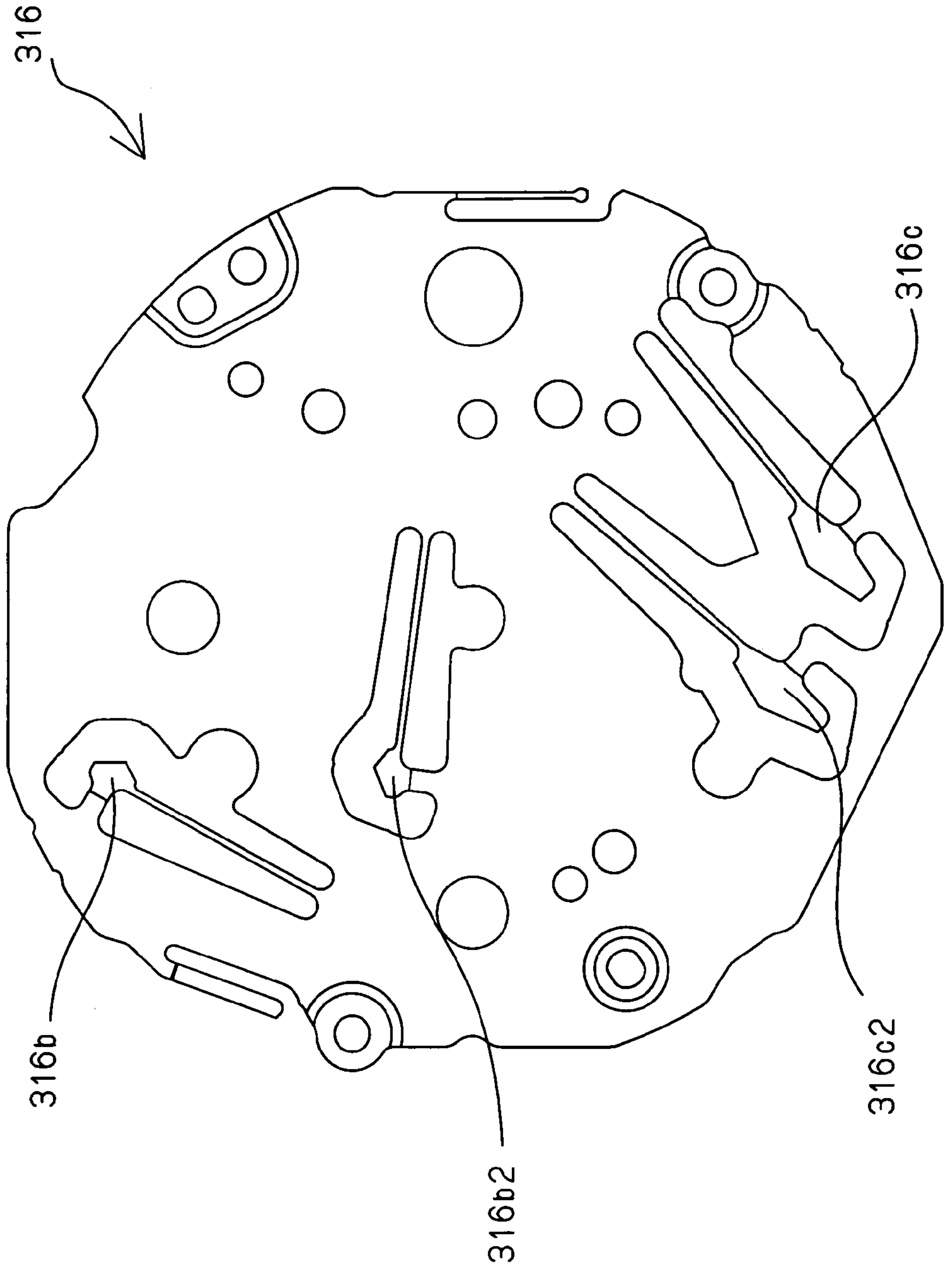
FIG. 9 is a plane view showing a shape viewed from a top side of a setting lever jumper according to the first embodiment of the multifunction timepiece of the invention.
Figure 11:
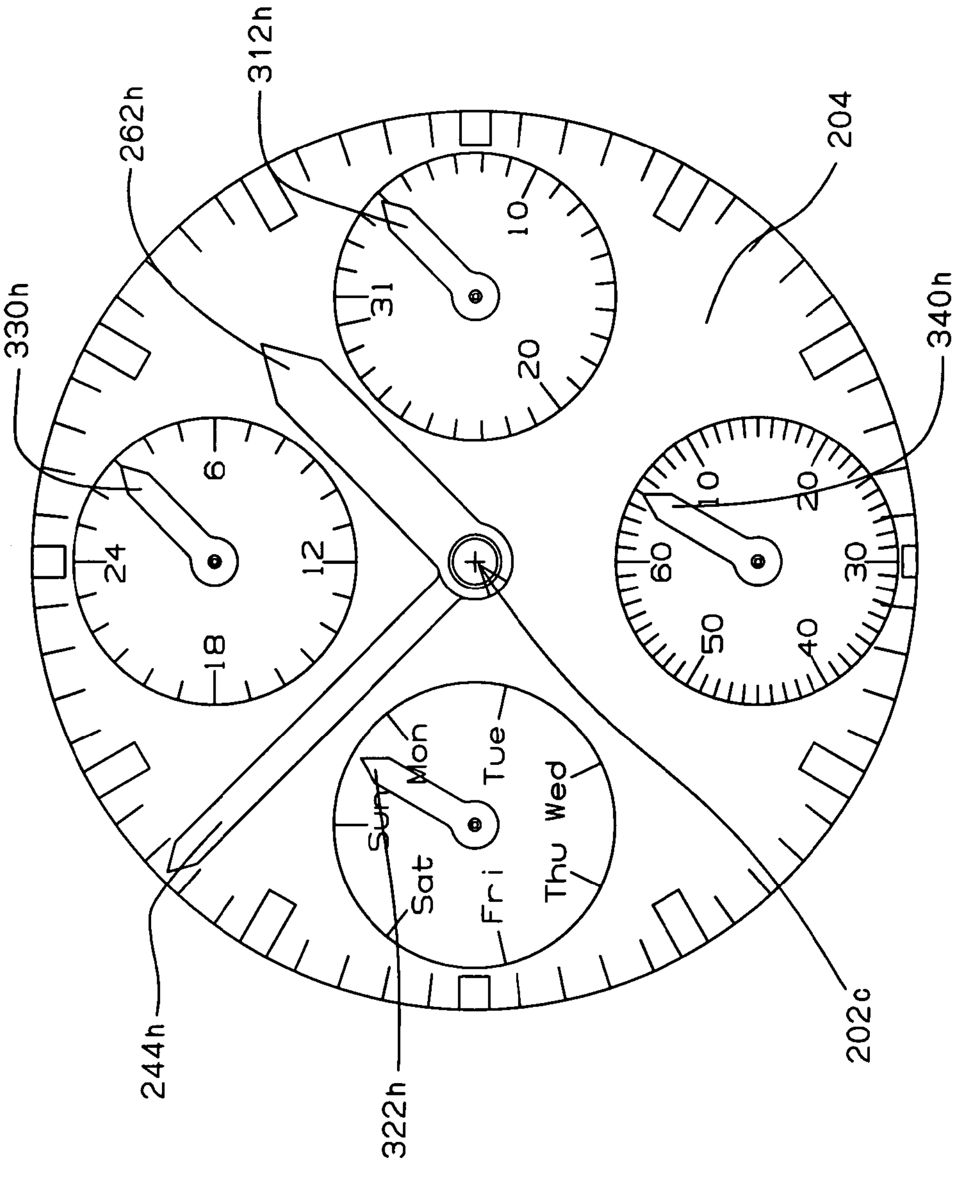
FIG. 11 is a plane view showing portions of a dial and a hand of a complete including 4 small hands according to the first embodiment of the multifunction timepiece of the invention.
Figure 12:
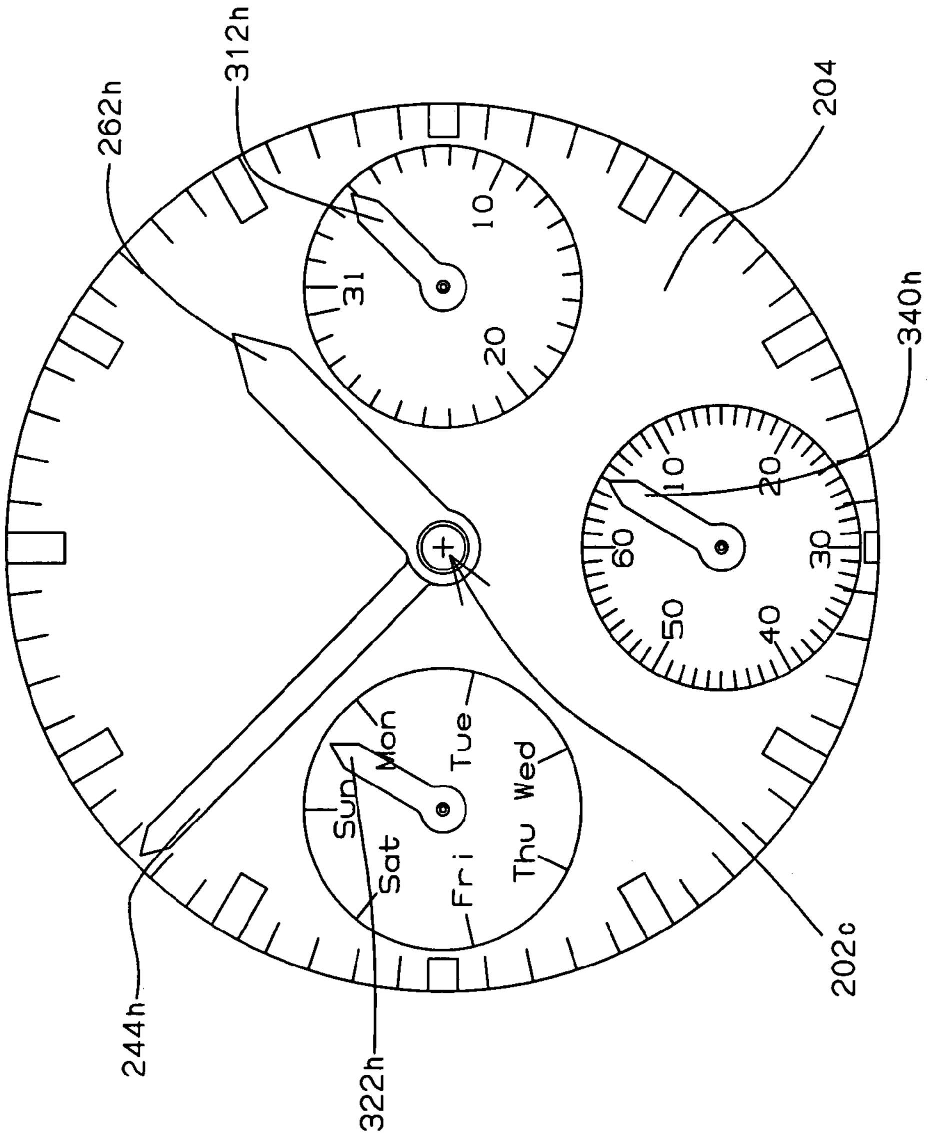
FIG. 12 is a plane view showing portions of a dial and a hand of a complete including 3 small hands according to the first embodiment of the multifunction timepiece of the invention.
Figure 13:
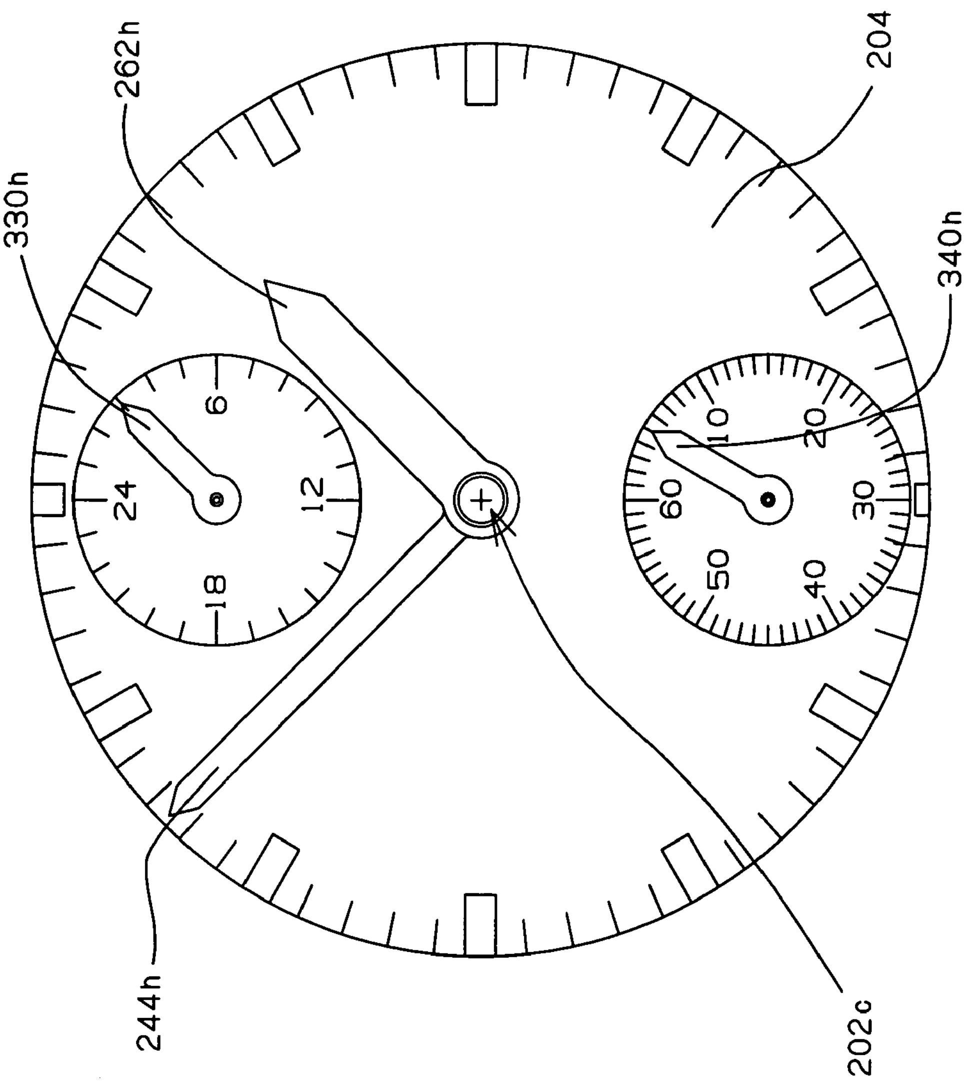
FIG. 13 is a plane view showing portions of a dial and a hand of a complete including small hands in 12 o'clock direction and 6 o'clock direction according to the first embodiment of the multifunction timepiece of the invention.
Figure 14:
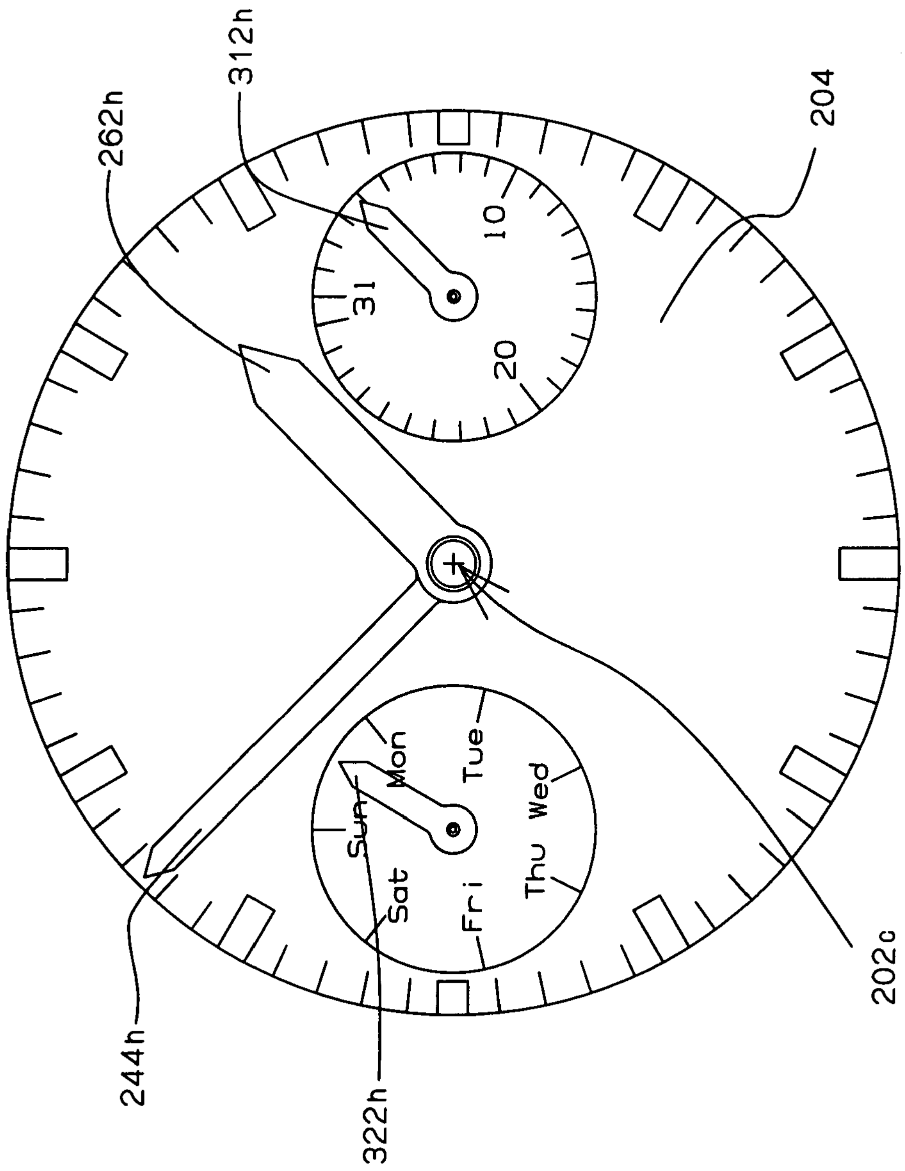
FIG. 14 is a plane view showing portions of a dial and a hand of a complete including small hands in 3 o'clock direction and 9 o'clock direction according to the first embodiment of the multifunction timepiece of the invention.
Figure 15:
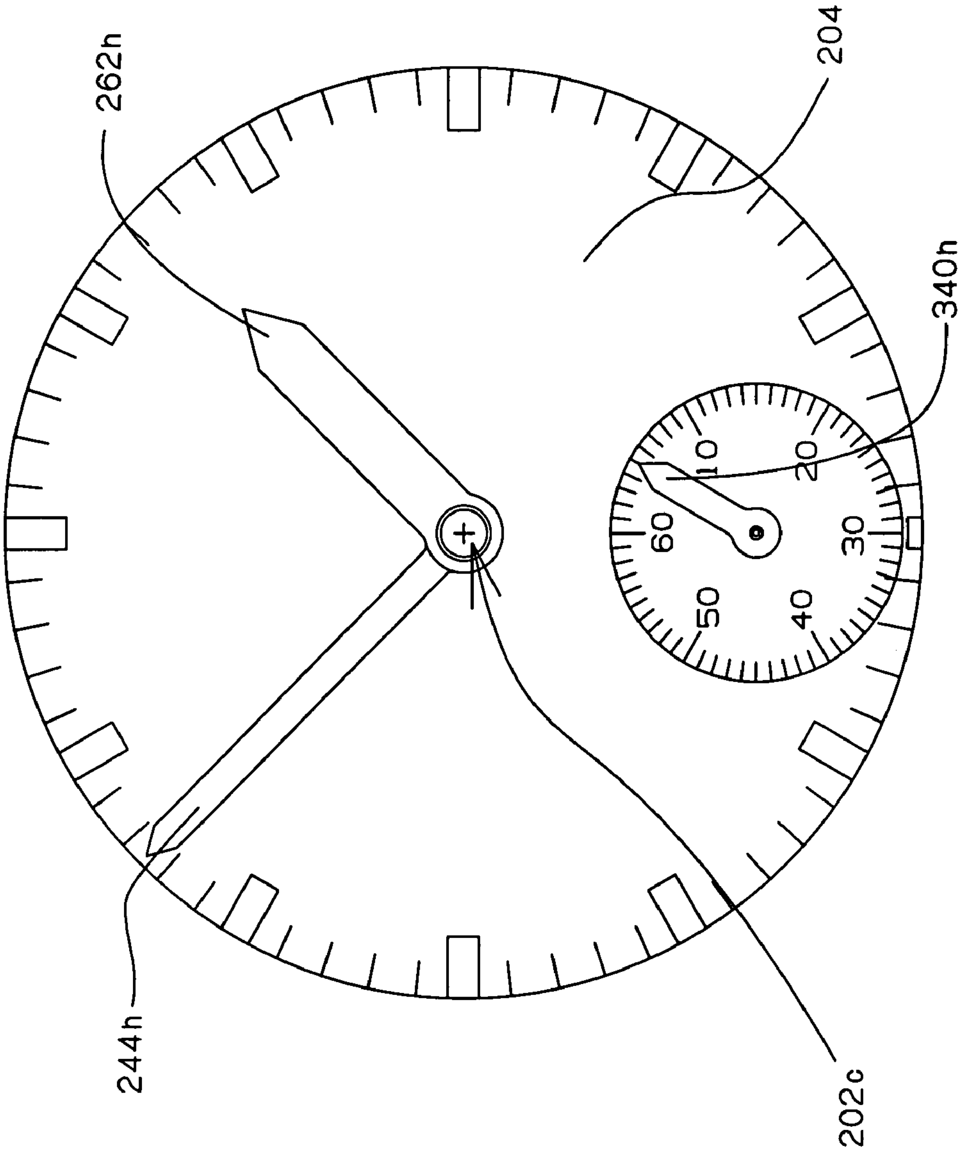
FIG. 15 is a plane view showing portions of a dial and a hand of a complete including one small hand according to the first embodiment of the multifunction timepiece of the invention.
Figure 16:
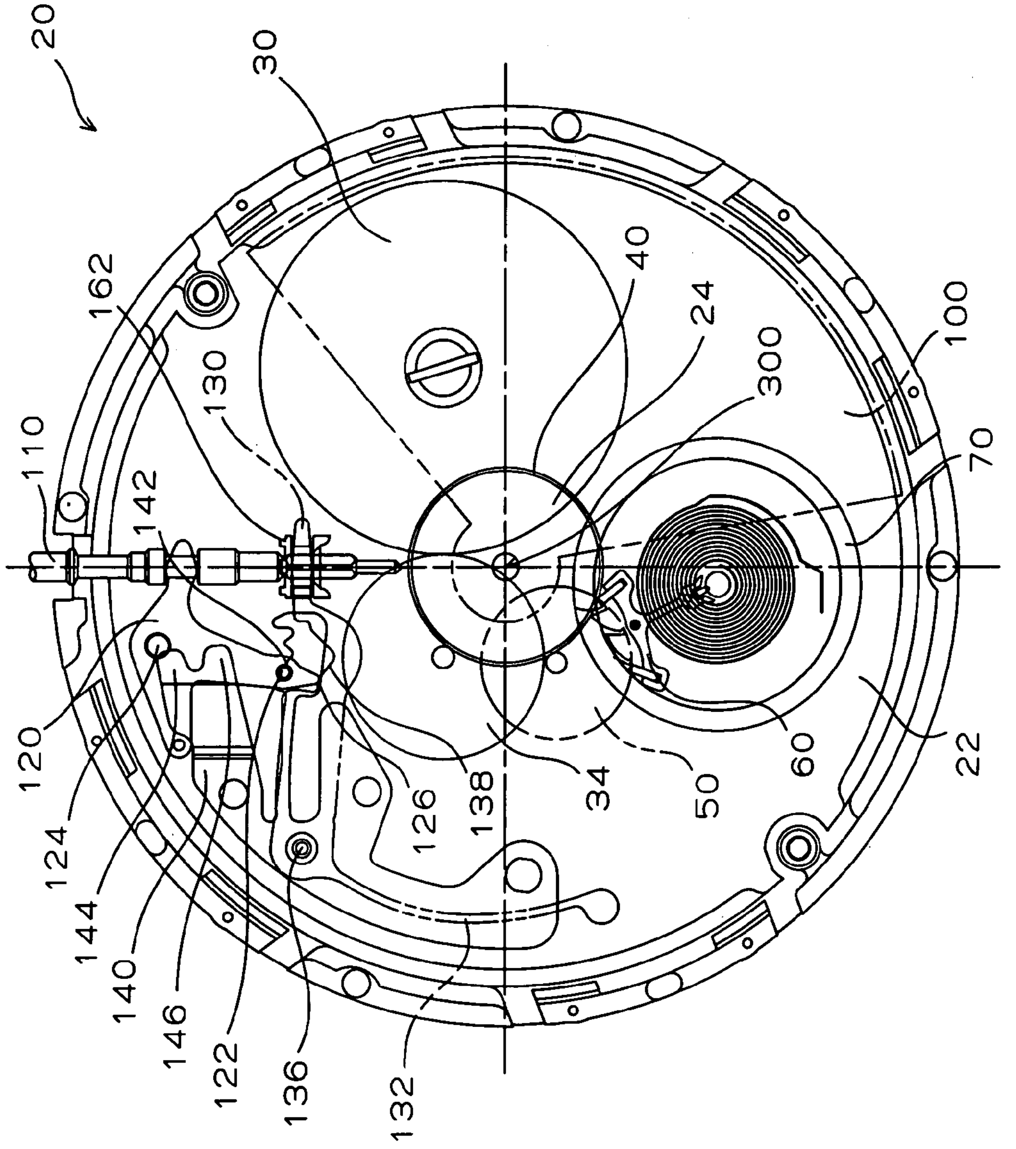
FIG. 16 is a plane view showing an outline structure viewed from a top side of a movement illustrated by omitting an automatic winding apparatus, a bridge member and the like in order to show clearly according to a modified example of the first embodiment of the multifunction timepiece of the invention.
Figure 17:
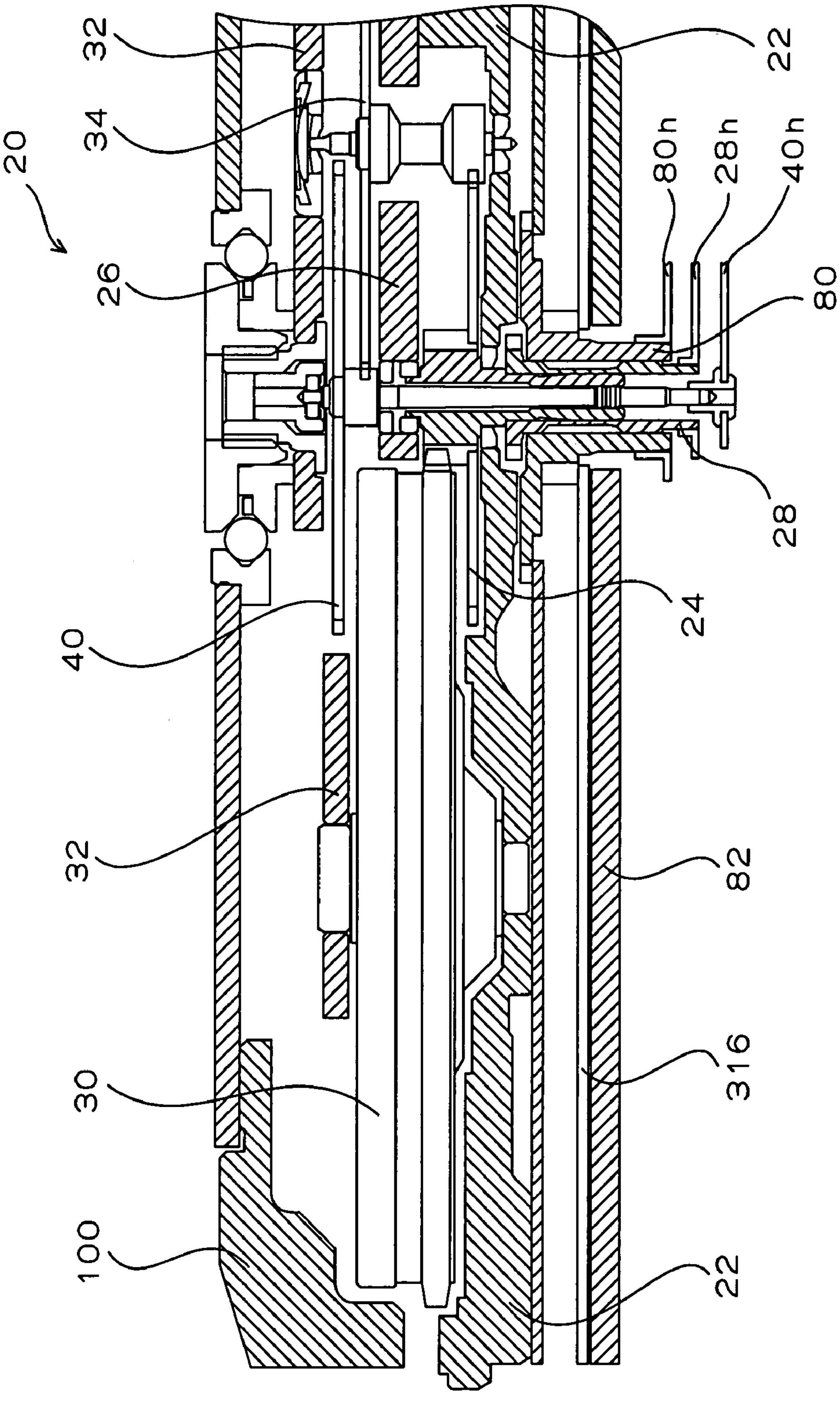
FIG. 17 is a sectional view showing an outline structure of portions of a barrel complete and a top train wheel according to a modified example of the first embodiment of the multifunction timepiece of the invention.
Figure 18:
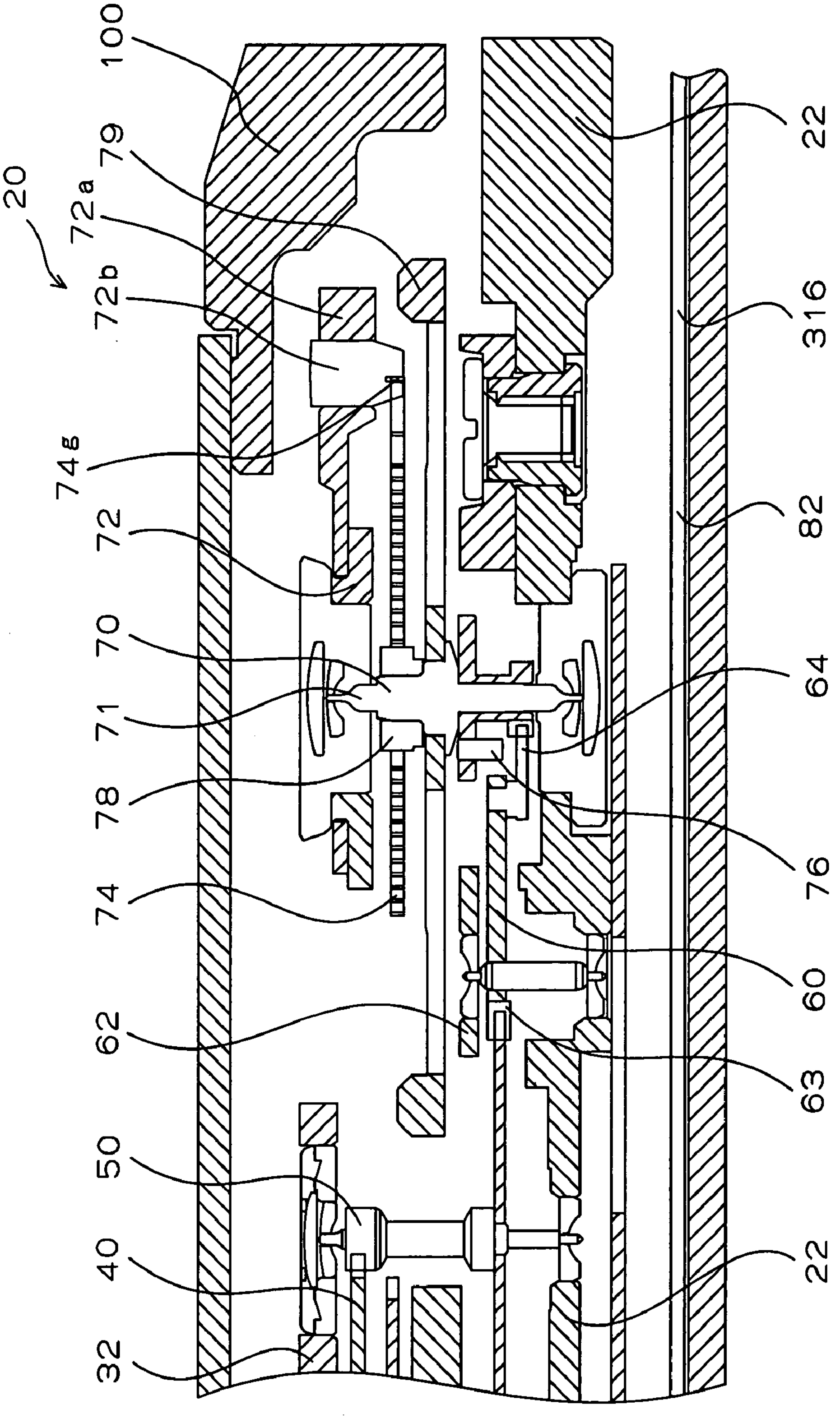
FIG. 18 is a sectional view showing an outline structure of portions of a balance with hairspring, a pallet fork, a balance with hairspring according to a modified example of the first embodiment of the multifunction timepiece of the invention.
Figure 19:
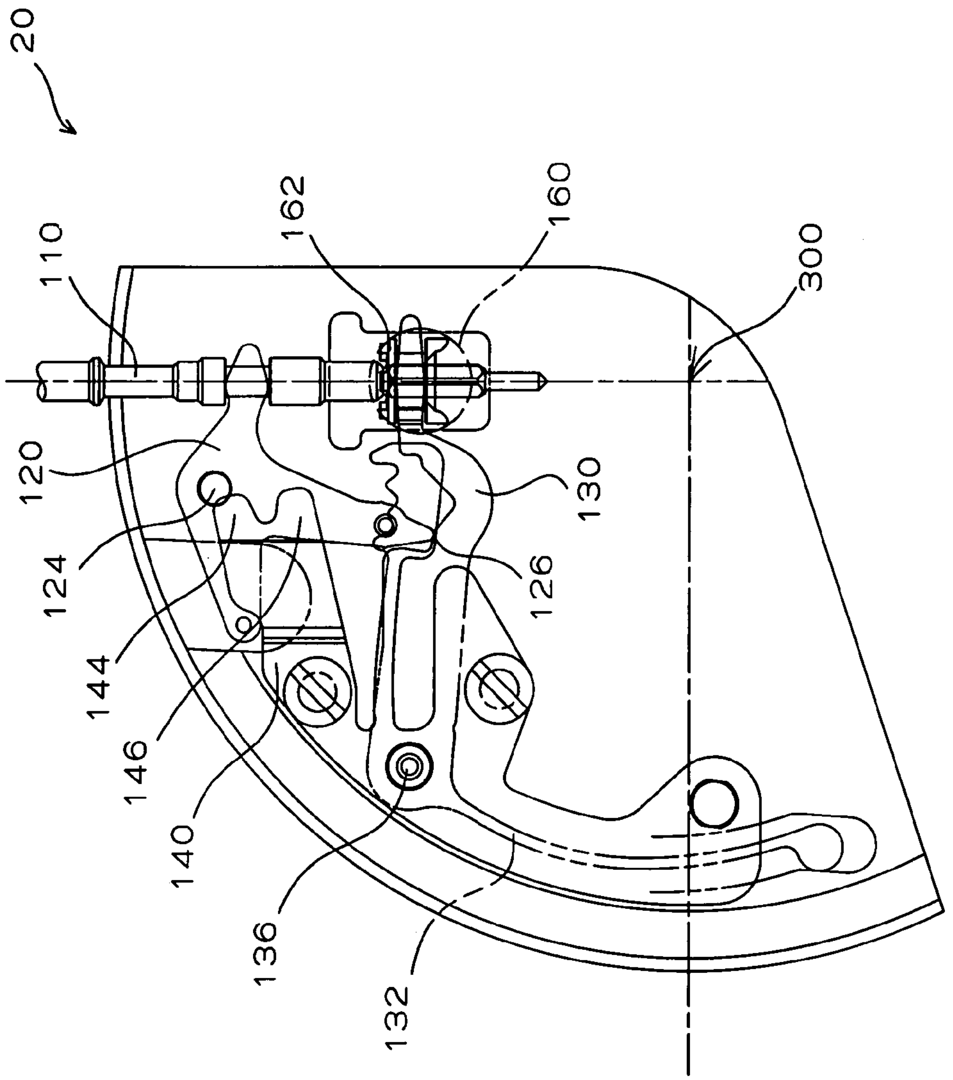
FIG. 19 is a plane view showing an outline structure of portions of a setting lever and a yoke according to a modified example of the first embodiment of the multifunction timepiece of the invention.
Figure 20:
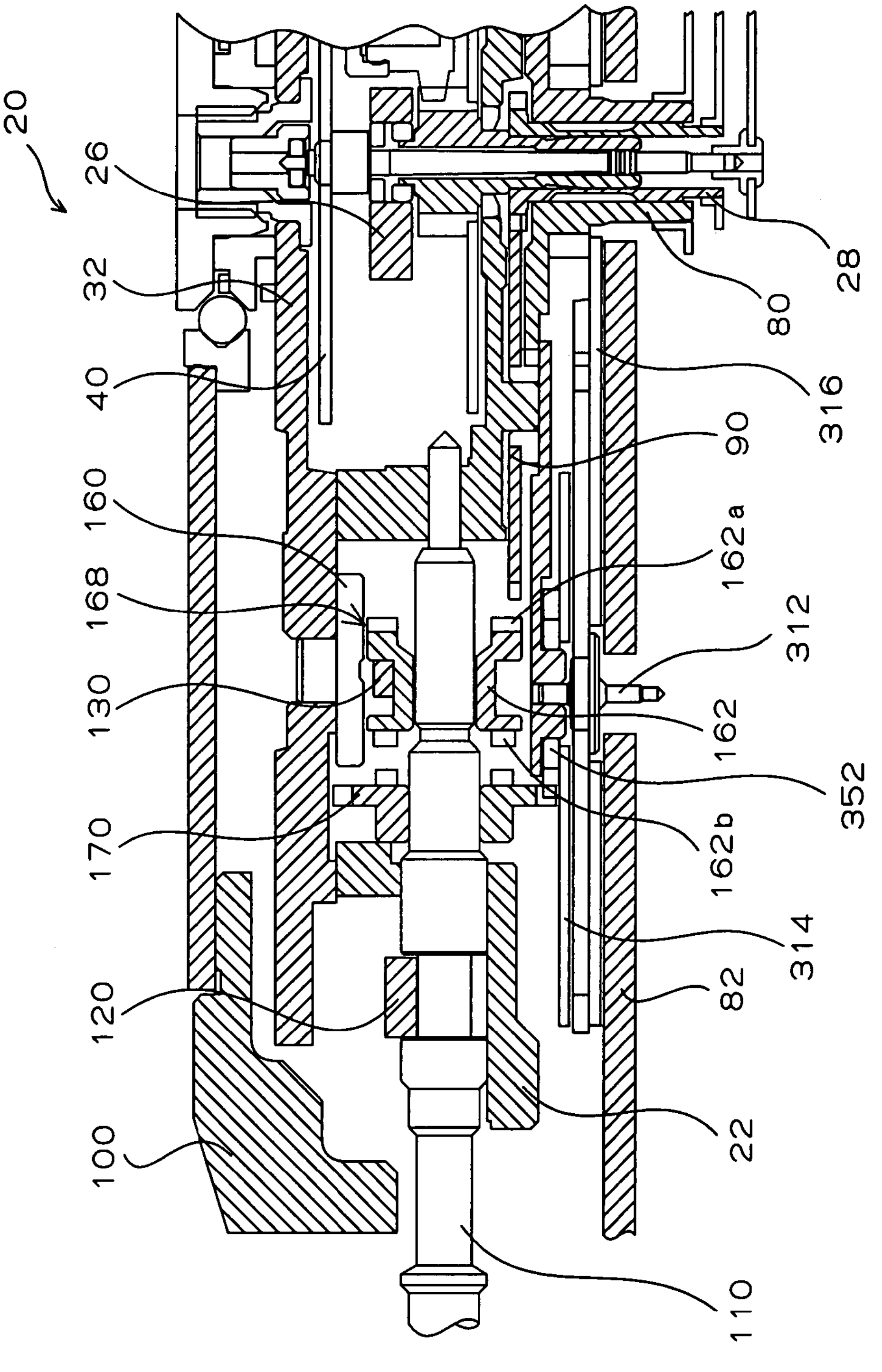
FIG. 20 is a sectional view showing an outline structure of a portion of a winding stem according to a modified example of the first embodiment of the multifunction timepiece of the invention.
Figure 21:
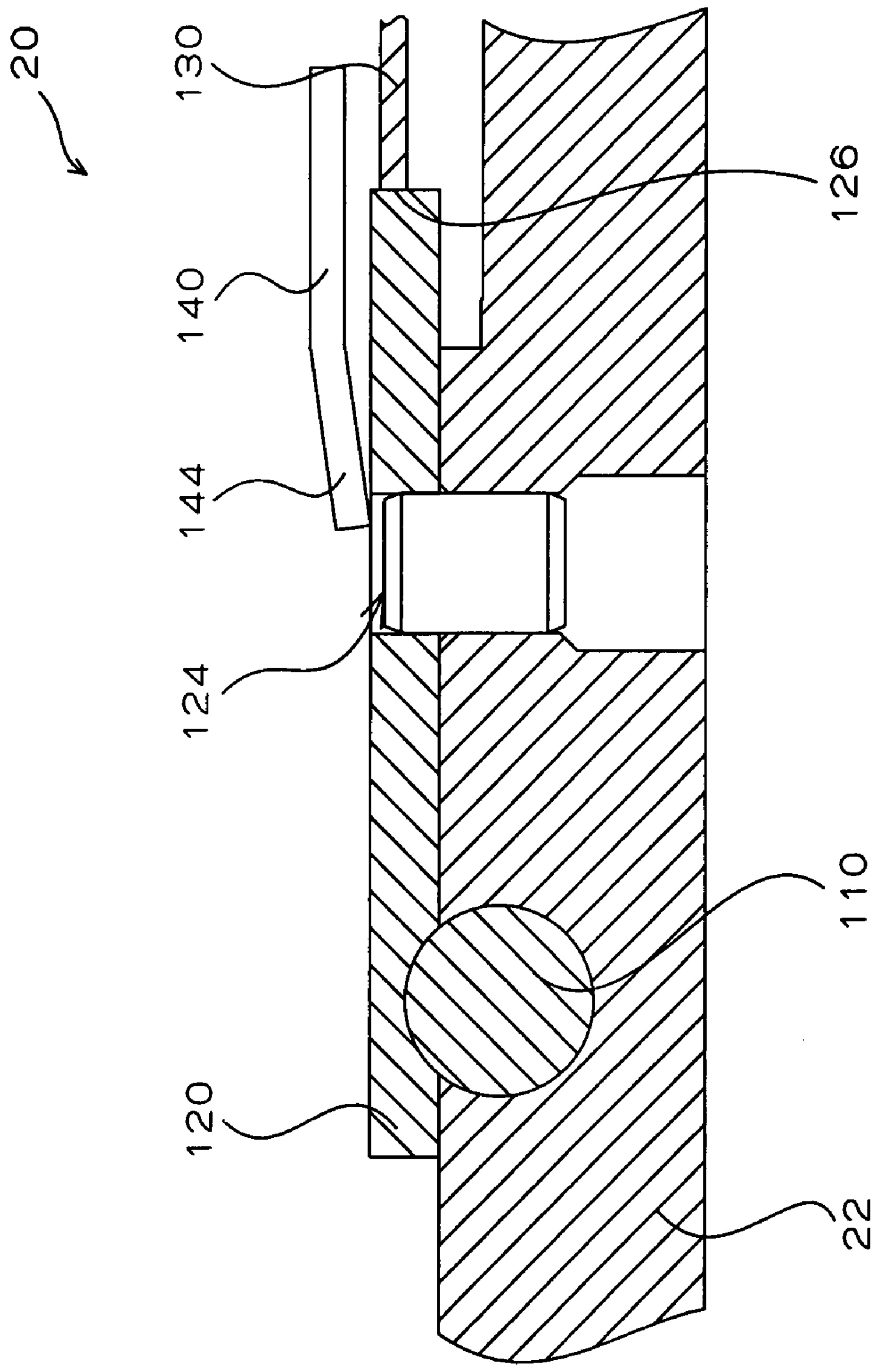
FIG. 21 is a sectional view showing an outline structure of portions of a setting lever and a yoke according to a modified example of the first embodiment of the multifunction timepiece of the invention.
Figure 22:
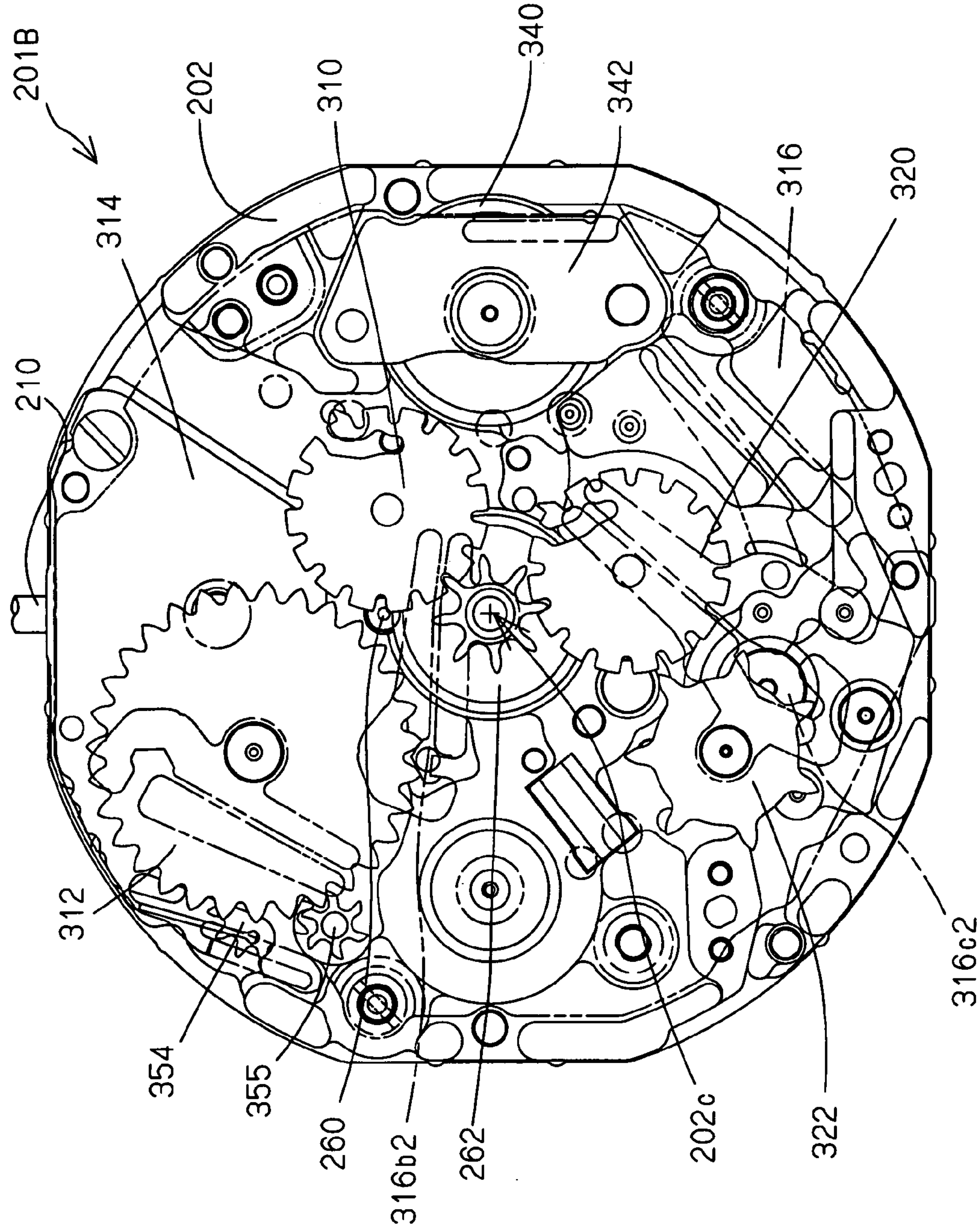
FIG. 22 is a plane view showing an outline structure viewed from a back side of a movement according to a second embodiment of a multifunction timepiece of the invention.
Figure 23:
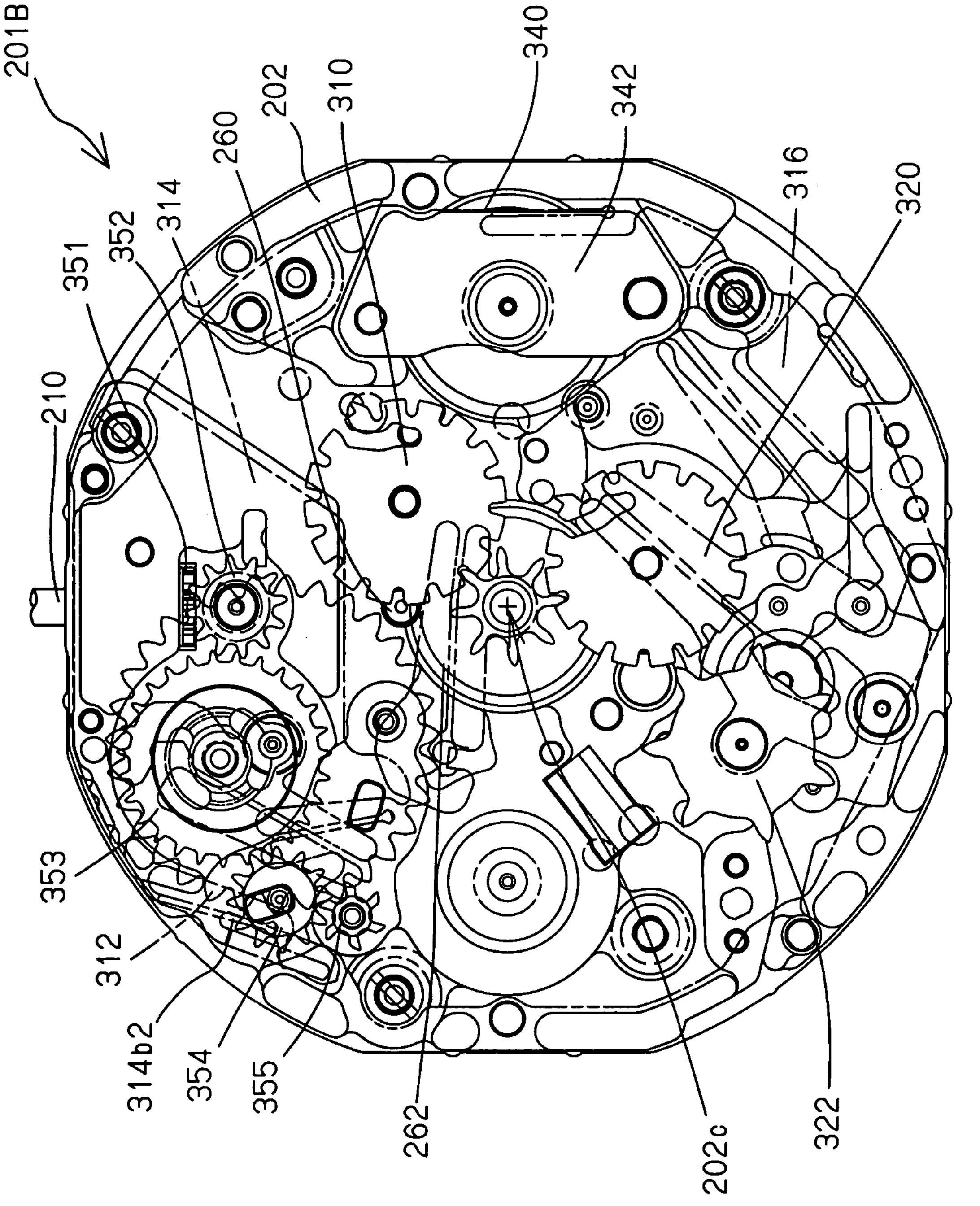
FIG. 23 is a plane view showing a date correcting mechanism on the back side of the movement according to the second embodiment of the multifunction timepiece of the invention.
Figure 24:
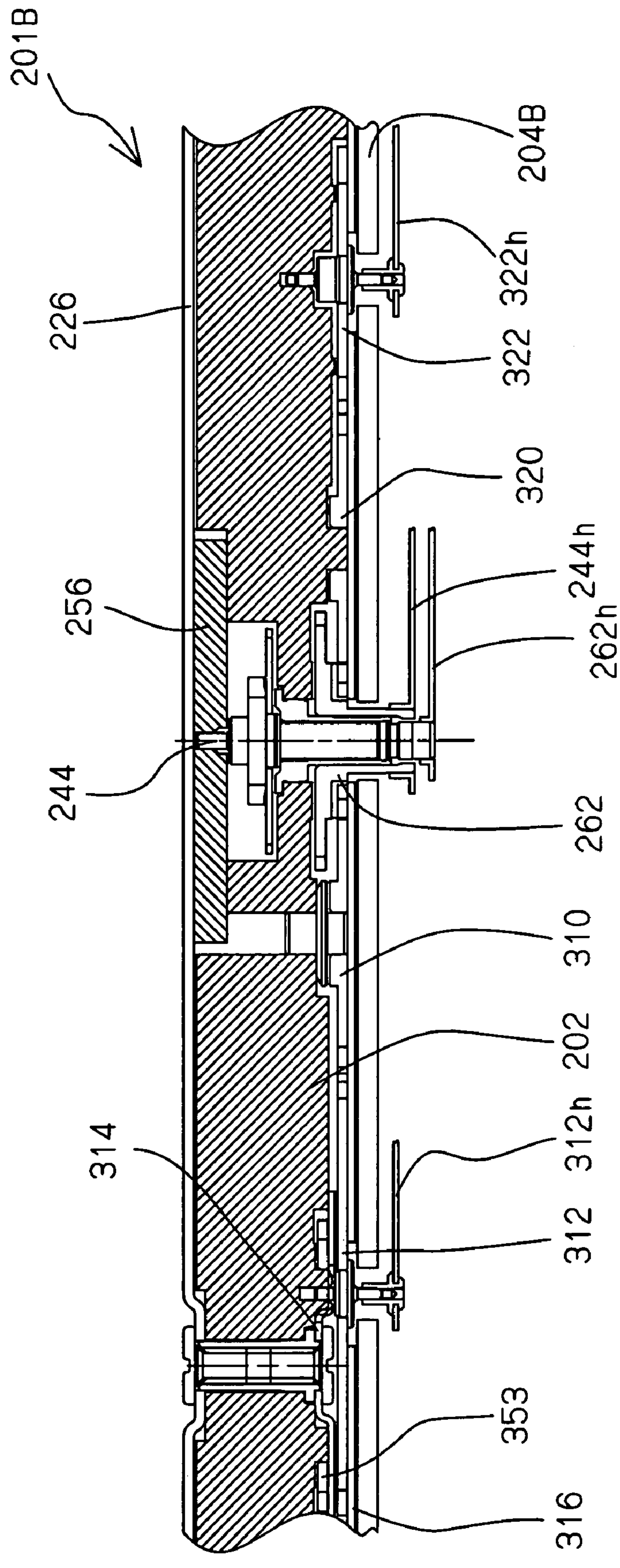
FIG. 24 is a partial sectional view showing a portion of a back train wheel according to the second embodiment of the multifunction timepiece of the invention.
Figure 25:
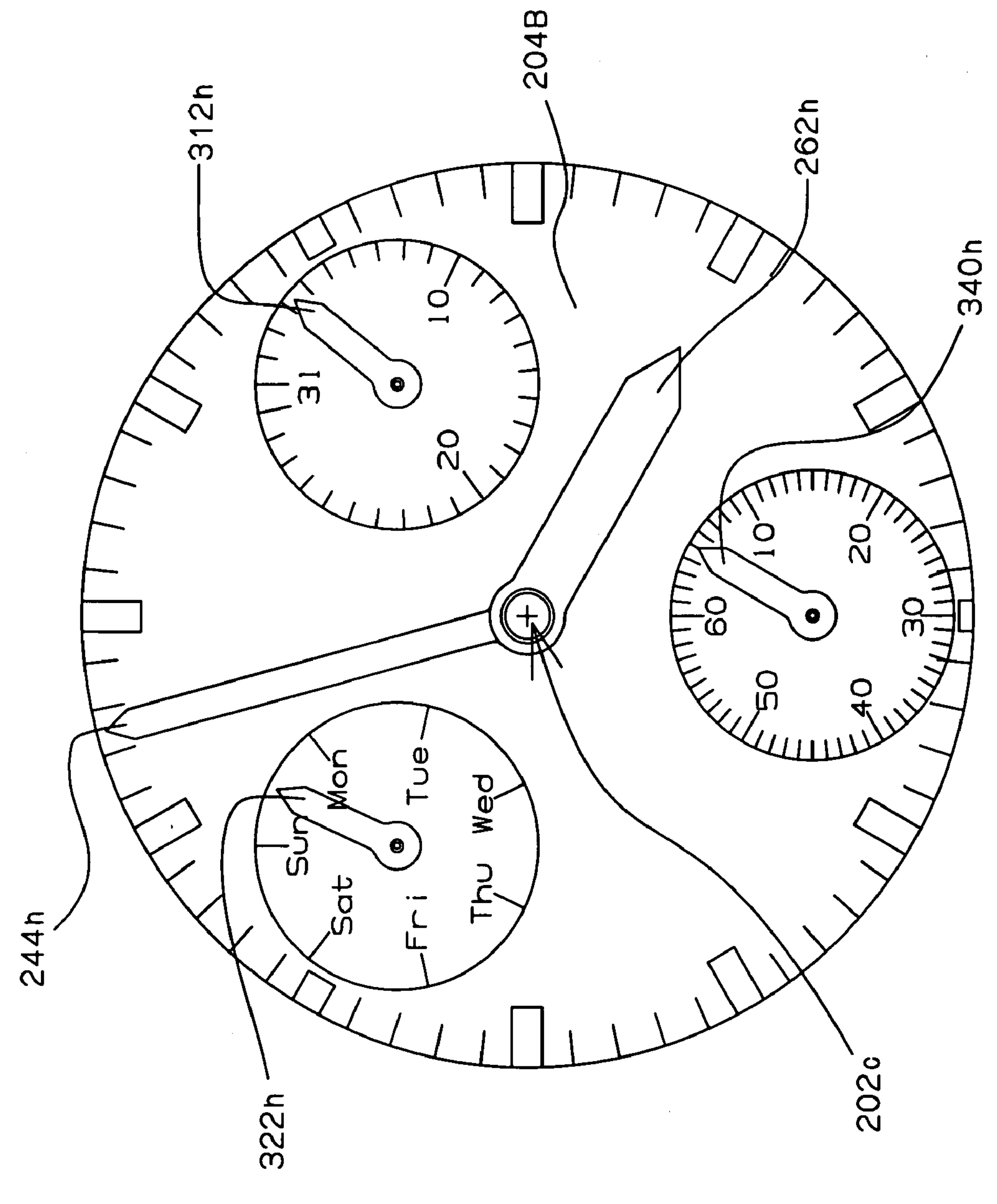
FIG. 25 is a plane view showing portions of a dial and a hand of a complete including 3 small hands according to the second embodiment of the multifunction timepiece of the invention.
Figure 26:
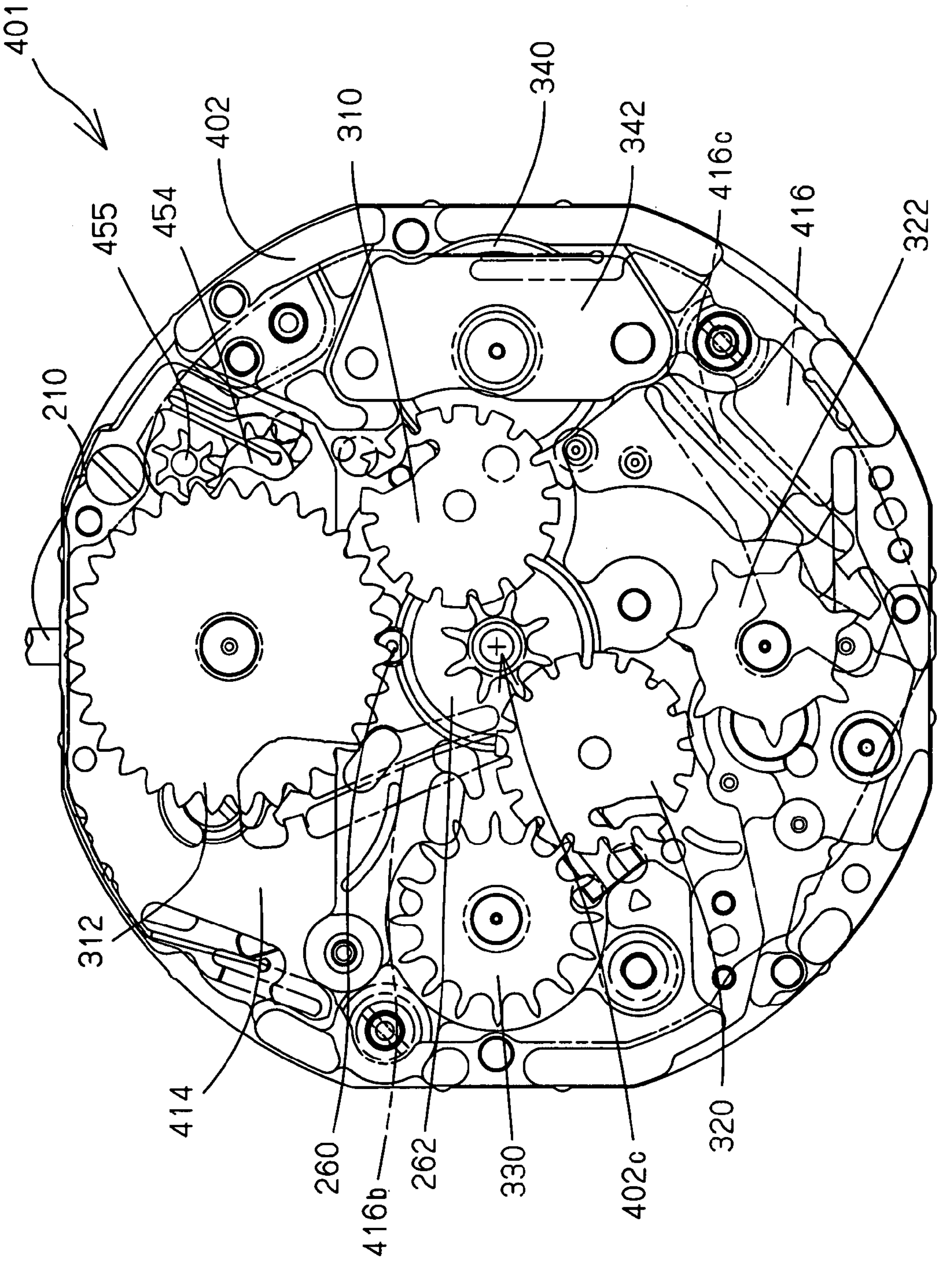
FIG. 26 is a plane view showing an outline structure viewed from a back side of a movement according to a third embodiment of a multifunction timepiece of the invention.
Figure 27:
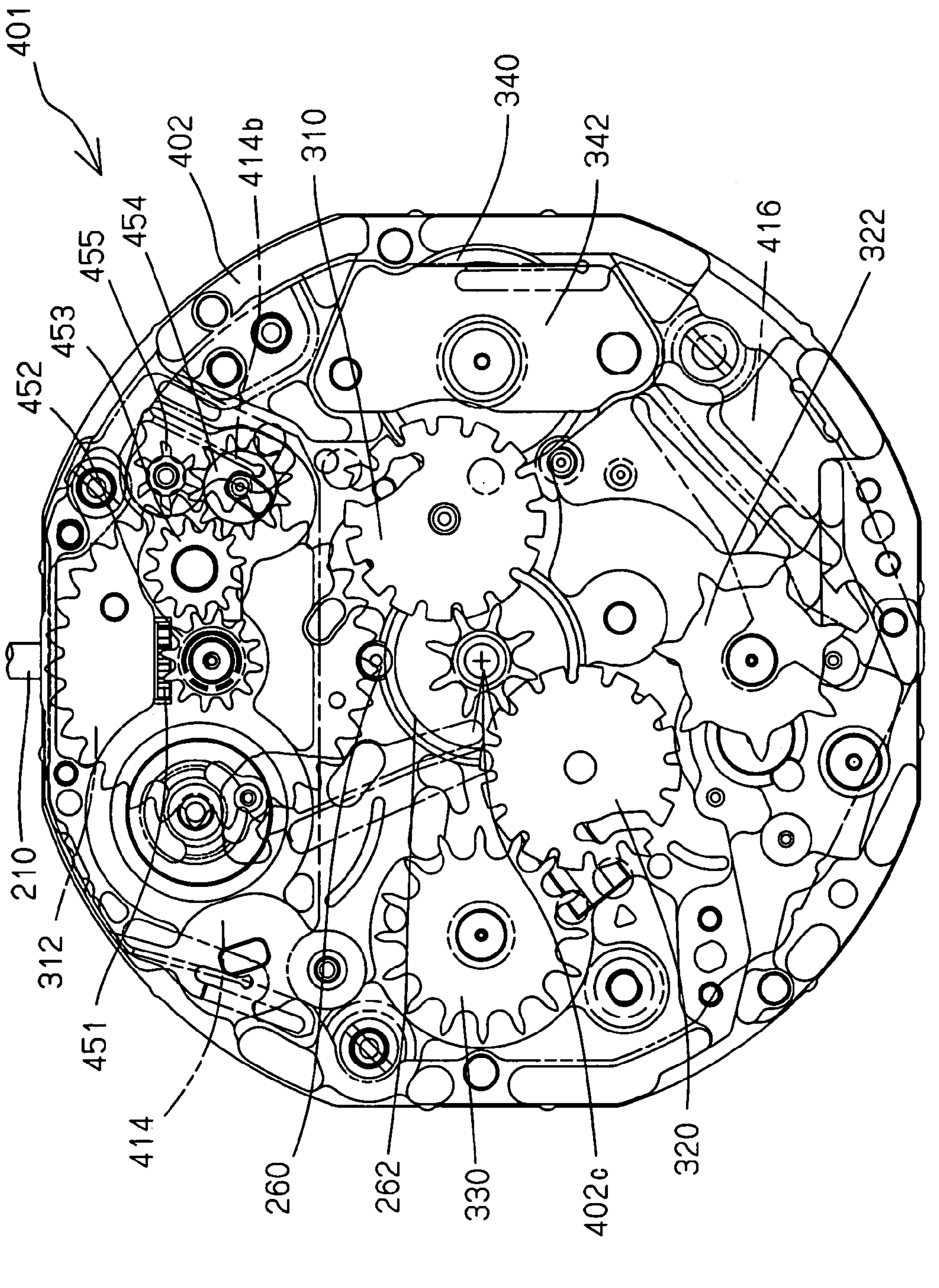
FIG. 27 is a plane view showing a date correcting mechanism of a back side of a movement according to the third embodiment of the multifunction timepiece of the invention.
Figure 28:
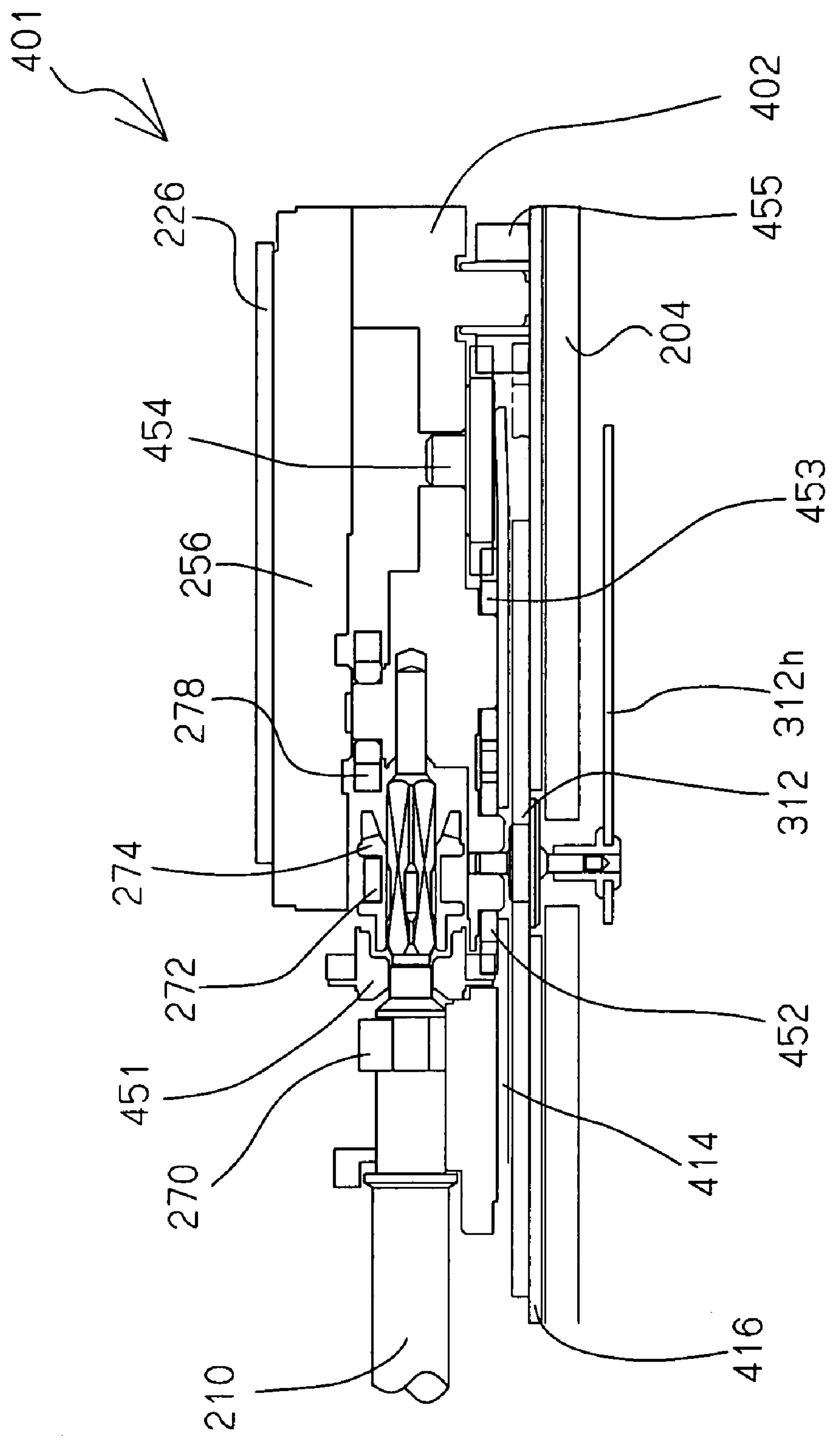
FIG. 28 is a partial sectional view showing portions of a winding stem and a back train wheel according to the third embodiment of the multifunction timepiece of the invention.
Figure 29:
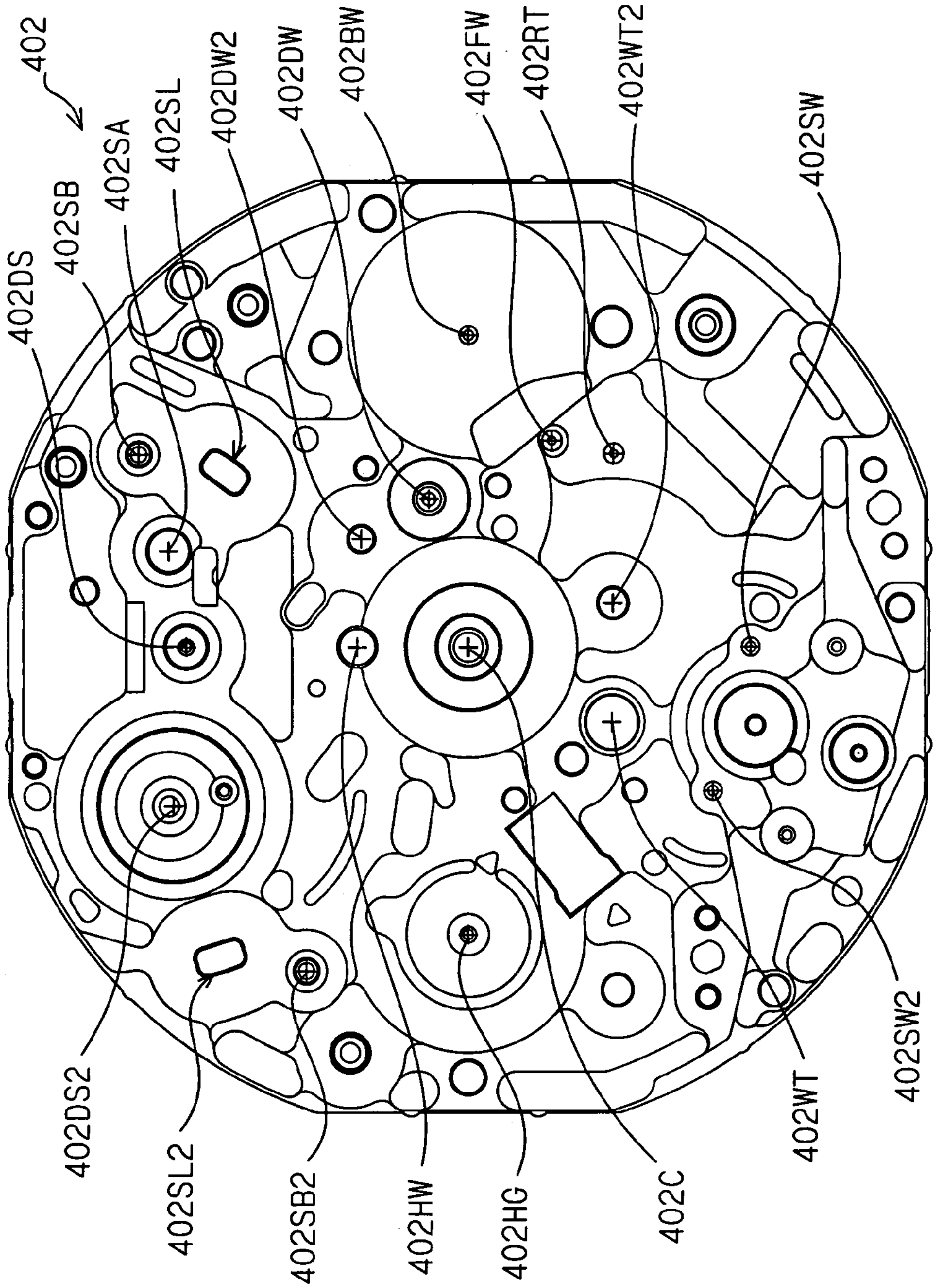
FIG. 29 is a plane view showing a shape viewed from a back side of a main plate according to the third embodiment of the multifunction timepiece of the invention.
Figure 30:
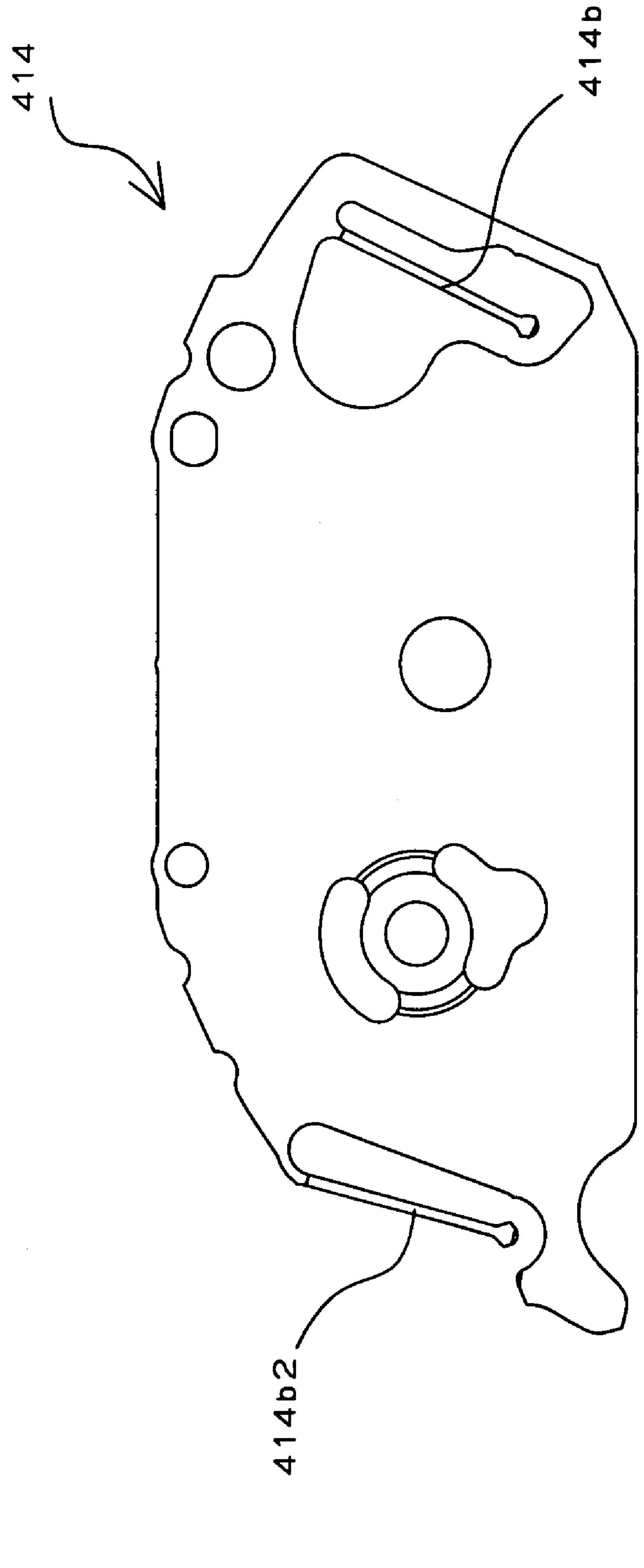
FIG. 30 is a plane view showing a shape viewed from a top side of a date corrector setting transmission wheel holder according to the third embodiment of the multifunction timepiece of the invention.
Figure 31:
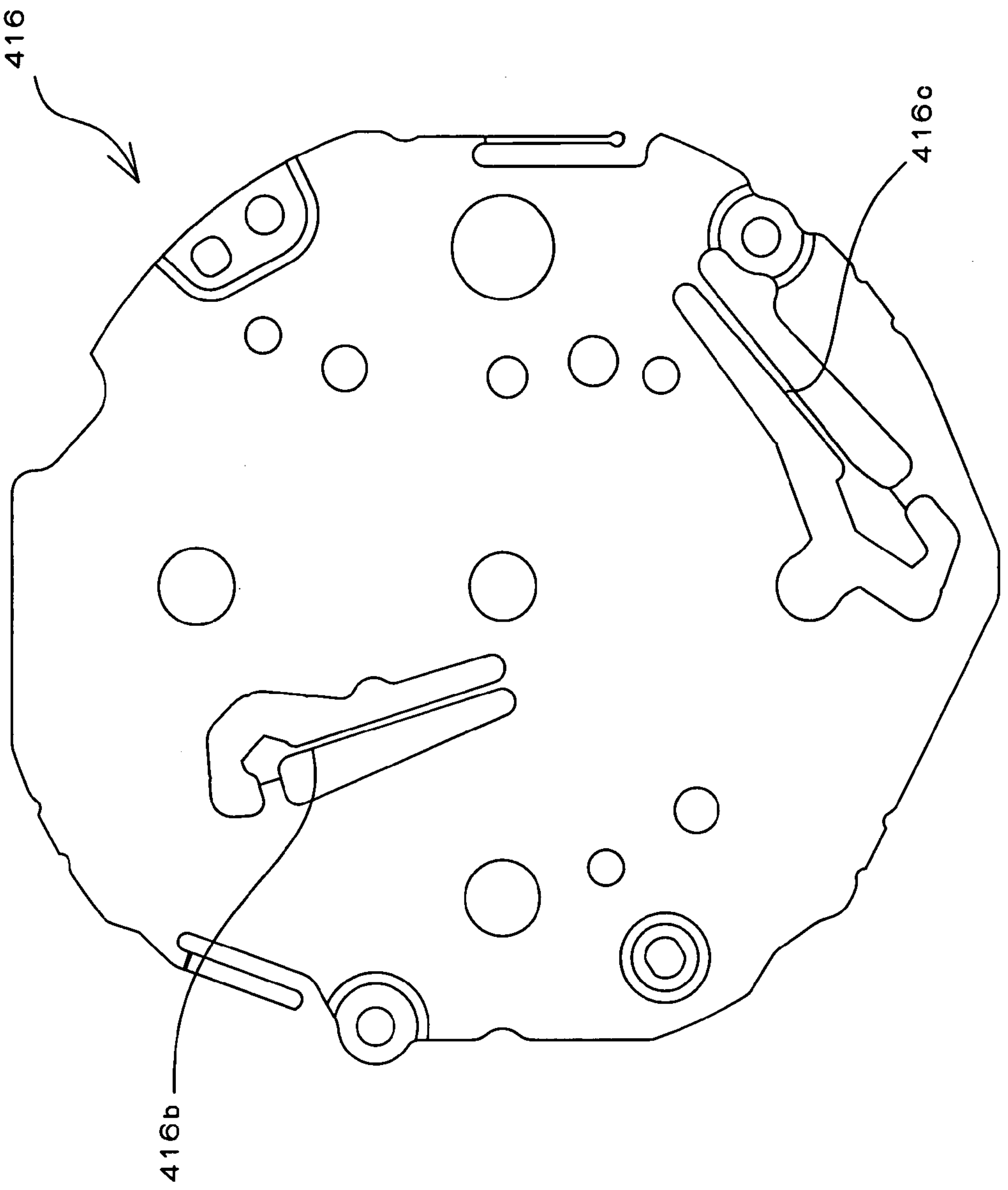
FIG. 31 is a plane view showing a shape viewed from a top side of a setting lever jumper according to the third embodiment of the multifunction timepiece of the invention.
Figure 32:
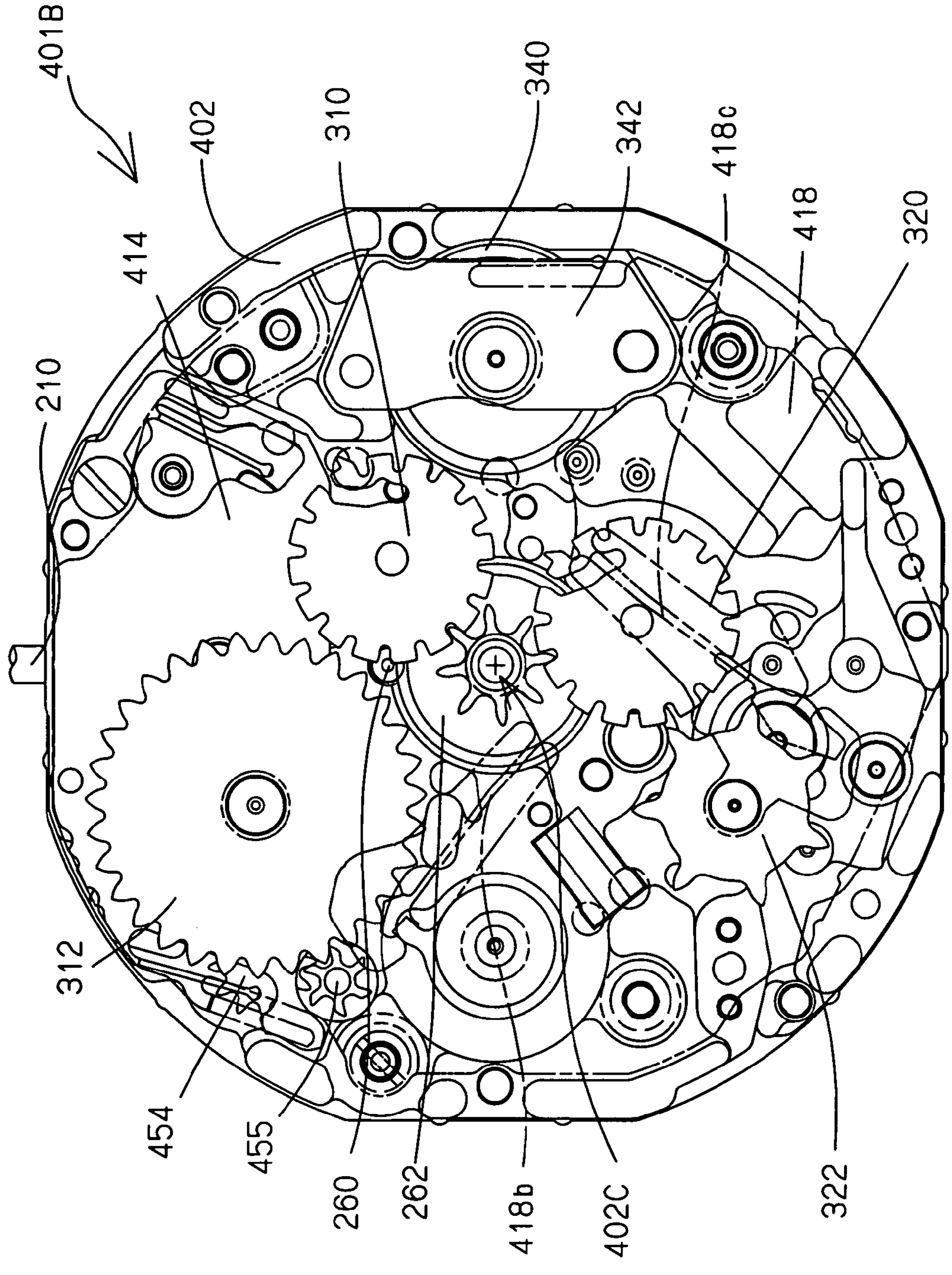
FIG. 32 is a plane view showing an outline structure viewed from a back side of a movement according to a fourth embodiment of a multifunction timepiece of the invention.
Figure 33:
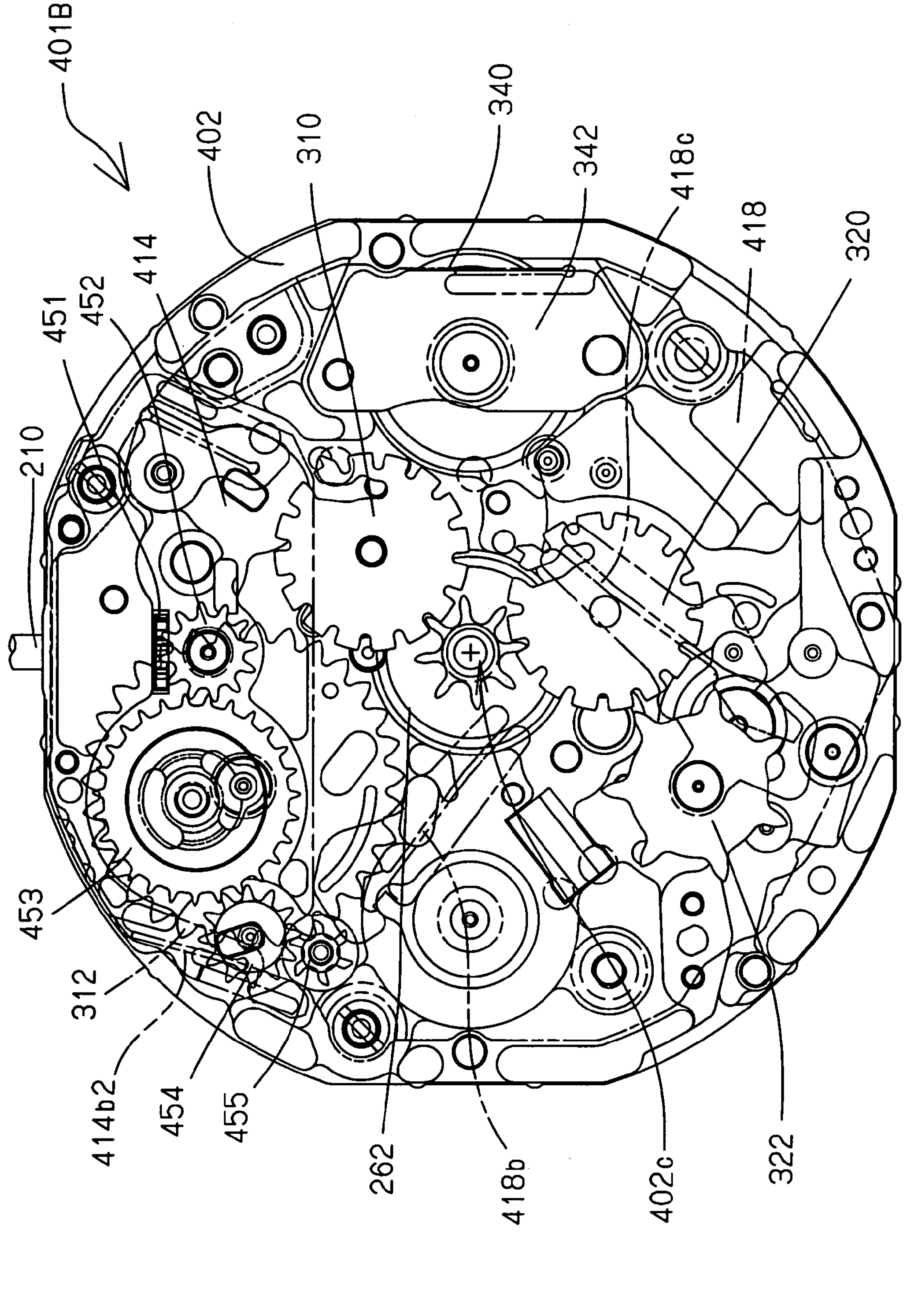
FIG. 33 is a plane view showing a date correcting mechanism on the back side of the movement according to the fourth embodiment of the multifunction timepiece of the invention.
Figure 34:
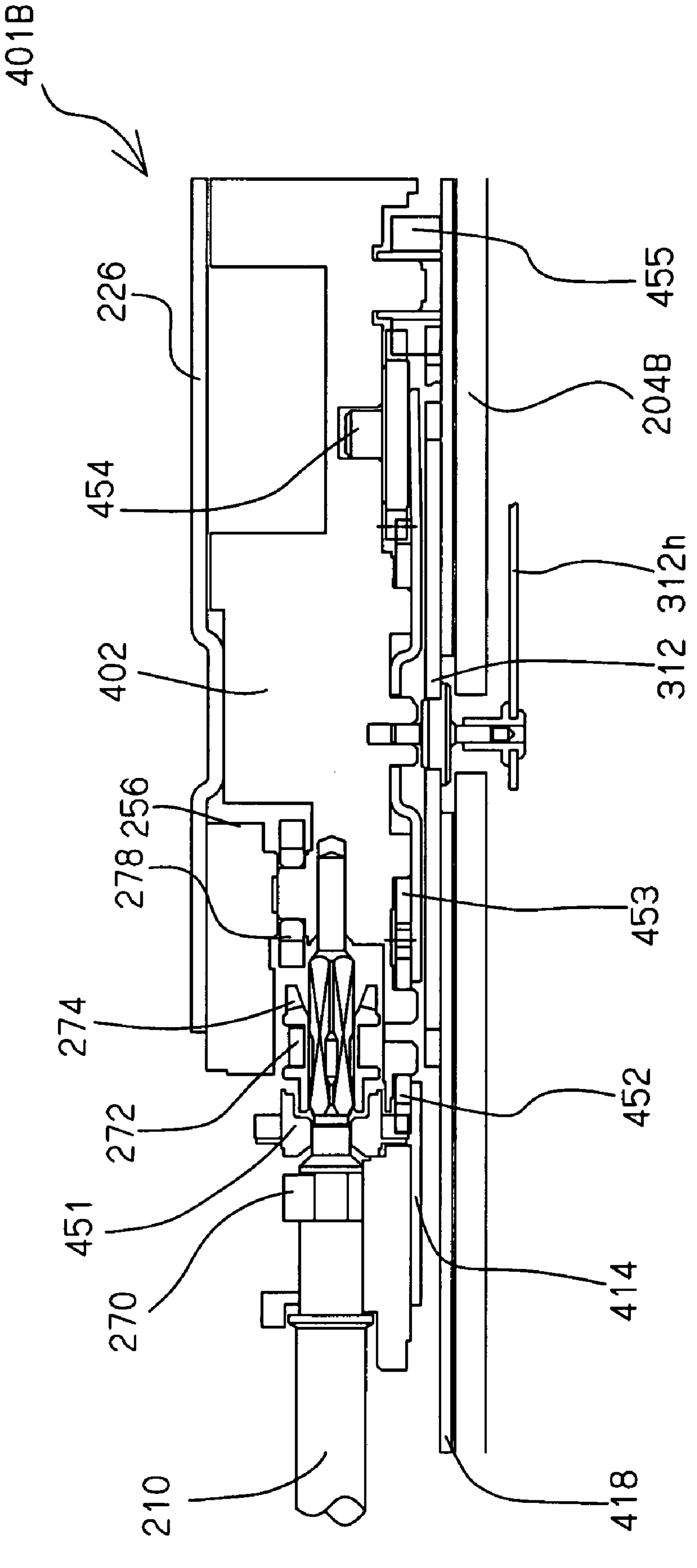
FIG. 34 is a partial sectional view showing a portion of a winding stem and a back train wheel according to the fourth embodiment of the multifunction timepiece of the invention.
Figure 35:
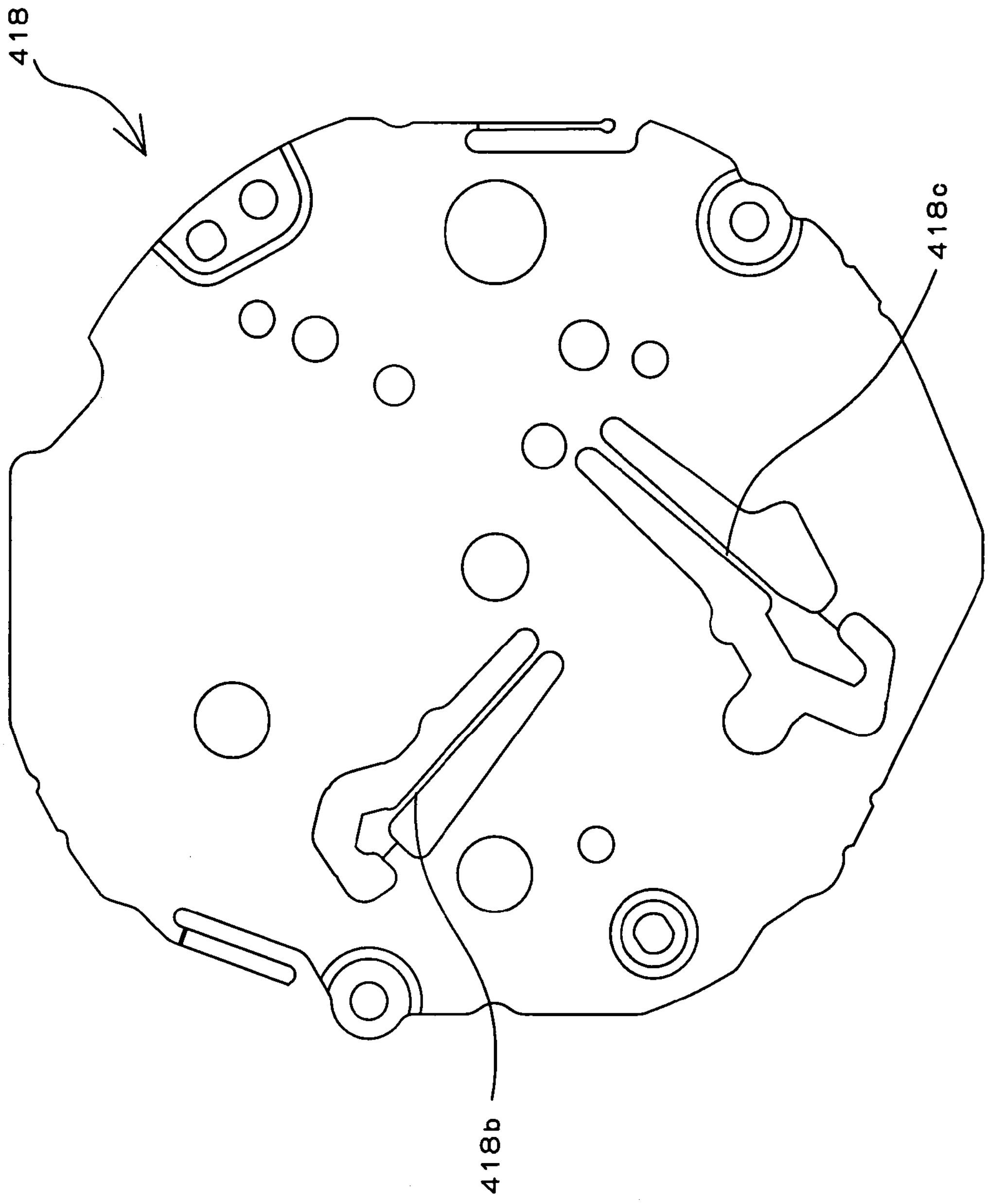
FIG. 35 is a plane view showing a shape viewed from a top side of a setting lever jumper according to the fourth embodiment of the multifunction timepiece of the invention.
Figure 36:
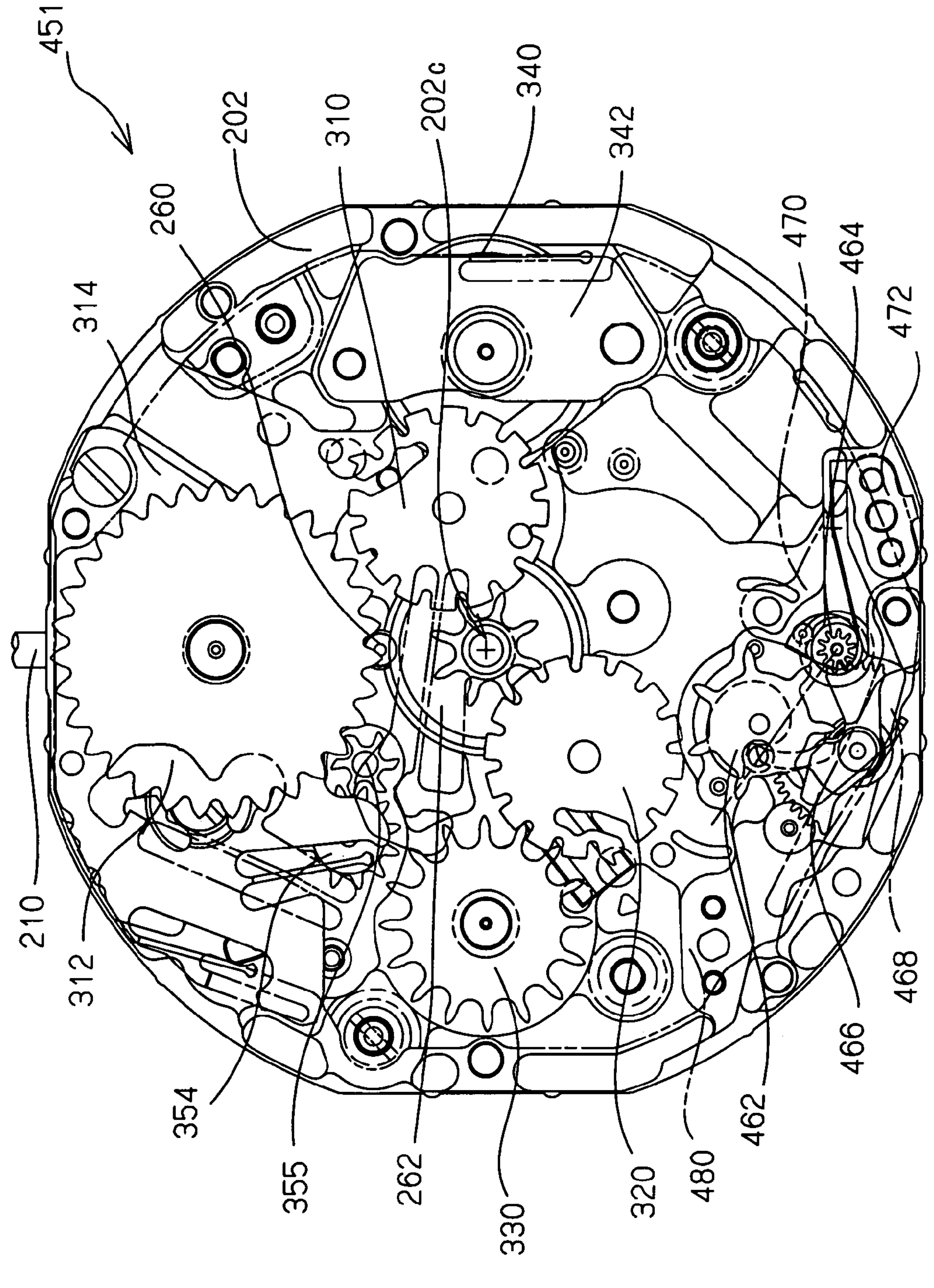
FIG. 36 is a plane view showing an outline structure viewed from a back side of a movement according to a fifth embodiment of a multifunction timepiece of the invention.
Figure 37:
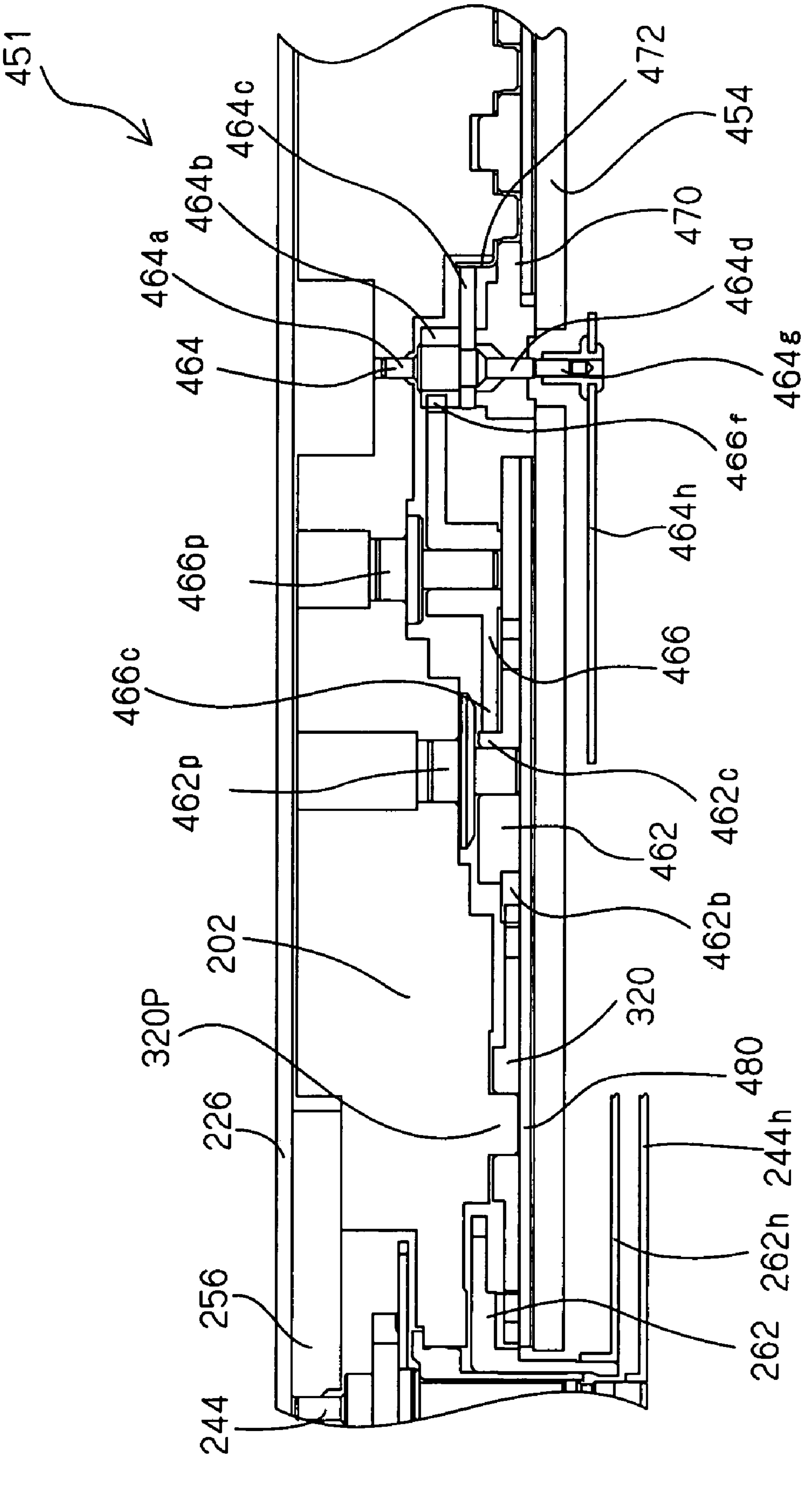
FIG. 37 is a partial sectional view showing a structure of a day feeding mechanism according to the fifth embodiment of the multifunction timepiece of the invention.
Figure 38:
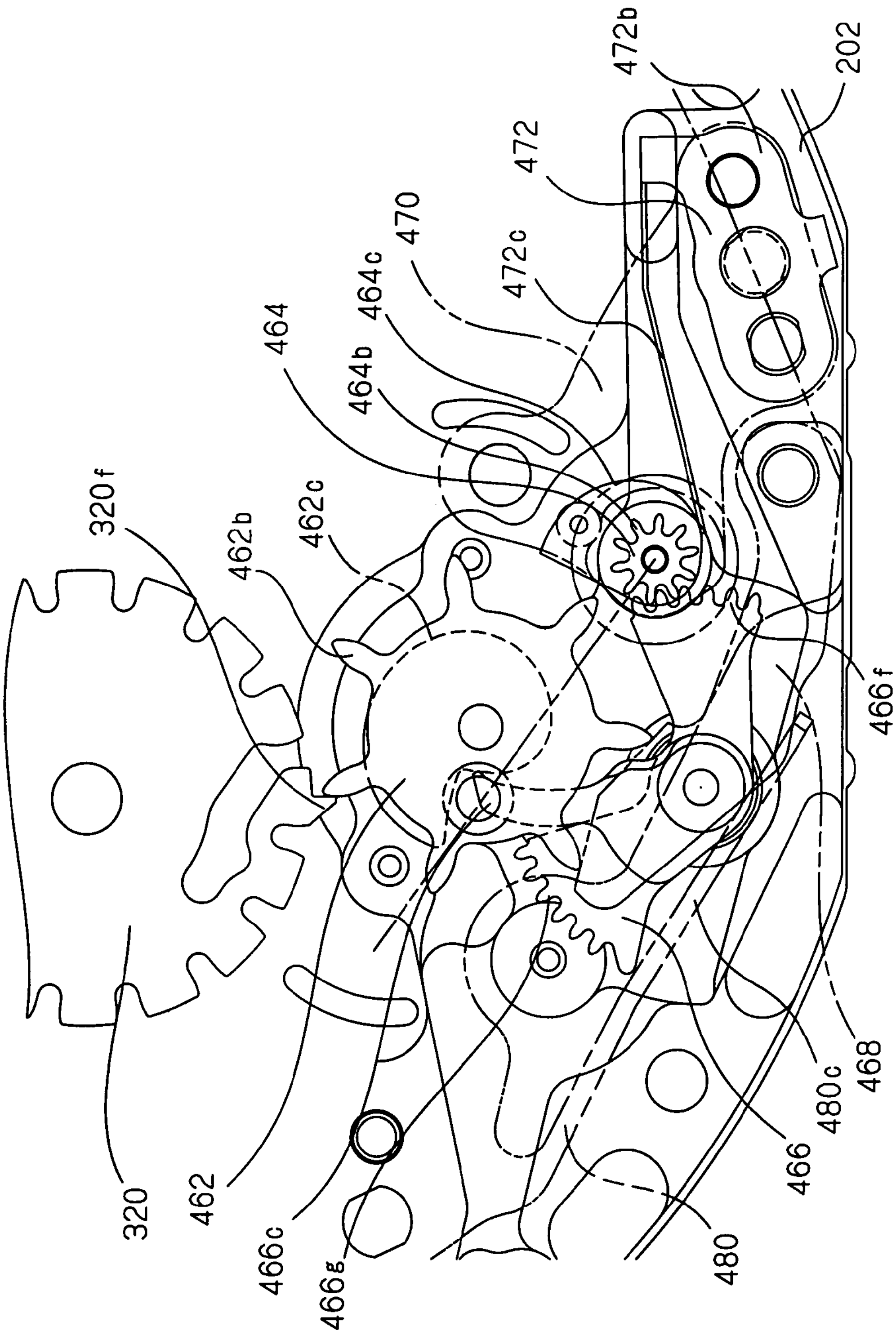
FIG. 38 is a plane view enlarging a portion showing a structure of a day feeding mechanism in a state of indicating Sunday according to the fifth embodiment of the multifunction timepiece of the invention.
Figure 39:
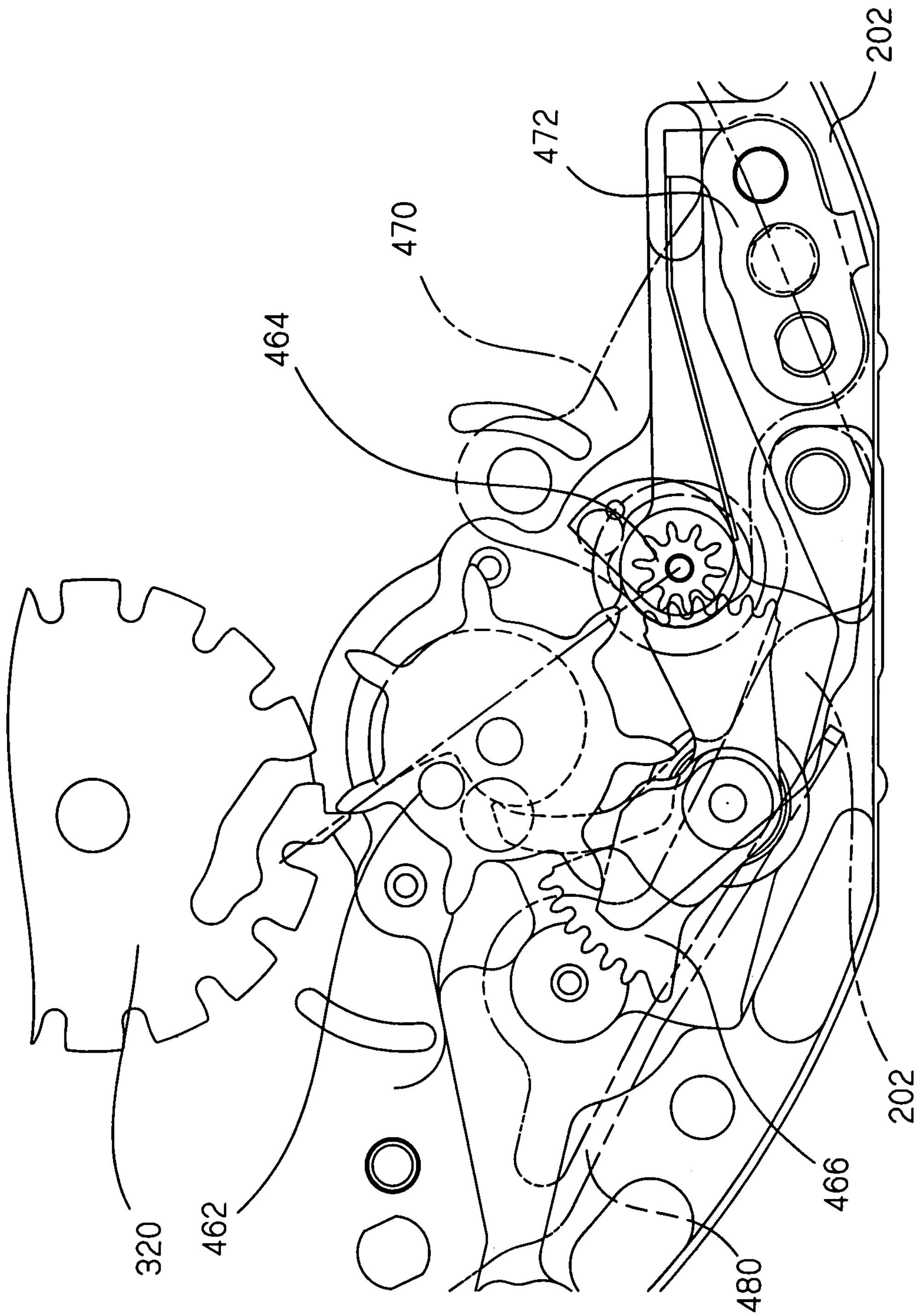
FIG. 39 is a plane view enlarging a portion showing the structure of the day feeding mechanism in a state of indicating Monday according to the fifth embodiment of the multifunction timepiece of the invention.
Figure 40:
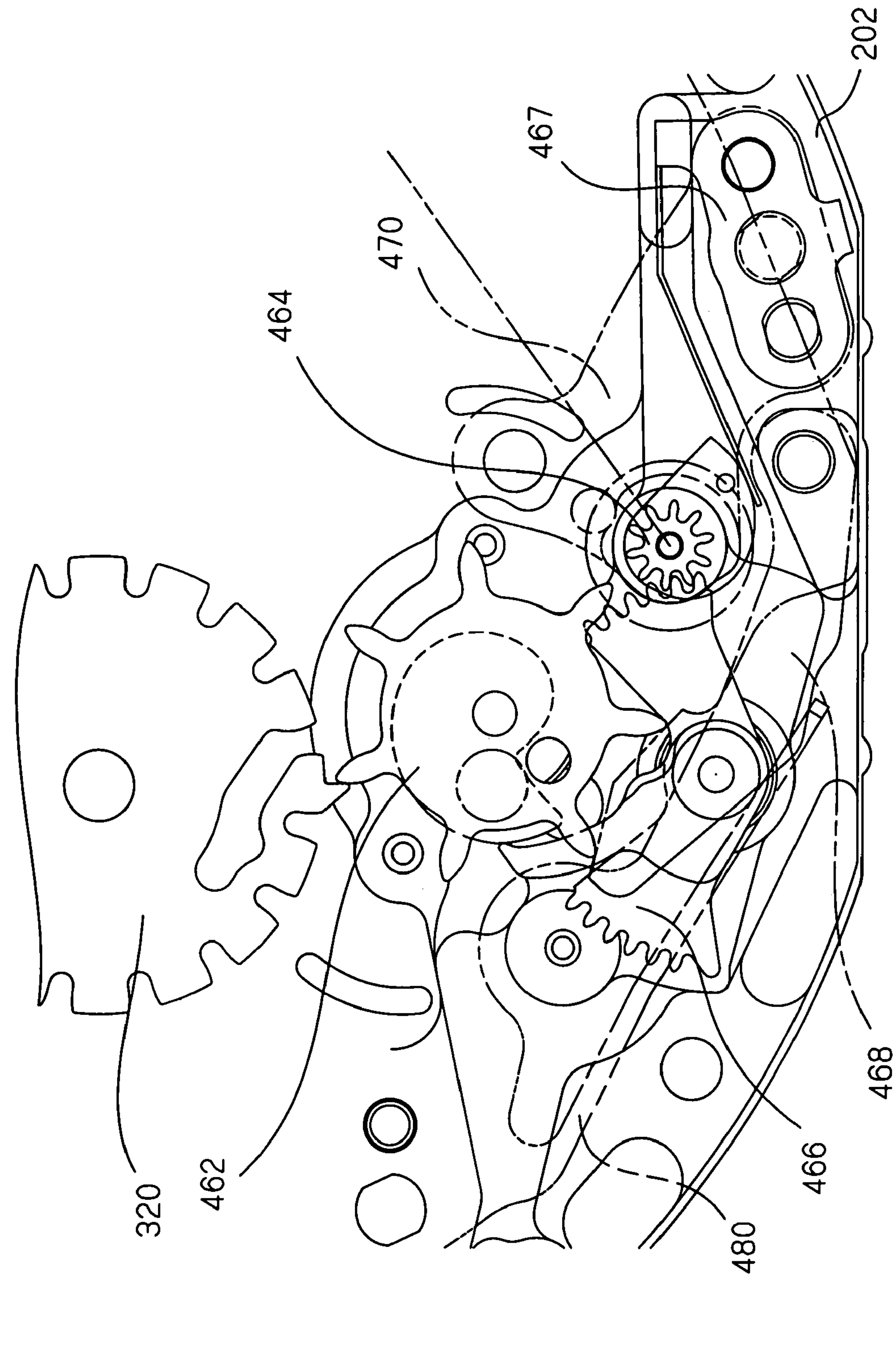
FIG. 40 is a plane view enlarging a portion showing the structure of the day feeding mechanism in a state of indicating Saturday according to the fifth embodiment of the multifunction timepiece of the invention.
Figure 41:
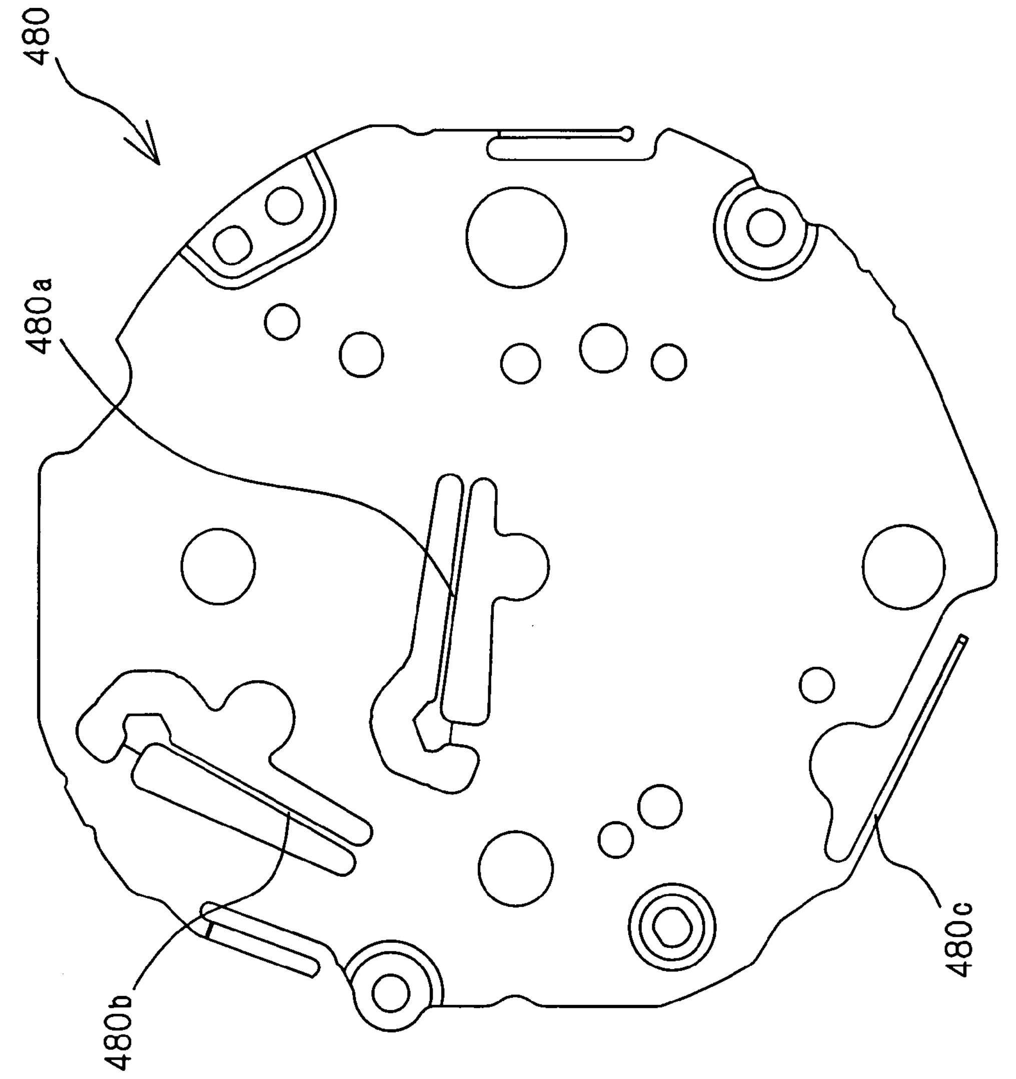
FIG. 41 is a plane view showing a shape viewed from a top side of a setting lever jumper according to the fifth embodiment of the multifunction timepiece of the invention.
Figure 42:
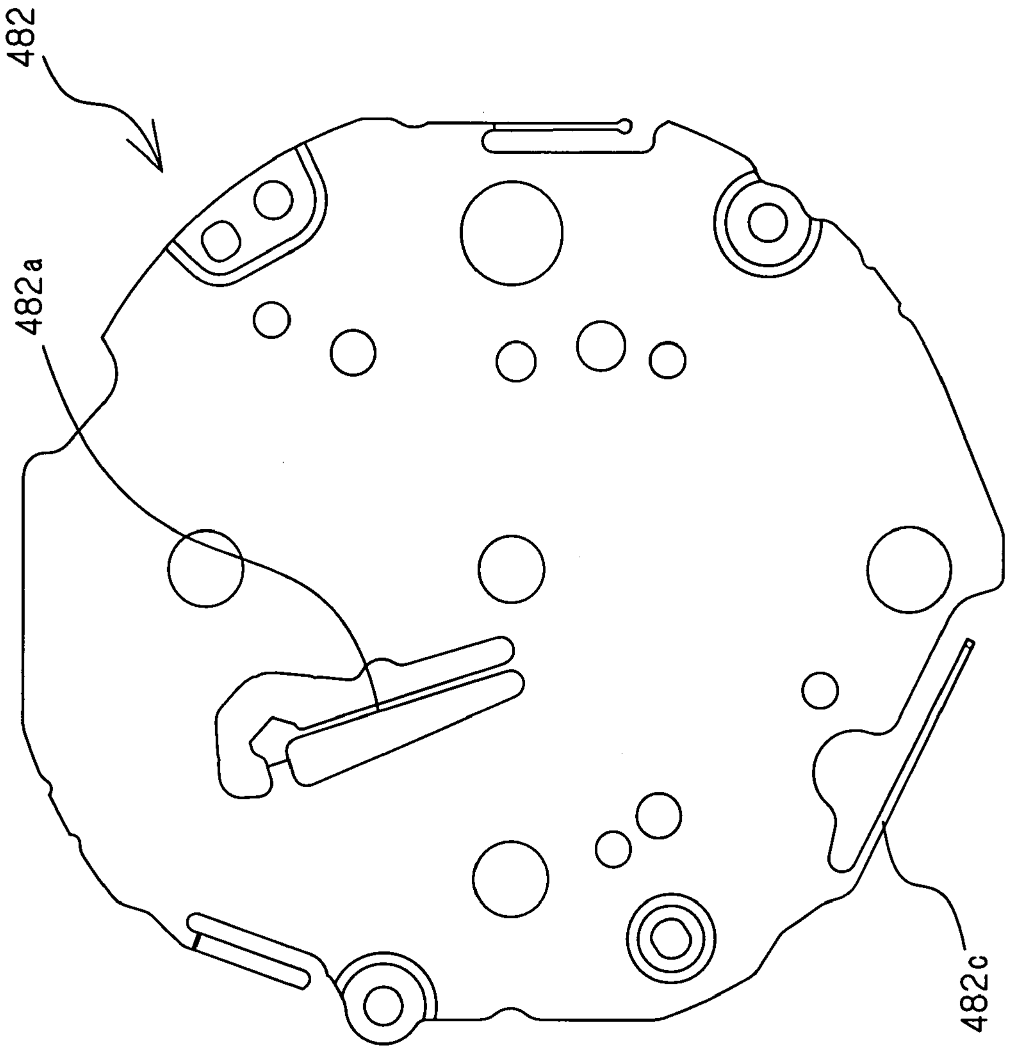
FIG. 42 is a plane view showing a shape viewed from a top side of the setting lever jumper of a modified example according to the fifth embodiment of the multifunction timepiece of the invention.
Figure 43:
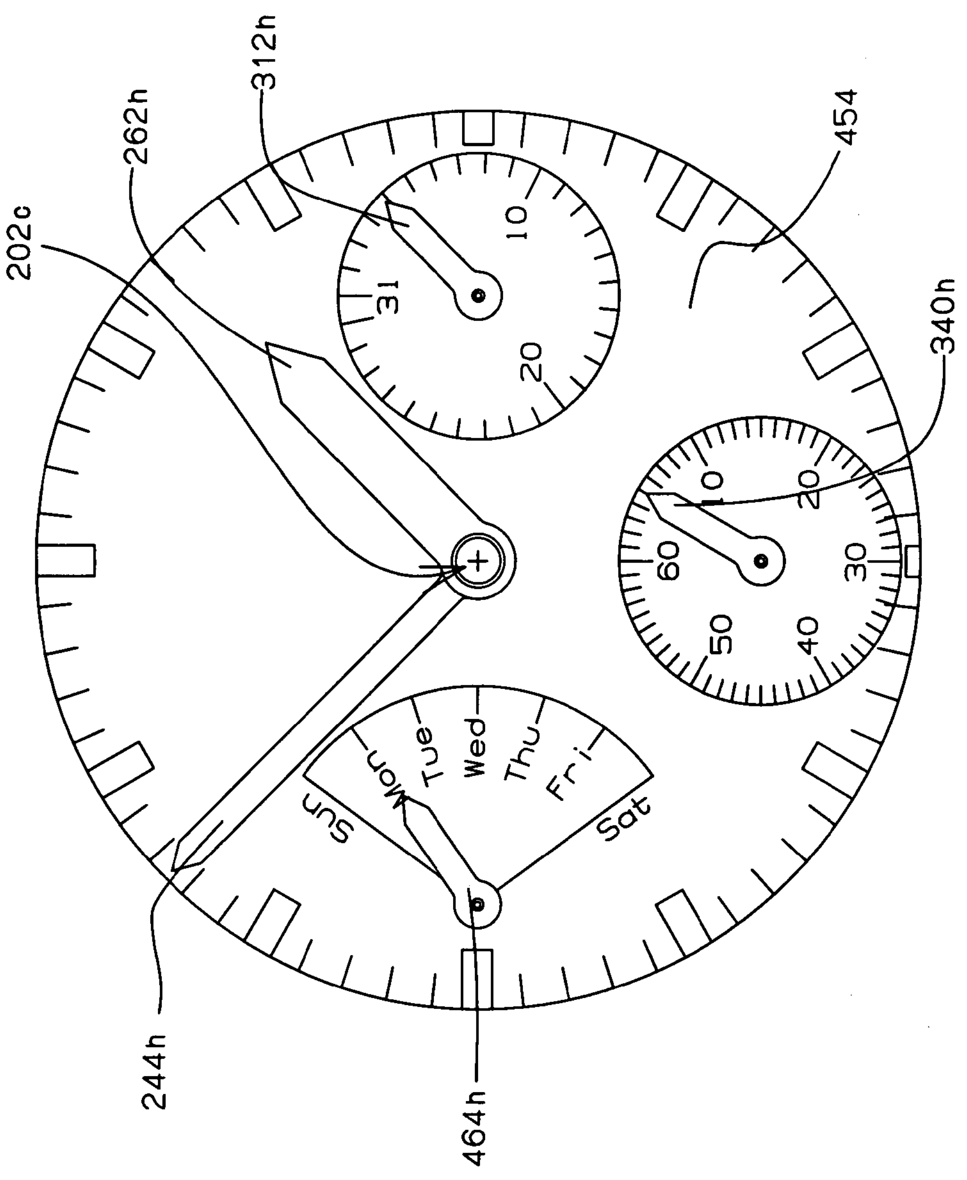
FIG. 43 is a plane view showing portions of a dial and a hand of a complete including 3 small hands according to the fifth embodiment of the multifunction timepiece of the invention.
Figure 44:
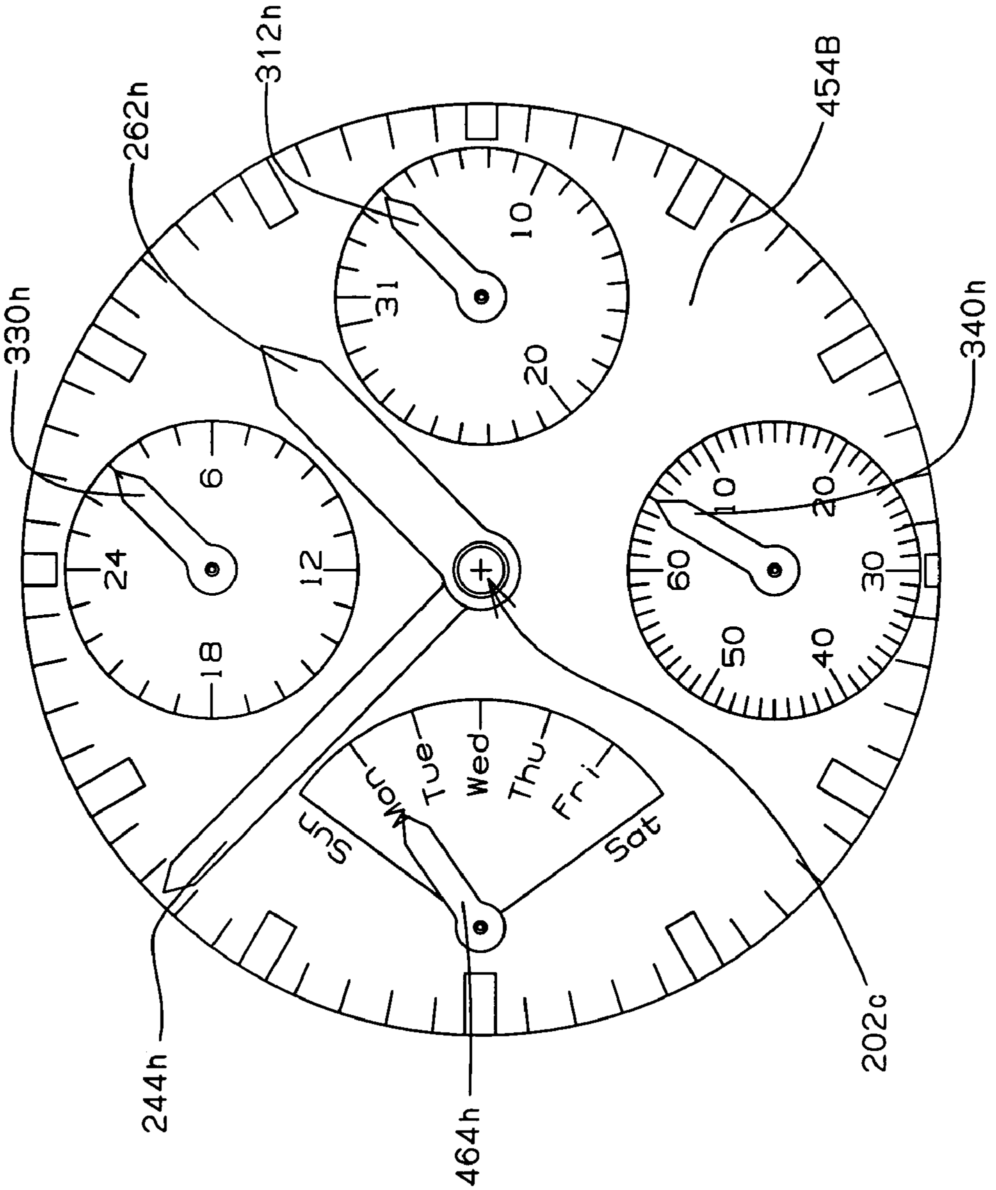
FIG. 44 is a plane view showing portions of a dial and a hand of a complete including 4 small hands according to the fifth embodiment of the multifunction timepiece of the invention.

201 movement
202 main plate
204 dial
210 winding stem
236 rotor
238 fifth wheel & pinion
240 fourth wheel & pinion
242 third wheel & pinion
244 center wheel & pinion
**244*h*** minute hand
260 minute wheel
262 hour wheel
**262*h*** hour hand
310 date indicator driving wheel
312 date star wheel
**312*h*** date hand
320 day indicator driving wheel
322 small day wheel
**322*h*** day hand
330 hour indicator
**330*h*** 24 hour hand
340 second indicator
**340*h*** small second hand
351 first corrector setting transmission wheel
352 second corrector setting transmission wheel
353 third corrector setting transmission wheel
354 fourth corrector setting transmission wheel
355 fifth corrector setting wheel.

The invention claimed is:

1. A multifunction timepiece characterized in a multifunction timepiece including a main plate (202) constituting a base plate of a movement (451), a winding stem (210) for correcting an indication, a switching mechanism for switching a position of the winding stem (210), a dial (204) for indicating time information, and a small hand for indicating the time information or calendar information;

wherein the movement (451) includes a first train wheel rotation center for a train wheel used in fabricating a first type of the multifunction timepiece having an arrangement of a first type of the small hand by using the movement (451), and a second train wheel rotation center for a train wheel used in fabricating a second type of the multifunction timepiece having an arrangement of a second type of the small hand by using the movement (451);

wherein the first train wheel rotation center is provided with a train wheel guide portion for guiding a train wheel member rotated to move centering on a position thereof to be able to rotate to move;

wherein the second train wheel rotation center is provided with a train wheel guide portion for guiding a train wheel member moved in a fan shape centering on a position thereof;

wherein the train wheel rotation center of the train wheel member rotated to move is arranged at a position between a main plate center (**202*c*) of the main plate (202) and a main plate outer shape portion of the main plate (202**);

wherein the train wheel rotation center of the train wheel member moved in the fan shape is arranged at a position between the main plate center (**202*c*) of the main plate (202) and the main plate outer shape portion of the main plate (202**);

wherein a train wheel for indicating the calendar information is arranged rotatably relative to the first train wheel rotation center or the second train wheel rotation center; and wherein the multifunction timepiece is constituted such that when the train wheel for indicating the calendar information is arranged at the first train wheel rotation center, the calendar information is made to be able to indicate by the small hand rotated to move by the train wheel, and when the fan shape hand train wheel for indicating the calendar information is arranged at the second train wheel rotation center, the calendar information is made to be able to indicate by the small hand moved in the fan shape by the fan shape hand train wheel.

2. The multifunction timepiece according to claim 1, characterized in that a distance between the rotation center of the train wheel member moved in the fan shape and the main plate center (202*c*) of the main plate (202) is constituted to be larger than a distance between the rotation center of the train wheel member rotated to move and the main plate center (202*c*) of the main plate (202).

3. The multifunction timepiece according to claim 1, characterized in that the first train wheel rotation center is arranged in a 9 o'clock direction of the movement (451), and the second train wheel rotation center is arranged in the 9 o'clock direction of the movement (201).

4. The multifunction timepiece according to claim 1, characterized in that the movement (451) further includes a third train wheel rotation center for a train wheel used in fabricating the multifunction timepiece having an arrangement of a small hand;

wherein the third train wheel rotation center is arranged at a position between the main plate center (202*c*) of the main plate (202) and the main plate outer shape portion of the main plate (202);

wherein at the third train wheel rotation center, a train wheel guide portion for rotatably guiding a train wheel member rotated centering on a position thereof is provided;

wherein a train wheel for indicating the time information or the calendar information is arranged to be able to rotate relative to the third train wheel rotation center; and wherein the time information or the calendar information is constituted to indicate by the further small hand (312*h*, 340*h*).

5. The multifunction timepiece according to claim 4, characterized in that the third train wheel rotation center is arranged in a 6 o'clock direction of the movement (451).

6. The multifunction timepiece according to claim 4, characterized in that the third train wheel rotation center is arranged in a 12 o'clock direction of the movement (201).

7. The multifunction timepiece according to claim 4, characterized in that the third train wheel rotation center is arranged in a 3 o'clock direction of the movement (451).

8. The multifunction timepiece according to claim 7, characterized in that the third train wheel rotation center is arranged in the 3 o'clock direction of the movement (201), and a date star wheel (312) for carrying out a date indication is arranged rotatably by constituting a rotation center thereof by the first train wheel rotation center.

9. The multifunction timepiece according to claim 3, characterized in that the movement (451) includes a day indicator driving wheel (320) rotated based on a rotation of an hour wheel (262), and the day indicator driving wheel (320) is constituted to be able to rotate a train wheel member (322) rotated to move when the train wheel member (322) rotated to move is arranged at the first train wheel rotation center, and is constituted to be able to move in the fan shape the train wheel member (322) moved in the fan shape when a train wheel member (464) moved in the fan shape is arranged at the second train wheel rotation center.

* * * * *